(12) United States Patent
Nagano et al.

(10) Patent No.: US 12,065,193 B2
(45) Date of Patent: Aug. 20, 2024

(54) SHOCK ABSORBING MEMBER, METHOD FOR PRODUCING SHOCK ABSORBING MEMBER, AND METHOD FOR PRODUCING STEEL SHEET FOR COLD PLASTIC WORKING

(71) Applicant: NIPPON STEEL CORPORATION, Tokyo (JP)

(72) Inventors: Mai Nagano, Tokyo (JP); Shigeru Yonemura, Tokyo (JP); Akihiro Uenishi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 305 days.

(21) Appl. No.: 17/623,111

(22) PCT Filed: Jun. 26, 2020

(86) PCT No.: PCT/JP2020/025355
§ 371 (c)(1),
(2) Date: Dec. 27, 2021

(87) PCT Pub. No.: WO2020/262653
PCT Pub. Date: Dec. 30, 2020

(65) Prior Publication Data
US 2022/0348263 A1    Nov. 3, 2022

(30) Foreign Application Priority Data

Jun. 28, 2019  (JP) .................................. 2019-120751
Jun. 28, 2019  (JP) .................................. 2019-120752
Jun. 28, 2019  (JP) .................................. 2019-120753

(51) Int. Cl.
*B62D 25/04*     (2006.01)
*B21D 53/88*     (2006.01)
(Continued)

(52) U.S. Cl.
CPC ............. *B62D 25/04* (2013.01); *B21D 53/88* (2013.01); *B60R 19/34* (2013.01); *B62D 21/15* (2013.01);
(Continued)

(58) Field of Classification Search
CPC ........ B62D 25/04; B62D 25/06; B62D 25/20; B62D 21/15; B62D 21/157; B62D 21/00; B62D 21/02; B62D 29/007; F16F 7/12
(Continued)

(56) References Cited

U.S. PATENT DOCUMENTS 10,934,601 B2 *  3/2021  Kim .......................... C22C 38/24
11,274,357 B2 *  3/2022  Kim .......................... C23C 30/00
(Continued)

FOREIGN PATENT DOCUMENTS

EP       3 862 457 A1    8/2021
JP       2008-144233 A   6/2008
(Continued)

*Primary Examiner* — Dennis H Pedder
(74) *Attorney, Agent, or Firm* — Birch, Stewart, Kolasch & Birch, LLP

(57) ABSTRACT

A shock absorbing member which can increase impact absorption energy and also enables thinning of a steel sheet that is a starting material, a method for producing the shock absorbing member, and a method for producing a steel sheet for cold plastic working are provided. The shock absorbing member includes a ridge portion formed in a curved shape as viewed from a longitudinal direction, and a wall portion extending from the ridge portion. In the wall portion, a ratio $\sigma_5/\tau_5$ between a tensile stress $\sigma_5$ when an elongation in a tensile test is 5% and a shear stress $\tau_5$ when a shear strain in a shear test is $5\sqrt{3}\%$ is 1.70 or less, or a ratio $\sigma_{10}/\tau_{10}$ between a tensile stress $\sigma_{10}$ when an elongation in a tensile test is 10% and a shear stress $\tau_{10}$ when a shear strain in a shear test is $10\sqrt{3}\%$ is 1.70 or less.

7 Claims, 12 Drawing Sheets

(51) Int. Cl.
    *B60R 19/34* (2006.01)
    *B62D 21/15* (2006.01)
    *B62D 25/02* (2006.01)
    *B62D 25/06* (2006.01)
    *B62D 25/08* (2006.01)
    *B62D 25/20* (2006.01)
    *B62D 29/00* (2006.01)
    *C21D 6/00* (2006.01)
    *C21D 9/46* (2006.01)
    *C22C 38/00* (2006.01)
    *C22C 38/02* (2006.01)
    *C22C 38/06* (2006.01)
    *C22C 38/08* (2006.01)
    *C22C 38/12* (2006.01)
    *C22C 38/14* (2006.01)
    *C22C 38/16* (2006.01)
    *C22C 38/38* (2006.01)
    *F16F 7/12* (2006.01)

(52) U.S. Cl.
    CPC ............ *B62D 25/025* (2013.01); *B62D 25/06* (2013.01); *B62D 25/20* (2013.01); *B62D 29/007* (2013.01); *C21D 6/001* (2013.01); *C21D 6/002* (2013.01); *C21D 6/005* (2013.01); *C21D 6/008* (2013.01); *C21D 9/46* (2013.01); *C22C 38/001* (2013.01); *C22C 38/002* (2013.01); *C22C 38/005* (2013.01); *C22C 38/02* (2013.01); *C22C 38/06* (2013.01); *C22C 38/08* (2013.01); *C22C 38/12* (2013.01); *C22C 38/14* (2013.01); *C22C 38/16* (2013.01); *C22C 38/38* (2013.01); *F16F 7/12* (2013.01); *C21D 2211/008* (2013.01)

(58) Field of Classification Search
    USPC ......... 296/193.04, 210, 203.03, 203.01, 204, 296/193.09, 209, 205, 203.04
    See application file for complete search history.

(56) References Cited

U.S. PATENT DOCUMENTS

| | | | |
|---|---|---|---|
| 11,732,323 B2 * | 8/2023 | Kim | .................... C23C 2/28 428/653 |
| 2009/0160217 A1 | 6/2009 | Kimura et al. | |
| 2013/0160889 A1 | 6/2013 | Aratani et al. | |
| 2015/0274218 A1 | 10/2015 | Takagi et al. | |
| 2020/0087747 A1 | 3/2020 | Kim et al. | |
| 2020/0094885 A1 | 3/2020 | Kubo et al. | |
| 2021/0002741 A1 | 1/2021 | Yabu et al. | |
| 2021/0164082 A1 | 6/2021 | Nagano et al. | |

FOREIGN PATENT DOCUMENTS

| | | |
|---|---|---|
| JP | 2008-280609 A | 11/2008 |
| JP | 2012-167358 A | 9/2012 |
| JP | 2015-58810 A | 3/2015 |
| JP | 2018-90874 A | 6/2018 |
| JP | 6418363 B1 | 11/2018 |
| WO | WO 2014/077294 A1 | 5/2014 |
| WO | WO 2018/117543 A1 | 6/2018 |
| WO | WO2018/174082 A1 | 9/2018 |
| WO | WO 2020/022481 A1 | 1/2020 |
| WO | WO 2020/071523 A1 | 4/2020 |

* cited by examiner

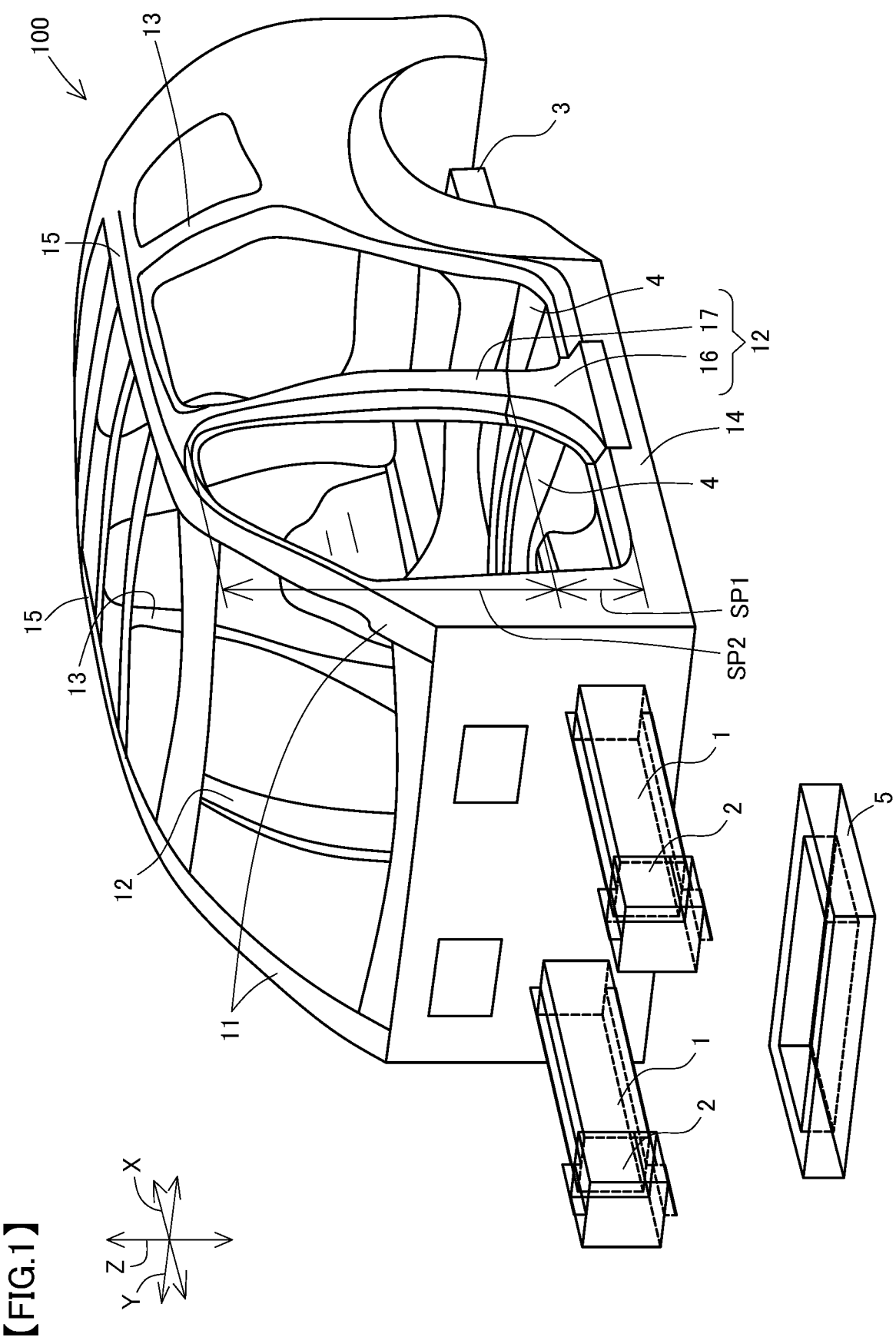
[FIG.1]

[FIG.2]
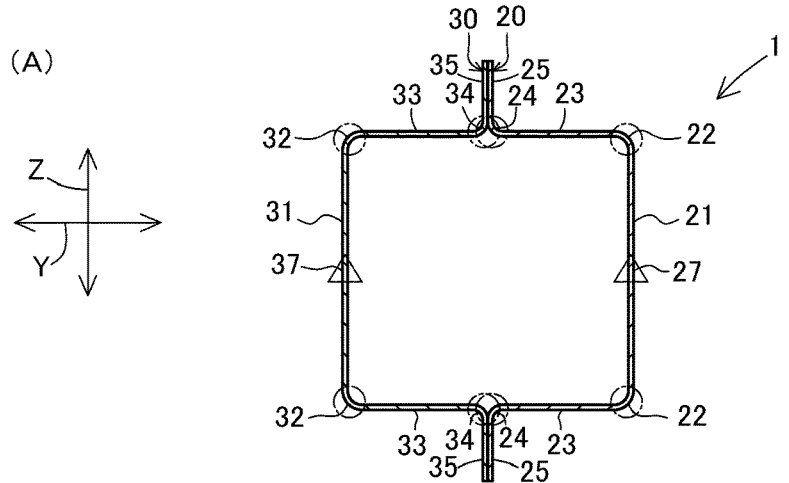
FRONT SIDE MEMBER (AXIAL COLLAPSE MEMBER)
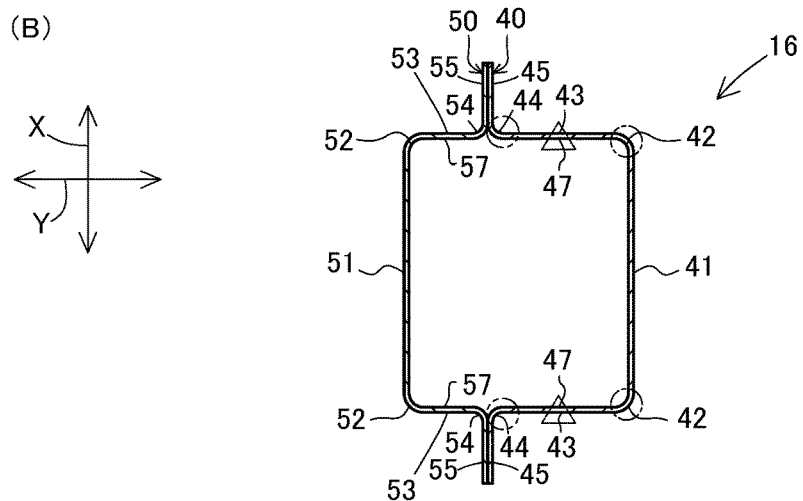
CENTER PILLAR BASE (BENDING DEFORMATION MEMBER; SHORT SPAN)
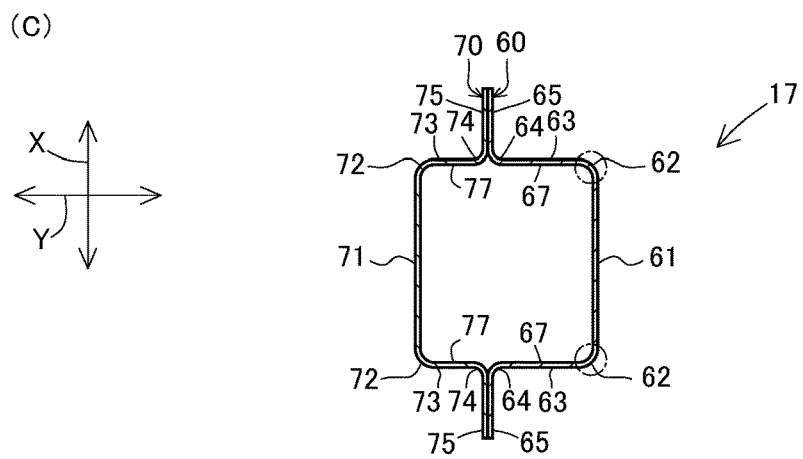
CENTER PILLAR BODY (BENDING DEFORMATION MEMBER; LONG SPAN)

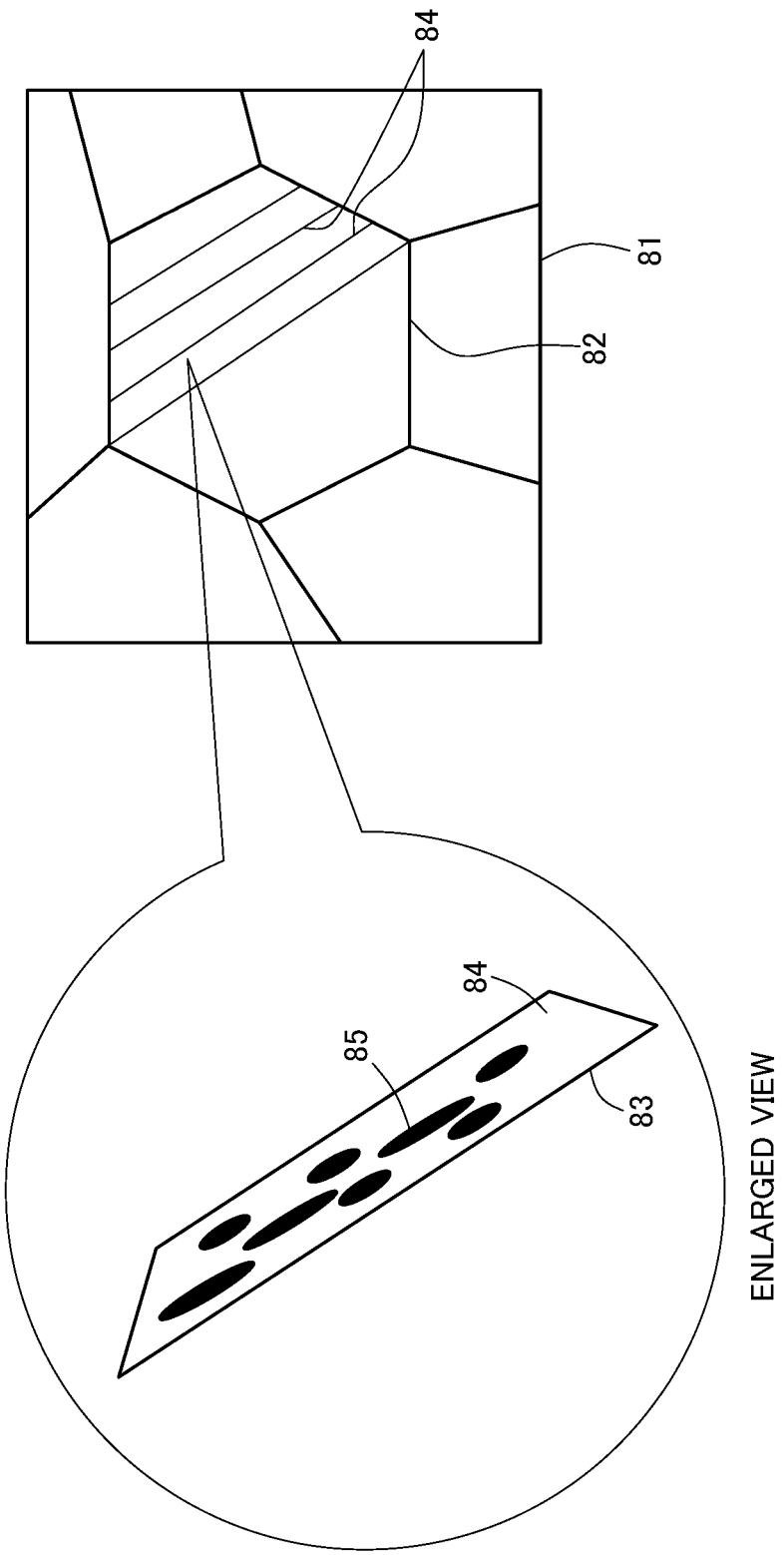
[FIG.3]

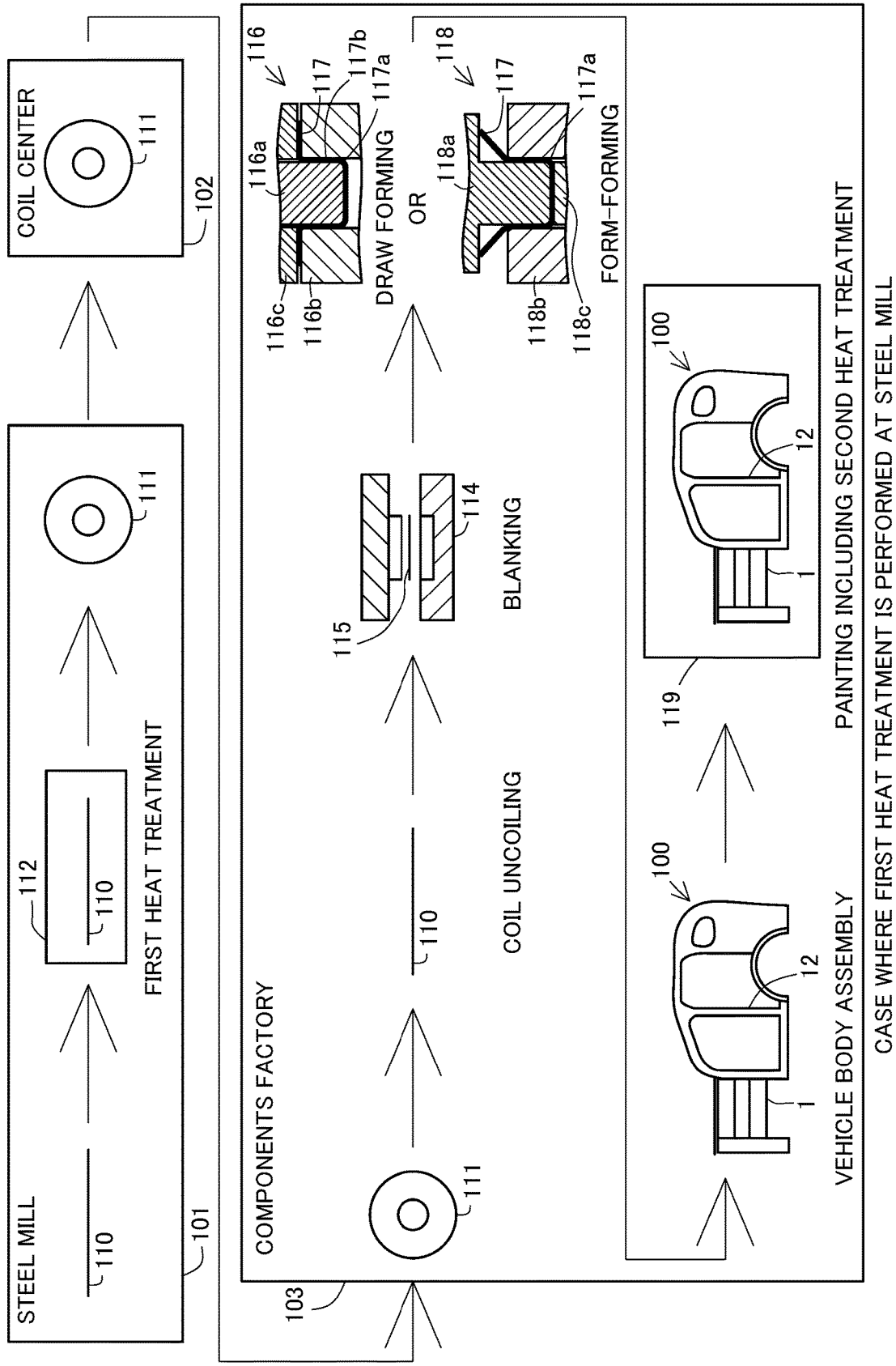

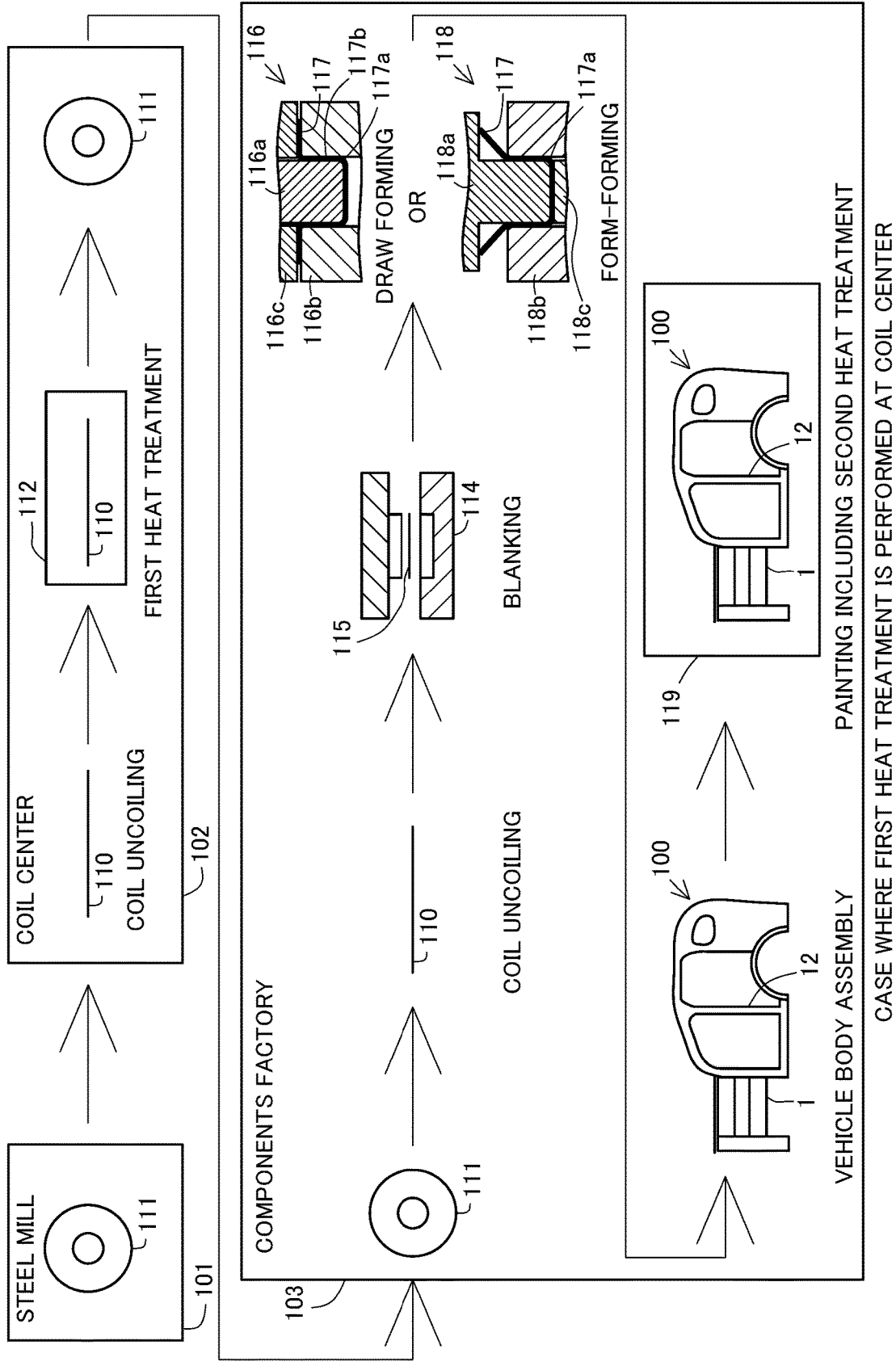

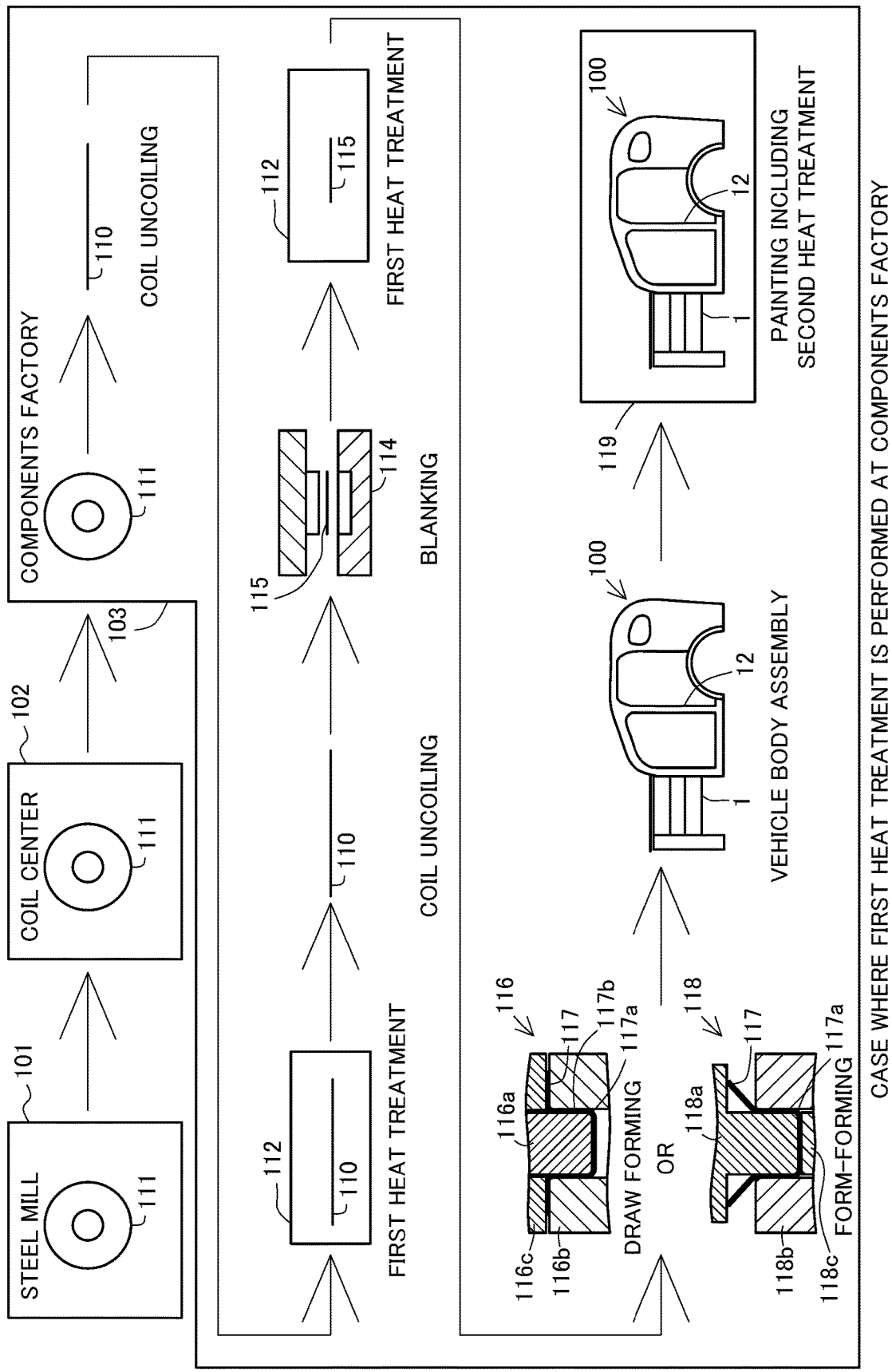
[FIG.6]

[FIG.7]
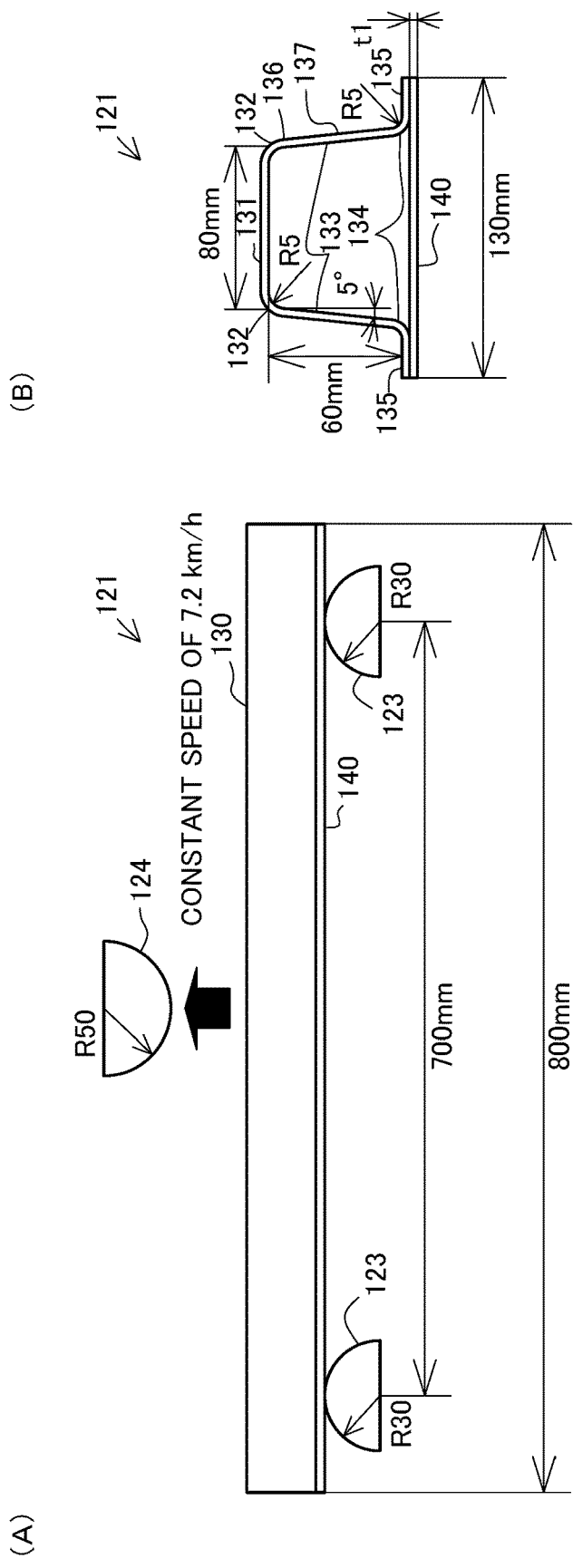

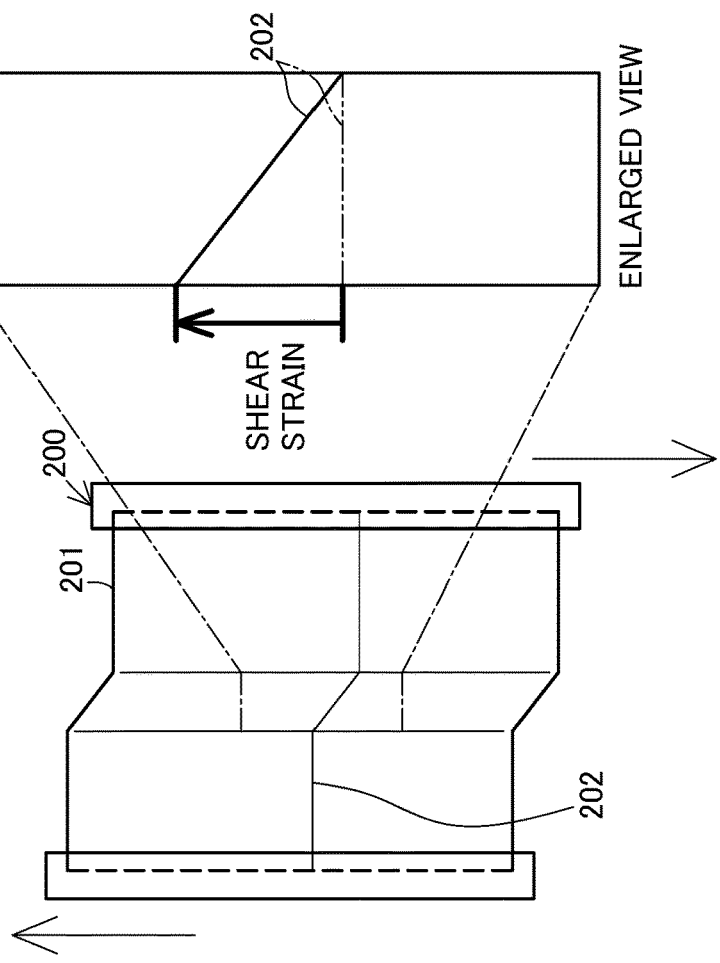
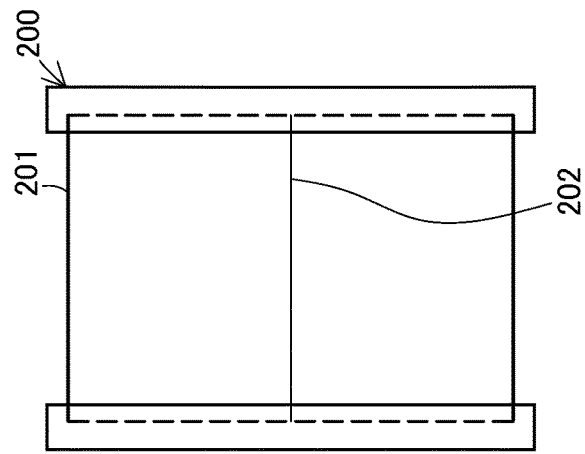
[FIG.8]

[FIG.9]
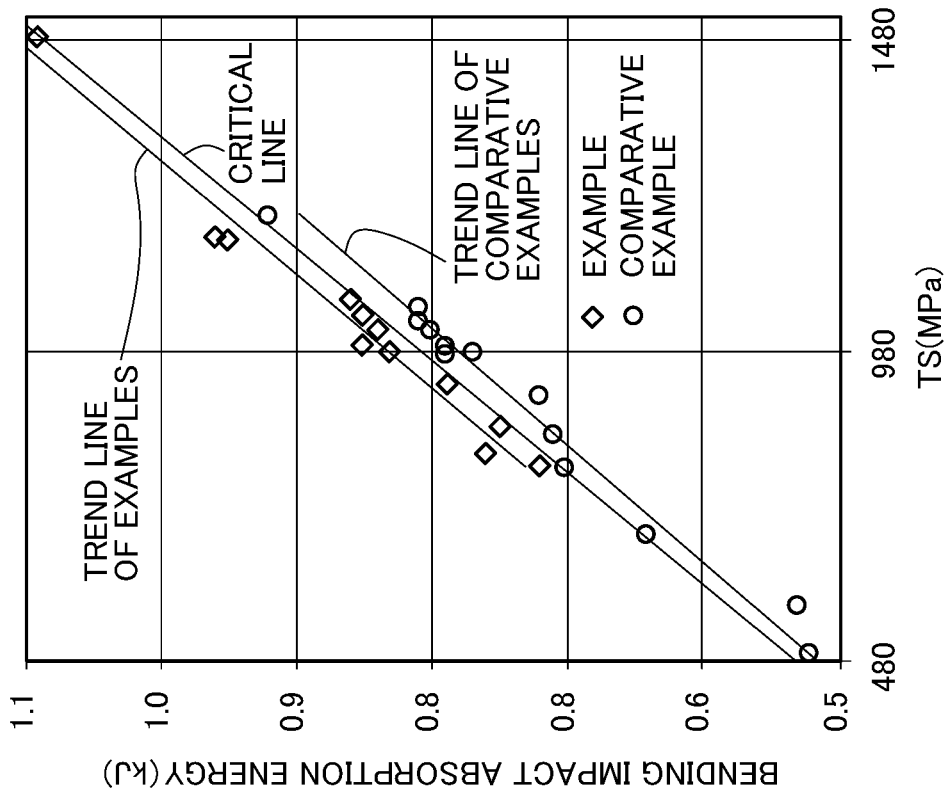
(A)
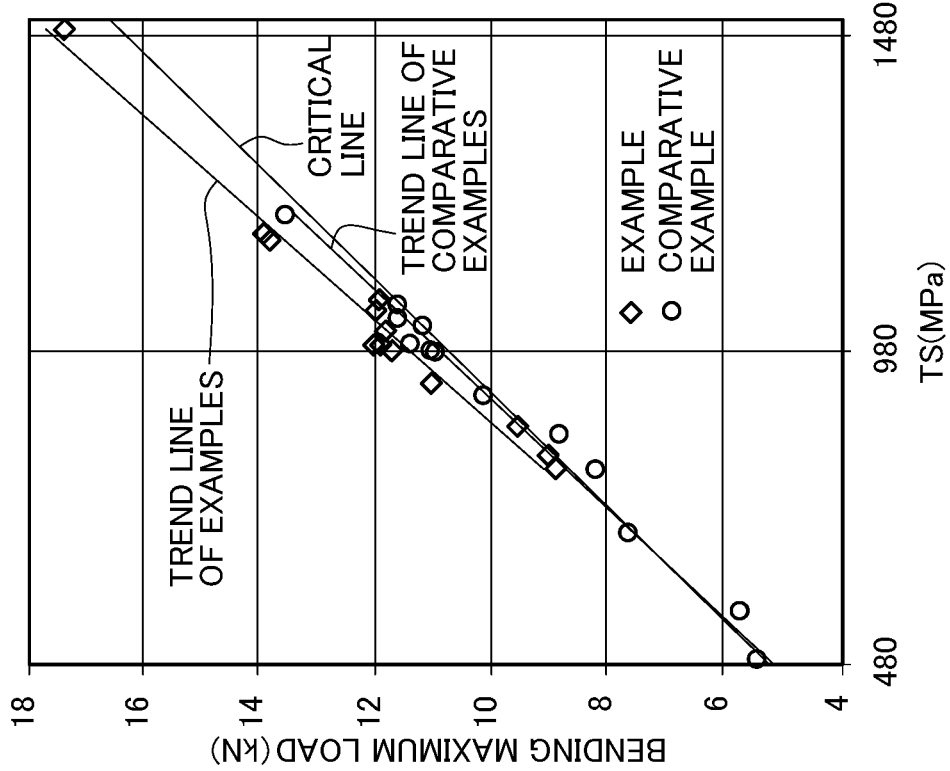
(B)

[FIG.10]
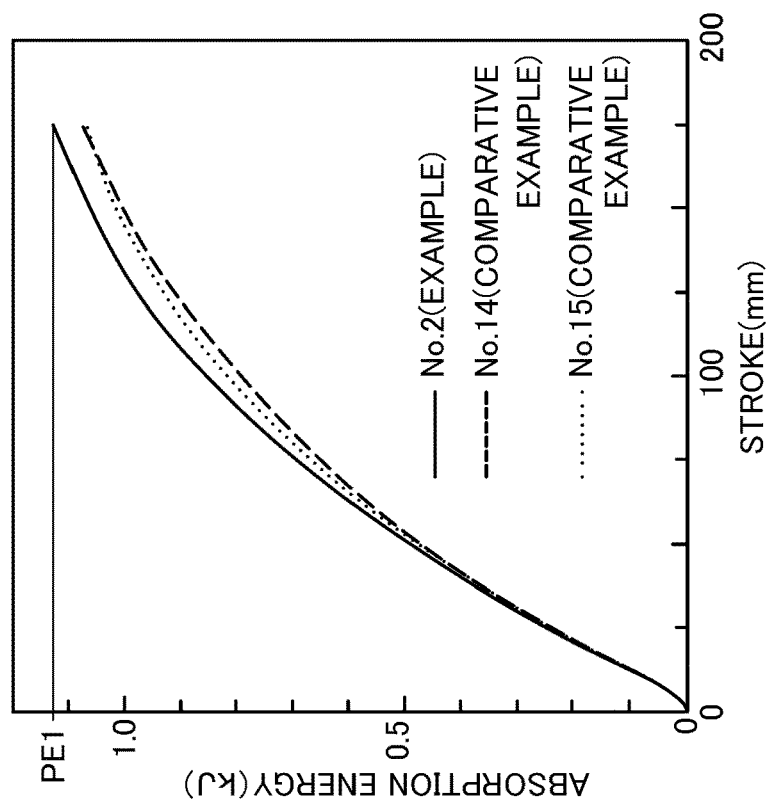
(A)
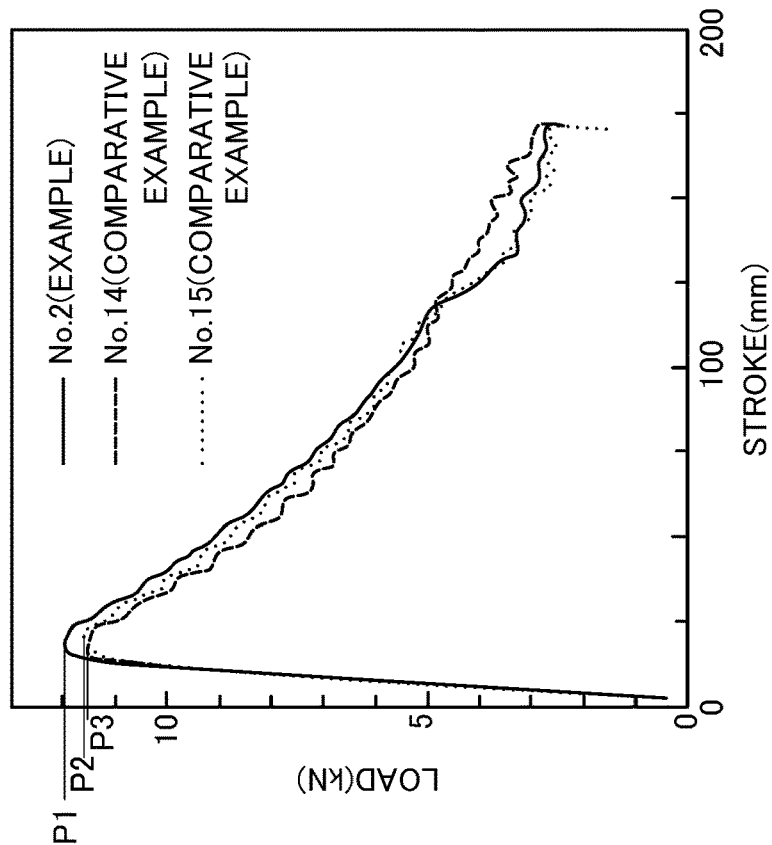
(B)

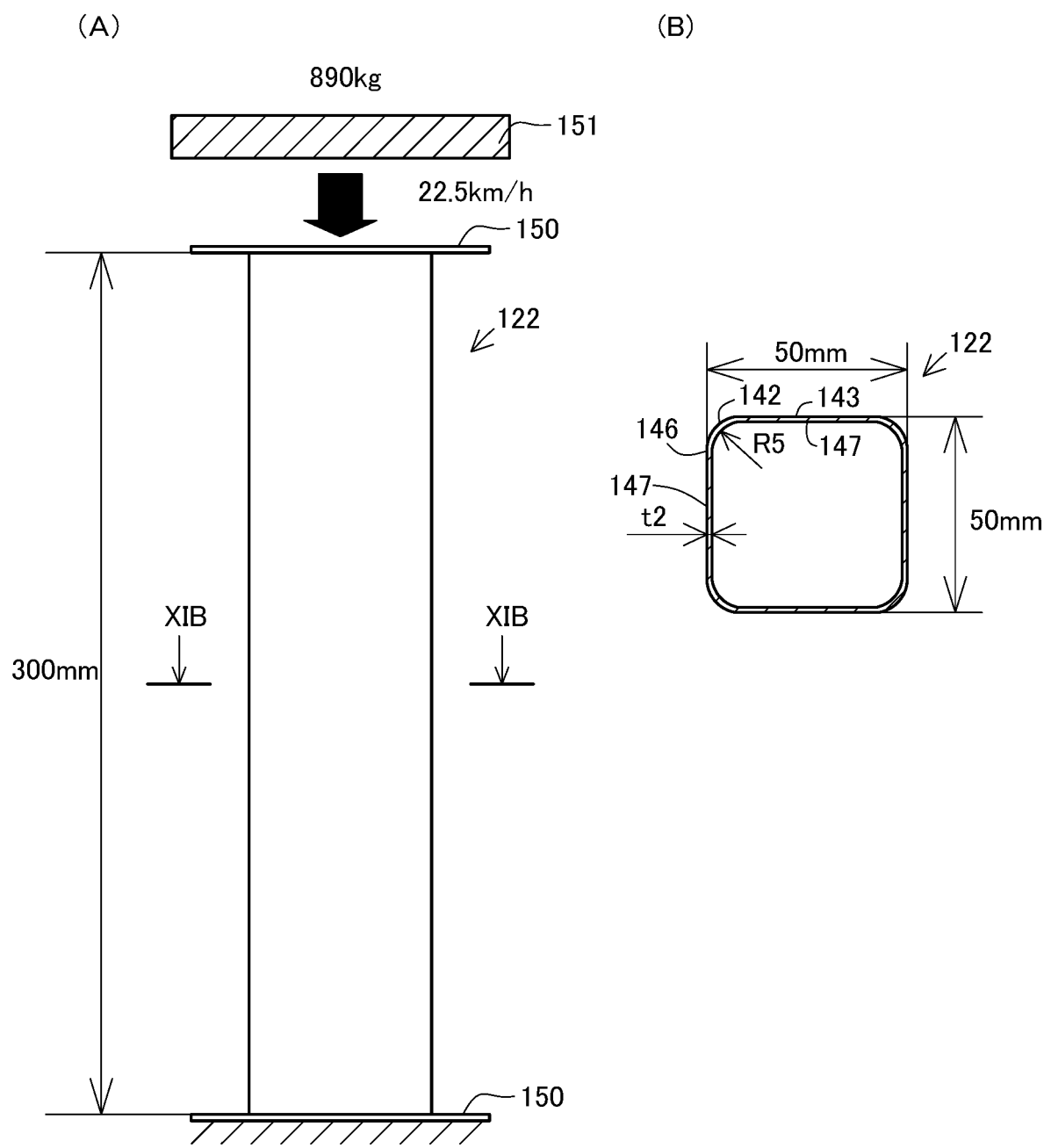
[FIG.11]

[FIG.12]
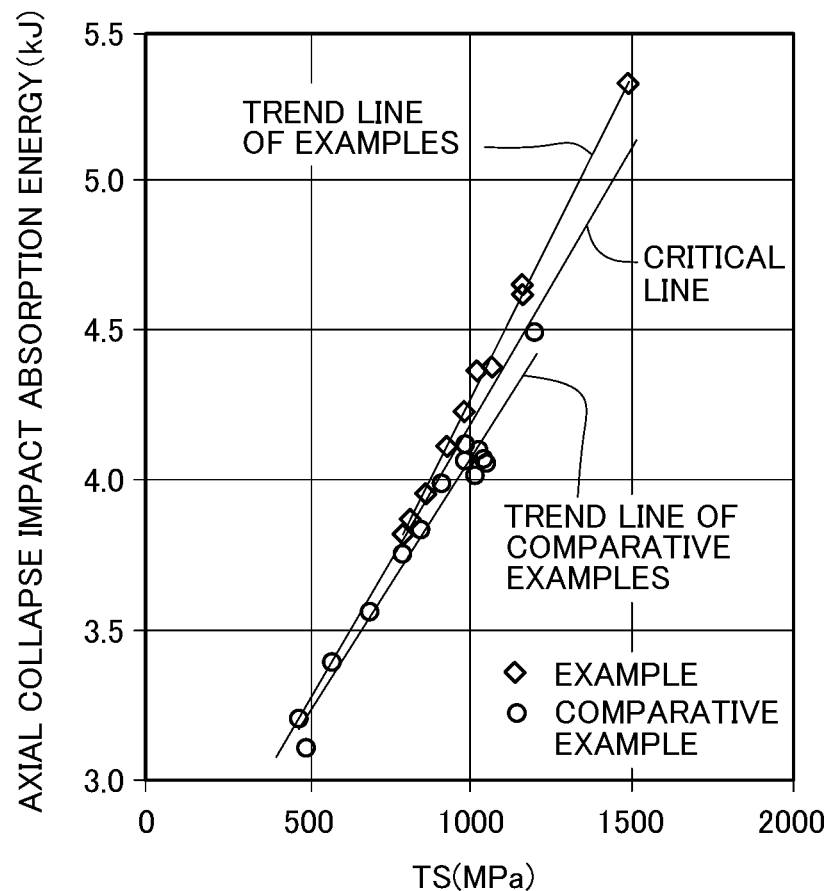

SHOCK ABSORBING MEMBER, METHOD FOR PRODUCING SHOCK ABSORBING MEMBER, AND METHOD FOR PRODUCING STEEL SHEET FOR COLD PLASTIC WORKING

TECHNICAL FIELD

The present invention relates to an shock absorbing member, a method for producing an shock absorbing member, and a method for producing a steel sheet for cold plastic working.

BACKGROUND ART

In recent years, the application of high-strength steel sheets as vehicle body members has been expanding from the viewpoint of achieving reductions in weight that contribute to improving the fuel efficiency of automobiles (for example, see Patent Documents 1 to 7).

LIST OF PRIOR ART DOCUMENTS

Patent Document

Patent Document 1: JP2008-144233A
Patent Document 2: WO 2018/174082
Patent Document 3: JP2015-58810A
Patent Document 4: WO 2014/077294
Patent Document 5: JP6418363B
Patent Document 6: WO 2020/022481
Patent Document 7: WO 2020/071523

SUMMARY OF INVENTION

Technical Problem

For the purpose of ensuring the safety of occupants, there is a desire to improve crashworthiness, and a starting material that can further increase the impact absorption energy at the time of a crash of an automobile while also having high strength is needed.

In view of the above background, an objective of the present invention is to provide an shock absorbing member which can increase impact absorption energy and which also enables thinning of a steel sheet that is a starting material, a method for producing an shock absorbing member, and a method for producing a steel sheet for cold plastic working.

Solution to Problem

The gist of the present invention is a shock absorbing member, a method for producing a shock absorbing member, and a method for producing a steel sheet for cold plastic working which are described hereunder.

(1) A shock absorbing member that includes a ridge portion formed in a curved shape as viewed from a longitudinal direction, and a wall portion extending from the ridge portion, wherein:
  in the wall portion, a ratio $\sigma_5/\tau_5$ between a tensile stress σs when an elongation in a tensile test is 5% and a shear stress $\tau_5$ when a shear strain in a shear test is 5√3% is 1.70 or less, or a ratio $\sigma_{10}/\tau_{10}$ between a tensile stress σm when an elongation in a tensile test is 10% and a shear stress $\tau_{10}$ when a shear strain in a shear test is 10√3% is 1.70 or less; and
  a Vickers hardness Hvc at a center portion of the wall portion as viewed from the longitudinal direction is 250 or more.

(2) The shock absorbing member according to the above (1), wherein a ratio Hvr/Hvc between a Vickers hardness Hvr of the ridge portion and the Vickers hardness Hvc at the center portion of the wall portion is 1.05 or more.

(3) The shock absorbing member according to the above (2), wherein the ratio Hvr/Hvc between the Vickers hardnesses is 1.10 or more.

(4) The shock absorbing member according to any one of the above (1) to the above (3), wherein the shock absorbing member is a pillar, a side sill, or a roof side rail.

(5) The shock absorbing member according to the above (1), wherein:
  the shock absorbing member is a member having a closed cross section; and
  a ratio Hvr/Hvc between a Vickers hardness Hvr of the ridge portion and the Vickers hardness Hvc at the center portion of the wall portion is less than 1.10.

(6) The shock absorbing member according to the above (1) or the above (5), wherein the shock absorbing member is a front side member, a crash box, a rear side member, a sub-frame or a floor cross member.

(7) The shock absorbing member according to any one of the above (1) to the above (6), wherein a tensile strength of the shock absorbing member is 780 MPa or more.

(8) A method for producing a shock absorbing member, including:
  a first heat treatment process of subjecting a steel sheet to a heat treatment in which the steel sheet is held at a temperature T1 satisfying Formula (1) below for 60 to 900 seconds;
  a cold plastic working process of performing cold plastic working on the steel sheet after the heat treatment to form a steel member; and
  a second heat treatment process of subjecting the steel member to a heat treatment in which the steel member is held at a temperature T2 that is within a range of 80 to 200° C. for 300 to 1800 seconds;
  wherein:
  in the steel sheet, an area fraction of martensite is 5% or more and less than 95%, a tensile strength is 780 MPa or more, and a ratio Cmax/Cmin between a maximum value Cmax and a minimum value Cmin of a content of Si in a cross section in a thickness direction is 1.25 or less:

$$80 \times Si + 100 \leq T1 \leq 125 \times Si + 250 \quad (1)$$

where, Si in the above Formula (1) means a content (mass %) of Si in the steel sheet.

(9) The method for producing a shock absorbing member according to the above (8), wherein:
  the shock absorbing member includes a ridge portion formed in a curved shape as viewed from a longitudinal direction, and a wall portion extending from the ridge portion, and
  the cold plastic working is form-forming.

(10) The method for producing a shock absorbing member according to the above (8), wherein:
  the shock absorbing member includes a ridge portion formed in a curved shape as viewed from a longitudinal direction, and a wall portion extending from the ridge portion, and
  the cold plastic working is draw forming.

(11) The method for producing a shock absorbing member according to any one of the above (8) to the above (10), wherein:

the steel sheet is a dual phase steel sheet.

(12) The method for producing a shock absorbing member according to any one of the above (8) to the above (11), wherein:

the first heat treatment process is performed on the steel sheet after final annealing and before coiling into a coil.

(13) The method for producing a shock absorbing member according to any one of the above (8) to the above (11), wherein:

the first heat treatment process is performed on the steel sheet that is coiled after final annealing and is uncoiled or uncoiled and subjected to bending-straightening.

(14) The method for producing a shock absorbing member according to any one of the above (8) to the above (11), wherein:

the first heat treatment process is performed on the steel sheet that is coiled after final annealing and is uncoiled, subjected to bending-straightening, and subjected to blanking.

(15) A method for producing a steel sheet for cold plastic working, including:

subjecting a steel sheet in which an area fraction of martensite is 5% or more and less than 95%, a tensile strength is 780 MPa or more, and a ratio Cmax/Cmin between a maximum value Cmax and a minimum value Cmin of a content of Si in a cross section in a thickness direction is 1.25 or less to a heat treatment in which the steel sheet is held at a temperature T1 satisfying Formula (1) below for 60 to 900 seconds:

$$80 \times Si + 100 \leq T_1 \leq 125 \times Si + 250 \quad (1)$$

where, Si in the above Formula (1) means a content (mass %) of Si in the steel sheet.

Advantageous Effects of Invention

According to the present invention, impact absorption energy can be increased and a steel sheet that is a starting material can be made thin.

BRIEF DESCRIPTION OF DRAWINGS

FIG. 1 is a schematic perspective view illustrating principal parts of an automobile body having a shock absorbing member according to an embodiment of the present invention.

FIG. 2(A) is a cross-sectional view of a front side member, and illustrates a state in which the front side member is viewed in a longitudinal direction. FIG. 2(B) is a cross-sectional view of a center pillar base, and illustrates a state in which the center pillar base is viewed in a height direction. FIG. 2(C) is a cross-sectional view of a center pillar body, and illustrates a state in which the center pillar body is viewed in the height direction.

FIG. 3 is an image diagram illustrating a precipitation state of precipitates in a high-strength steel sheet as the starting material of a shock absorbing member according to the present embodiment.

FIG. 4 is a schematic diagram illustrating processes for producing a shock absorbing member from a high-strength steel sheet, and illustrates a case where a first heat treatment process is performed at a steel mill that produces a high-strength steel sheet.

FIG. 5 is a schematic diagram illustrating processes for producing a shock absorbing member from a high-strength steel sheet, and illustrates a case where a first heat treatment process is performed at a coil center.

FIG. 6 is a schematic diagram illustrating processes for producing a shock absorbing member from a high-strength steel sheet, and illustrates a case where a first heat treatment process is performed at a components factory (forming factory) for shock absorbing members.

FIG. 7(A) is a side view of a bending component as viewed from a direction orthogonal to the longitudinal direction, and FIG. 7(B) is a view of the bending component as viewed from the longitudinal direction.

FIG. 8(A) is a schematic diagram illustrating a shear test. FIG. 8(B) is an explanatory diagram relating to a shear test.

FIG. 9(A) is a graph illustrating a relation between tensile strength and a bending load. FIG. 9(B) is a graph illustrating a relation between tensile strength and impact absorption energy at a time of bending deformation.

FIG. 10(A) is a graph illustrating one example of a relation between the amount of deformation (stroke) of a bending member in a direction perpendicular to the length of the bending member and a load arising at the bending member. FIG. 10(B) is a graph illustrating one example of a relation between the amount of deformation (stroke) of a bending member in a direction perpendicular to the length of the bending member and the absorption energy of the bending member.

FIG. 11(A) is a side view of an axial collapse component, and FIG. 11(B) is a cross-sectional view along a line XIB-XIB in FIG. 11(A).

FIG. 12 is a graph illustrating the relation between tensile strength and impact absorption energy at a time of axial collapse deformation.

DESCRIPTION OF EMBODIMENTS

Hereunder, first, the circumstances leading to the conception of the present invention will be described, and then an embodiment will be described in detail.

<Circumstances Leading to Conception of Present Invention>

In order to reduce the weight of automobile bodies, the thinning of walls of vehicle body members that constitute automobile bodies has been proceeding. A shock absorbing member is included among such vehicle body members. A shock absorbing member is a member that absorbs an impact when an automobile collides with an object. An axial collapse component and a bending component can be mentioned as examples of a shock absorbing member.

An axial collapse component absorbs an impact by collapsing while being compressed in the axial direction of the axial collapse component. A front side member, a crash box, a rear side member, a sub-frame, and a floor cross member can be mentioned as examples of an axial collapse component.

A bending component absorbs an impact by bending and deforming while receiving a bending force. An A pillar, a center pillar (B pillar), a C pillar, a side sill, and a roof side rail can be mentioned as examples of a bending component.

This kind of shock absorbing member is sometimes formed by cutting a cold-rolled steel sheet (hereinafter, such a cold-rolled steel sheet is also referred to as a "high-strength steel sheet" or a "steel sheet for cold plastic working"), and then performing press forming, painting, and bake finishing (bake hardening treatment) after the painting. Normally, a steel sheet that is the starting material for such a shock absorbing member is subjected to a baking treatment as a heat treatment after final annealing. Further, it has generally been considered that if tempering is performed after the aforementioned final annealing, the bake hardening value, to the contrary, decreases. However, as a result of diligent research, the inventors of the present application obtained the finding that by performing tempering under specific conditions after final annealing, and thereafter performing a bake hardening treatment, the amount of hardening obtained by bake hardening can be increased, which led to the idea of the present invention.

DESCRIPTION OF EMBODIMENT

Hereunder, an embodiment of the present invention is described while referring to the accompanying drawings.
<Automobile Body>
FIG. 1 is a schematic perspective view illustrating principal parts of an automobile body 100 (hereinafter, referred to simply as "vehicle body 100") having a shock absorbing member according to one embodiment of the present invention. Referring to FIG. 1, the vehicle body 100 is, for example, the body of a passenger vehicle. A sedan-type passenger vehicle, a coupe-type passenger vehicle, a hatch-back-type passenger vehicle, a minivan-type passenger vehicle, an SUV (Sport Utility Vehicle) type passenger vehicle and the like can be mentioned as examples of the passenger vehicle.

In the present embodiment, the vehicle length direction, vehicle width direction and vehicle height direction of the vehicle body 100 are referred to as longitudinal direction X, width direction Y, and height direction Z, respectively.

The vehicle body 100 has, as axial collapse components that are shock absorbing members, front side members 1, crash boxes 2, a rear side member 3, floor cross members 4, and a sub-frame 5. These axial collapse components absorb an impact by plastically deforming and contracting while collapsing in the axial direction of the relevant axial collapse component at the time of a crash of the automobile.

Further, the vehicle body 100 has, as bending components that are shock absorbing members, A pillars 11, center pillars 12, C pillars 13, side sills 14, and roof side rails 15. The bending components absorb an impact by bending and deforming (plastically deforming) at the time of a crash of the automobile.

Note that, heat treatments which each axial collapse component is subjected to which are performed from the state of the steel sheet that is the starting material until the axial collapse component is formed are the same for each of the axial collapse components. Hence, hereunder, the front side member 1 is described as an example of the axial collapse components, and a detailed description of the other axial collapse components is omitted. Similarly, heat treatments which each bending component is subjected to which are performed from the state of the steel sheet that is the starting material until the bending component is formed are the same for each of the bending component. Hence, hereunder, the center pillar 12 is described as an example of the bending components, and a detailed description of the other bending components is omitted.
<Front Side Member>
FIG. 2(A) is a cross-sectional view of the front side member 1, and illustrates the state of the front side member 1 as viewed in the longitudinal direction X. The front side member 1 illustrated in FIG. 1 and FIG. 2(A) is configured so as to collapse along the longitudinal direction X when an impact load is applied from the front of the automobile. That is, the front side member 1 is used as a shock absorbing member at the time of an automobile crash, particularly at the time of a frontal crash. A left and right pair of the floor side members 1 are arranged at the front part of the vehicle body 100.

The front side member 1 is a hollow member having a closed cross section that is formed by welding a plurality of steel sheets, and is formed in an elongated beam shape with the longitudinal direction X as the longitudinal direction. At least at one part in the longitudinal direction X of the front side member 1, a cross section orthogonal to the longitudinal direction X constitutes a closed cross section. Note that, the term "closed cross section" means that at least at one part in the longitudinal direction of a member, the relevant member is formed in an endless annular shape in a cross section orthogonal to the longitudinal direction. The closed cross-sectional shape is, for example, a rectangular shape.

The front side member 1 has a first half part 20 which constitutes one side portion of the front side member 1 in the width direction Y, and a second half part 30 which constitutes the other side portion of the front side member 1 in the width direction Y.

The first half part 20 and the second half part 30 are each formed in a thin sheet shape by subjecting a steel sheet to press working. The steel sheet is preferably a high-strength steel sheet, and the tensile strength of the steel sheet is preferably 780 MPa or more. The steel sheet is more preferably an ultra-high strength steel sheet, and the tensile strength in this case is preferably 980 MPa or more, more preferably 1180 MPa, and further preferably 1470 MPa or more. By forming the front side member 1 as a shock absorbing member from a high-strength steel sheet in this way, sufficient impact absorption energy can be generated while also thinning the sheet thickness of the front side member 1.

The first half part 20 and the second half part 30 are each formed in a hat shape as viewed from the longitudinal direction X. The first half part 20 and the second half part 30 form the front side member 1 by being integrated together by flange joining. Note that, either one of the first half part 20 and the second half part 30 may be formed in a flat plate shape which is not bent as viewed from the longitudinal direction X. Further, the first half part 20 and the second half part 30 may be integrally formed by means of a tubular member formed in an annular shape (for example, a polygonal annular shape such as a rectangle, a circular shape, or an elliptical shape) as viewed from the longitudinal direction X (for example, see FIG. 11(B) which is described later). Note that, hereinafter, unless otherwise specified, the front side member 1 is described based on a state in which the front side member 1 is viewed from the longitudinal direction X.

The first half part 20 has a first wall portion 21, a pair of first ridge portions 22, 22, a pair of second wall portions 23, 23, a pair of second ridge portions 24, 24, and a pair of flanges 25, 25.

In the present embodiment, the first wall portion 21 is a vertical wall, and is a ceiling wall in the hat shape of the first half part 20, and extends straight in the height direction Z. The pair of first ridge portions 22, 22 are continuous with a pair of end portions of the first wall portion 21 in the height direction Z. In the present embodiment, each first ridge portion 22 is formed in a curved shape as viewed from the longitudinal direction X, and has a predetermined radius of curvature. Each first ridge portion 22 advances so as to face inward in the width direction Y progressively from the first wall portion 21 toward the second wall portion 23. The pair of second wall portions 23, 23 are continuous with the pair of first ridge portions 22, 22. In the present embodiment, the second wall portion 23 is a lateral wall, and in the hat shape of the first half part 20 each of the second wall portions 23 is a vertical wall connecting the ceiling wall (first wall portion 21) and the corresponding flange 25, and extends straight in the width direction Y as viewed in the longitudinal direction X. Note that, the pair of second wall portions 23, 23 may extend in a tapered shape so that the distance therebetween increases progressively toward the center side of the front side member 1 in the width direction Y.

The pair of second ridge portions 24, 24 are continuous with the end portions on the vehicle interior side of the pair of second wall portions 23, 23 in the width direction Y. In the present embodiment, each of the second ridge portions 24 is formed in a curved shape as viewed from the longitudinal direction X, and has a predetermined radius of curvature. One of the second ridge portions 24 advances upward from the corresponding second wall portion 23. The other second ridge portion 24 advances downward from the corresponding second wall portion 23.

In the configuration described above, the boundary between the first ridge portion 22 and the first wall portion 21, and the boundary between the first ridge portion 22 and the second wall portion 23 are the portions at which the radius of curvature changes as viewed in the longitudinal direction X. Similarly, the boundary between the second ridge portion 24 and the second wall portion 23, and the boundary between the second ridge portion 24 and the flange 25 are the portions at which the radius of curvature changes as viewed in the longitudinal direction X.

With the configuration described above, the first wall portion 21 and the second wall portion 23 extend from the first ridge portion 22, and the second wall portion 23 and the flange 25 extend from the second ridge portion 24.

The second half part 30 has a first wall portion 31, a pair of first ridge portions 32, 32, a pair of second wall portions 33, 33, a pair of second ridge portions 34, 34, and a pair of flanges 35, 35.

In the present embodiment, the second half part 30 is formed in a shape that is symmetrical to the shape of the first half part 20 in the width direction Y. Therefore, a description of each part of the second half part 30 will be omitted. The first half part 20 and the second half part 30 are fixed to each other by joining the pair of flanges 25, 25 to the pair of flanges 35 and 35. Methods for joining the pair of flanges 25, 25 to the pair of flanges 35, 35 include welding such as spot welding, laser welding, or arc welding, mechanical joining such as riveting, caulking, or bolt fastening, and bonding using an adhesive or the like.

With regard to the front side member 1 of the present embodiment, in wall portions of the front side member 1, that is, the first wall portion 21, the pair of second wall portions 23, 23, and the pair of flanges 25, 25, a ratio $\sigma_{10}/\tau_{10}$ between a tensile stress $\sigma_{10}$ when the elongation in a tensile test is 10% and a shear stress $\tau_{10}$ when the shear strain in a shear test is $10\sqrt{3}$% (approximately 17.32%) is 1.70 or less. When the first half part 20 is formed using a steel sheet that is excellent in bake hardenability, the ratio $\sigma_{10}/\tau_{10}$ is 1.70 or less. As a result, crashworthiness (for example, axial crushing performance) is improved. The reason the ratio $\sigma_{10}/\tau_{10}$ when the shear strain is $\sqrt{3}$ times the elongation is adopted is that when nominal strain (elongation) in a tensile test is converted to shear strain in a shear test (with the same equivalent strain as the tensile test) in accordance with the yield criterion of von Mises, the conversion factor is $\sqrt{3}$. In the present description, unless otherwise specified, the term "stress" refers to nominal stress, that is, (load/initial test specimen cross-sectional area).

In the present embodiment, the first half part 20 of the front side member 1 is produced using a cold-rolled steel sheet having high bake hardenability. Therefore, the ratio $\sigma_{10}/\tau_{10}$ in a wall portion whose hardness or strength has been further increased by a bake hardening heat treatment is 1.70 or less. A steel sheet having such properties can be produced by optimizing the production process as described in detail later. As necessary, the upper limit of the ratio $\sigma_{10}/\tau_{10}$ may be set to 1.65, 1.60, 1.56 or 1.53. Whilst it is not particularly necessary to set a lower limit of the ratio $\sigma_{10}/\tau_{10}$, the lower limit may be set to 1.10, 1.20 or 1.30.

Note that, because the $\sigma/\tau$ ratio decreases as the strain increases, in a case where a "ratio $\sigma_5/\tau_5$" that is described later is 1.70 or less, the ratio $\sigma_{10}/\tau_{10}$ also becomes 1.70 or less. Therefore, setting the ratio $\sigma_{10}/\tau_{10}$ to 1.70 or less may be changed to setting the ratio $\sigma_5/\tau_5$ to 1.70 or less.

Further, in the front side member 1, a Vickers hardness Hvc at a center portion 27 of the first wall portion 21 is 250 or more, that is, Hvc≥250. In the present description, the term "Vickers hardness" refers to a hardness according to the "Vickers hardness test-test method" described in JIS Z 2244 (2009). The Vickers hardness in this case is HV 0.5, which is the Vickers hardness when the test force is 4.903 N (0.5 kgf), and five points are measured and the average value thereof is adopted as the test result. The center portion 27 is the center portion of the first wall portion 21 which is the wall portion between the pair of first ridge portions 22, 22. By making the tensile strength of the steel sheet constituting the front side member 1 a tensile strength of 780 MPa, Hvc≤250 can be realized. In other words, by Hvc being 250, it can be presumed that the tensile strength of the steel sheet constituting the front side member 1 is 780 MPa. As necessary, a lower limit of Hvc may be set to 270, 290, 310 or 340. Whilst it is not particularly necessary to set an upper limit of Hvc, the upper limit may be set to 500, 450, 410 or 370.

Further, in the front side member 1, a ratio Hvr/Hvc between a Vickers hardness Hvr of the first ridge portion 22 and the Vickers hardness Hvc at the center portion 27 of the first wall portion 21 that is continuous with the first ridge portion 22 is less than 1.10. By making this ratio Hvr/Hvc less than 1.10, the material contributing to axial collapse resistance can be ensured, and the crashworthiness is improved. The ratio Hvr/Hvc is more preferably less than 1.09, less than 1.07 or less than 1.06. Note that, the ratio Hvr/Hvc is preferably 1.00 or more. If the ratio Hvr/Hvc is less than 1.00, there will be a marked strength difference between the first ridge portion 22 and the center portion 27, and consequently rupturing will easily occur at the boundary therebetween. Therefore, it is desirable for this ratio to be 1.00 or more. As necessary, the lower limit of this ratio may be set to 1.02 or 1.04.

Note that, the relation of the ratio $\sigma_{10}/\tau_{10}$ between the tensile stress $\sigma_{10}$ and the shear stress $\tau_{10}$ in the wall portions of the first half part 20 described above similarly holds with respect to the relation of the ratio $\sigma_{10}/\tau_{10}$ between a tensile stress am and a shear stress $\tau_{10}$ at the first wall portion 31, the pair of second wall portions 33, 33, and the pair of flanges 35, 35 of the second half part 30. Furthermore, the ratio Hvr/Hvc between the Vickers hardness of the first ridge portion 22 and the Vickers hardness at the center portion 27 of the first wall portion 21 described above similarly holds with respect to the relation of the ratio Hvr/Hvc between the Vickers hardness of the first ridge portion 32 and the Vickers hardness at a center portion 37 of the first wall portion 31 in the second half part 30.

As described above, the front side member 1 satisfies conditions (a1) that the ratio $\sigma_{10}/\tau_{10}$ in the wall portions (the first wall portion 21, the pair of second wall portions 23, 23, and the pair of flanges 25, 25 or the like) is made ≤1.70, and (a2) that the Vickers hardness Hvc at the center portion 27 of the first wall portion 21 is made ≤250, and as a more preferable configuration, satisfies all of three conditions that include, in addition to (a1) and (a2), a condition (a3) that a ratio Hvr/Hvc between the Vickers hardness Hvr of the first ridge portion 22 and the Vickers hardness at the center portion 27 of the first wall portion 21 is made <1.10. According to this configuration, when the front side member 1 is produced (including a baking treatment) using a cold-rolled steel sheet excellent in bake hardenability that is suitable as a steel sheet for automobiles which has a tensile strength of 780 MPa or more, the aforementioned σ/τ ratio characteristic (ratio $\sigma_{10}/\sigma_{10}$≤1.70) is satisfied, and the crashworthiness (axial crushing resistance property) of the front side member 1 is improved. This effect is further enhanced by the fact that the front side member 1 is formed using the first half part 20, and the second half part 30 that has the same configuration as the first half part 20.

The foregoing describes the schematic configuration of the front side member 1. Next, the configuration of the center pillar 12 will be described.

<Center Pillar>

The center pillar 12 is configured so as to deform toward the vehicle center side in the width direction Y when an impact load is received from the side of the automobile. That is, the center pillar 12 is used as a shock absorbing member when the automobile is involved in a crash, particularly at the time of a side crash. A pair of the center pillars 12 are arranged on the left and right of the vehicle body 100 at approximately the center of the cabin of the automobile in the longitudinal direction X. The center pillar 12 is joined to the side sill 14 and the roof side rail 15.

The center pillar 12 is a hollow member having a closed cross section that is formed by welding a plurality of steel sheets, and is formed in an elongated columnar shape with the height direction Z as the longitudinal direction. At least at one part in the height direction Z of the center pillar 12, a cross section orthogonal to the height direction Z constitutes a closed cross section. The closed cross-sectional shape is, for example, a rectangular shape.

The center pillar 12 has a center pillar base 16 that is joined to the side sill 14, and a center pillar body 17 that extends upwards from the center pillar base 16 and is joined to the roof side rail 15.

FIG. 2(B) is a cross-sectional view of the center pillar base 16, and illustrates the state of the center pillar base 16 as viewed in the height direction Z. In FIG. 2(B), illustration of the portion that is on the back side relative to the cross section of the center pillar base 16 in FIG. 2(B) is omitted. Referring to FIG. 1 and FIG. 2(B), the center pillar base 16 is formed at a portion near the bottom part of the center pillar 12, and extends in the height direction Z from, for example, an upper position of the side sill 14 to the height position of the upper end of the floor cross member 4. The center pillar base 16 is joined and fixed to each of the side sill 14 and the center pillar body 17 by the same method as the joining method described above with respect to the front side member 1.

The center pillar base 16 is supported at its two ends by the side sill 14 and the center pillar body 17, and a support span SP1 between the side sill 14 and the center pillar body 17 is made relatively short. Therefore, at the time of a side crash, in the center pillar base 16, a deformation occurs such that the closed cross-sectional shape at the cross section orthogonal to the height direction Z collapses.

The center pillar base 16 has a third half part 40 that constitutes the outer portion of the center pillar base 16 in the width direction Y, and a fourth half part 50 that constitutes the inner portion of the center pillar base 16 in the width direction Y.

The third half part 40 and the fourth half part 50 are each formed in a thin sheet shape by subjecting a steel sheet to press working. The steel sheet is preferably a high-strength steel sheet. The tensile strength of the steel sheet is set similarly to the tensile strength with respect to the front side member 1 that is described above, and is preferably 780 MPa or more, and more preferably 1470 MPa or more. By forming the center pillar 12 as a shock absorbing member from a high-strength steel sheet in this way, sufficient impact absorption energy can be generated while also thinning the sheet thickness of the center pillar 12.

The third half part 40 and the fourth half part 50 are each formed in a hat shape as viewed from the height direction Z. The third half part 40 and the fourth half part 50 form the center pillar base 16 by being integrated together by flange joining. Note that, either one of the third half part 40 and the fourth half part 50 may be formed in a flat plate shape which is not bent as viewed from the height direction Z. Further, the third half part 40 and the fourth half part 50 may be integrally formed by means of a tubular member formed in an annular shape (for example, a polygonal annular shape such as a rectangle, a circular shape, or an elliptical shape) as viewed from the height direction Z (for example, see FIG. 11(B) which is described later). Note that, hereinafter, unless otherwise specified, the center pillar 12 is described based on a state in which the center pillar 12 is viewed from the height direction Z.

The third half part 40 has a first wall portion 41, a pair of first ridge portions 42, 42, a pair of second wall portions 43, 43, a pair of second ridge portions 44, 44, and a pair of flanges 45, 45.

In the present embodiment, the first wall portion 41 is the external wall of the center pillar base 16. The pair of first ridge portions 42, 42 are continuous with a pair of end portions of the first wall portion 41 in the longitudinal direction X. In the present embodiment, each first ridge portion 42 is formed in a curved shape as viewed from the height direction Z, and has a predetermined radius of curvature. Each first ridge portion 42 advances so as to face inward in the width direction Y progressively from the first wall portion 41 toward the second wall portion 43. The pair of second wall portions 43, 43 are continuous with the pair of first ridge portions 42, 42. In the present embodiment, the pair of second wall portions 43, 43 are a front wall and a rear wall, and extend in the width direction Y. Note that, the pair of second wall portions 23, 23 may extend in a tapered shape so that the distance therebetween increases progressively toward the center side of the automobile in the width direction Y.

The pair of second ridge portions 44, 44 are continuous with the end portions on the vehicle interior side of the pair of second wall portions 43, 43 in the width direction Y. In the present embodiment, each of the second ridge portions 44 is formed in a curved shape as viewed from the height direction Z, and has a predetermined radius of curvature. One of the second ridge portions 44 advances frontward from the corresponding second wall portion 43. The other second ridge portion 24 advances rearward from the corresponding second wall portion 23.

In the configuration described above, the boundary between the first ridge portion 42 and the first wall portion 41, and the boundary between the first ridge portion 42 and the second wall portion 43 are the portions at which the radius of curvature changes as viewed in the height direction Z. Similarly, the boundary between the second ridge portion 44 and the second wall portion 43, and the boundary between the second ridge portion 44 and the flange 45 are the portions at which the radius of curvature changes as viewed in the height direction Z.

With the configuration described above, the first wall portion 41 and the second wall portion 43 extend from the first ridge portion 42, and the second wall portion 43 and the flange 45 extend from the second ridge portion 44.

The fourth half part 50 has a first wall portion 51, a pair of first ridge portions 52, 52, a pair of second wall portions 53, 53, a pair of second ridge portions 54, 54, and a pair of flanges 55, 55.

In the present embodiment, the fourth half part 50 is formed in a shape that is approximately symmetrical to the shape of the third half part 40 in the width direction Y. Therefore, a description of each part of the fourth half part 50 will be omitted. The third half part 40 and the fourth half part 50 are fixed to each other by joining the pair of flanges 45, 45 to the pair of flanges 55 and 55. Methods for joining the pair of flanges 45, 45 to the pair of flanges 55, 55 are the same as the joining methods described above with respect to the front side member 1.

In the center pillar base 16, in wall portions of the third half part 40, that is, the first wall portion 41, the pair of second wall portions 43, 43, and the pair of flanges 45, 45, a ratio $\sigma_5/\tau_5$ between a tensile stress $\sigma_5$ when the elongation in a tensile test is 5% and a shear stress $\tau_5$ when the shear strain in a shear test is $5\sqrt{3}\%$ (approximately 8.66%) is 1.70 or less. Because the $\sigma/\tau$ ratio decreases as the strain increases, in a case where the ratio $\sigma_5/\tau_5$ is 1.70 or less, the ratio $\sigma_{10}/\tau_{10}$ in wall portions of the third half part 40 also becomes 1.70 or less. If the third half part 40 is produced using a cold-rolled steel sheet that has low bake hardenability, it will result in the ratio $\sigma_5/\tau_5$ also becoming more than 1.70. In such case, the material will rupture immediately without plastically deforming, and sufficient crashworthiness (for example, bending performance) as a member will not be obtained. Therefore, the ratio $\sigma_5/\tau_5$ is made 1.70 or less.

In the present embodiment, the third half part 40 of the center pillar base 16 is produced using a cold-rolled steel sheet that has high bake hardenability. Therefore, the ratio $\sigma_5/\tau_5$ in wall portions whose hardness or strength has been further increased by a bake hardening heat treatment is 1.70 or less. A cold-rolled steel sheet having such properties can be produced by optimizing the production process as described in detail later. Note that, as necessary, the upper limit of the ratio $\sigma_5/\tau_5$ may be set to 1.65, 1.60, 1.56 or 1.53. Whilst it is not particularly necessary to set a lower limit of the ratio $\sigma_5/\tau_5$, the lower limit may be set to 1.10, 1.20 or 1.30.

Further, in the third half part 40 of the center pillar base 16, a Vickers hardness Hvc at a center portion 47 of the second wall portion 43 is 250 or more, that is, Hvc≥250. The center portion 47 is the center portion of the second wall portion 43 that is the wall portion between the first ridge portion 42 and the second ridge portion 44 that is continuous with the flange 45. By making the tensile strength of the steel sheet constituting the third half part 40 a tensile strength of 780 MPa, Hvc ≥250 can be realized. In other words, by Hvc being 250, it can be presumed that the tensile strength of the steel sheet constituting the third half part 40 is 780 MPa. As necessary, a lower limit of Hvc may be set to 270, 290, 310 or 340. Whilst it is not particularly necessary to set an upper limit of Hvc, the upper limit may be set to 500, 450, 410 or 370.

Further, in the center pillar base 16, a ratio Hvr/Hvc between a Vickers hardness Hvr of the first ridge portion 42 of the third half part 40 and the Vickers hardness Hvc at the center portion 47 of the second wall portion 43 that is continuous with the first ridge portion 42 is 1.05 or more. By making the ratio Hvr/Hvc 1.05 or more, work hardening can be enhanced, the strength of the material contributing to bending deformation can be ensured, and the crashworthiness is improved. By making the ratio Hvr/Hvc 1.07 or more, 1.09 or more, or 1.10 or more, the crashworthiness can be further improved. More preferably, the ratio Hvr/Hvc is made 1.12 or more, 1.14 or more or 1.15 or more. Note that, if the ratio Hvr/Hvc is more than 1.30, there will be a marked strength difference between the first ridge portion 42 and the center portion 47, and consequently rupturing will easily occur at the boundary therebetween. Therefore, it is desirable for the ratio Hvr/Hvc to be 1.30 or less. As necessary, the upper limit of this ratio may be set to 1.25 or 1.20.

Note that, the relation of the ratio $\sigma_5/\tau_5$ between the tensile stress $\sigma_5$ and the shear stress $\tau_5$ in the wall portions of the third half part 40 described above may also similarly hold or need not hold with respect to the relation of the ratio $\sigma_5/\tau_5$ between a tensile stress $\sigma_5$ and a shear stress $\tau_5$ in wall portions of the fourth half part 50, that is, the first wall portion 51, the pair of second wall portions 53, 53, or the pair of flanges 55, 55. Likewise, the ratio Hvr/Hvc between the Vickers hardness of the first ridge portion 42 and the Vickers hardness at the center portion 47 of the second wall portion 43 in the third half part 40 may also hold or need not hold with respect to the relation of the ratio Hvr/Hvc between the Vickers hardness of the first ridge portion 52 and the Vickers hardness at a center portion 57 of the second wall portion 53 in the fourth half part 50. This is because, in the center pillar base 16, among the third half part 40 and the fourth half part 50, since the fourth half part 50 mainly receives an impact load and undergoes bending deformation, the high impact absorption performance that is required for the third half part 40 is not required to the same extent for the fourth half part 50. That is, in the present embodiment, it suffices that at least a half part on one side of the center pillar base 16 (specifically, the third half part 40 constituting the outer portion of the center pillar base 16 in the width direction Y) satisfies the aforementioned characteristics ((b1) and (b2) and the like described hereunder).

As described above, the center pillar base 16 satisfies conditions (b1) that the ratio $\sigma_5/\tau_5$ in wall portions (the first wall portion 41, the pair of second wall portions 43, 43, and the pair of flanges 45, 45 or the like) of the center pillar base 16 is made ≤1.70, and (b2) that the Vickers hardness Hvc at the center portion 47 of the second wall portion 43 is made ≥250, and as a more preferable configuration, satisfies all of three conditions that include, in addition to (b1) and (b2), a condition (b3) that a ratio Hvr/Hvc between the Vickers hardness Hvr of the first ridge portion 42 and the Vickers hardness Hvc at the center portion 47 of the second wall portion 43 is made ≥1.05. According to this configuration, when the center pillar base 16 is produced (including a baking treatment) using a cold-rolled steel sheet excellent in bake hardenability that is suitable as a steel sheet for automobiles which has a tensile strength of 780 MPa or more, the aforementioned σ/τ ratio characteristic (ratio $\sigma_5/\tau_5 \leq 1.70$) is satisfied, and the crashworthiness (bending resistance property) of the center pillar base 16 is improved.

The foregoing describes the schematic configuration of the center pillar base 16. Next, the configuration of the center pillar body 17 will be described.

FIG. 2(C) is a cross-sectional view of the center pillar body 17, and illustrates a state in which the center pillar body 17 is viewed in the height direction Z. In FIG. 2(C), illustration of the portion that is on the back side relative to the cross section of the center pillar body 17 in FIG. 2(C) is omitted. Referring to FIG. 1 and FIG. 2(C), the center pillar body 17 is provided as an intermediate portion and an upper portion of the center pillar 12, and extends in the height direction Z from, for example, the height position of the upper end of the floor cross member 4 to the roof side rail 15. The center pillar body 17 is joined and fixed to each of the center pillar base 16 and the roof side rail 15 by the same method as the joining method described above with respect to the front side member 1.

The center pillar body 17 is supported at its two ends by the center pillar base 16 and the roof side rail 15, and a support span SP2 between the center pillar body 17 and the roof side rail 15 is made relatively long. Therefore, at the time of a side crash, the center pillar body 17 bends and deforms in an arched shape that is convex to the inner side in the width direction Y.

At the time of a side crash, in the center pillar body 17, the amount of impact absorption energy generated by bending deformation is greater than the amount of impact absorption energy generated by deformation under which the closed cross-sectional shape collapses. On the other hand, in the center pillar base 16, the amount of impact absorption energy generated by deformation under which the closed cross-sectional shape collapses is greater than the amount of impact absorption energy generated by bending deformation. In this way, the mode of impact absorption at the time of a side crash differs between the center pillar base 16 and the center pillar body 17. This difference between the modes of impact absorption is due to the difference between the length of the center pillar base 16 and the length of the center pillar body 17 in the height direction Z. The length of the center pillar body 17 is longer than the length of the center pillar base 16.

The center pillar body 17 has a fifth half part 60 that constitutes the outer portion of the center pillar body 17 in the width direction Y, and a sixth half part 70 that constitutes the inner portion of the center pillar body 17 in the width direction Y.

The fifth half part 60 and the sixth half part 70 are each formed in a thin sheet shape by subjecting a steel sheet to press working. The steel sheet is preferably a high-strength steel sheet. The tensile strength of the steel sheet is set similarly to the tensile strength with respect to the front side member 1 that is described above, and is preferably 780 MPa or more, and more preferably 1470 MPa or more. The tensile strength of the steel material constituting the center pillar body 17 is preferably greater than the tensile strength of the steel material constituting the center pillar base 16.

The fifth half part 60 and the sixth half part 70 are each formed in a hat shape as viewed from the height direction Z. The fifth half part 60 and the sixth half part 70 form the center pillar body 17 by being integrated together by flange joining. Note that, either one of the fifth half part 60 and the sixth half part 70 may be formed in a flat plate shape which is not bent as viewed from the height direction Z. Further, the fifth half part 60 and the sixth half part 70 may be integrally formed by means of a tubular member formed in an annular shape (for example, a polygonal annular shape such as a rectangle, a circular shape, or an elliptical shape) as viewed from the height direction Z (for example, see FIG. 11(B) which is described later).

The fifth half part 60 has a first wall portion 61, a pair of first ridge portions 62, 62, a pair of second wall portions 63, 63, a pair of second ridge portions 64, 64, and a pair of flanges 65, 65.

In the present embodiment, the first wall portion 61 is the external wall of the center pillar body 17. The pair of first ridge portions 62, 62 are continuous with a pair of end portions of the first wall portion 61 in the longitudinal direction X. In the present embodiment, each first ridge portion 62 is formed in a curved shape as viewed from the height direction Z, and has a predetermined radius of curvature. Each first ridge portion 62 advances so as to face inward in the width direction Y progressively from the first wall portion 61 toward the second wall portion 63. The pair of second wall portions 63, 63 are continuous with the pair of first ridge portions 62, 62. In the present embodiment, the pair of second wall portions 63, 63 are a front wall and a rear wall, and extend in the width direction Y. Note that, the pair of second wall portions 63, 63 may extend in a tapered shape so that the distance therebetween increases progressively toward the center side of the automobile in the width direction Y.

The pair of second ridge portions 64, 64 are continuous with the end portions on the vehicle interior side of the pair of second wall portions 63, 63 in the width direction Y. In the present embodiment, each of the second ridge portions 64 is formed in a curved shape as viewed from the height direction Z, and has a predetermined radius of curvature. One of the second ridge portions 64 advances frontward from the corresponding second wall portion 63. The other second ridge portion 64 advances rearward from the corresponding second wall portion 63.

In the configuration described above, the boundary between the first ridge portion 62 and the first wall portion 61, and the boundary between the first ridge portion 62 and the second wall portion 63 are the portions at which the radius of curvature changes as viewed in the height direction Z. Similarly, the boundary between the second ridge portion 64 and the second wall portion 63, and the boundary between the second ridge portion 64 and the flange 65 are the portions at which the radius of curvature changes as viewed in the height direction Z.

With the configuration described above, the first wall portion 61 and the second wall portion 63 extend from the first ridge portion 62, and the second wall portion 63 and the flange 65 extend from the second ridge portion 64.

The sixth half part 70 has a first wall portion 71, a pair of first ridge portions 72, 72, a pair of second wall portions 73, 73, a pair of second ridge portions 74, 74, and a pair of flanges 75, 75.

In the present embodiment, the sixth half part 70 is formed in a shape that is approximately symmetrical to the shape of the first half part 60 in the width direction Y. Therefore, a description of each part of the second half part 70 will be omitted. The first half part 60 and the second half part 70 are fixed to each other by joining the pair of flanges 65, 65 to the pair of flanges 75 and 75. Methods for joining the pair of flanges 65, 65 to the pair of flanges 75, 75 are the same as the joining methods described above with respect to the front side member 1.

In the center pillar body 17, in the wall portions of the fifth half part 60, that is, the first wall portion 61, the pair of second wall portions 63, 63, and the pair of flanges 65, 65, a ratio $\sigma_5/\tau_5$ between a tensile stress $\sigma_5$ when the elongation in a tensile test is 5% and a shear stress $\tau_5$ when the shear strain in a shear test is $5\sqrt{3}$% (approximately 8.66%) is 1.70 or less. Because the $\sigma/\tau$ ratio decreases as the strain increases, in a case where the ratio $\sigma_5/\tau_5$ is 1.70 or less, the ratio $\sigma_{10}/\tau_{10}$ in the fifth half part 60 also becomes 1.70 or less. If the fifth half part 60 is produced using a steel sheet that has low bake hardenability, it will result in the ratio $\sigma_5/\tau_5$ also becoming more than 1.70. In such case, the material will rupture immediately without plastically deforming, and sufficient impact resistance performance (for example, bending performance) as a member will not be obtained. Therefore, the ratio $\sigma_5/\tau_5$ is made 1.70 or less.

In the present embodiment, the fifth half part 60 of the center pillar body 17 is produced using a cold-rolled steel sheet that has high bake hardenability. Therefore, the ratio $\sigma_5/\tau_5$ in wall portions whose hardness or strength has been further increased by a bake hardening heat treatment is 1.70. A steel sheet having such properties can be produced by optimizing the production process as described in detail later. Note that, as necessary, the upper limit of the ratio $\sigma_5/\tau_5$ may be set to 1.65, 1.60, 1.56 or 1.53. Whilst it is not particularly necessary to set a lower limit of the ratio $\sigma_5/\tau_5$, the lower limit may be set to 1.10, 1.20 or 1.30.

Further, in the fifth half part 60 of the center pillar body 17, a Vickers hardness Hvc at a center portion 67 of the second wall portion 63 is 250 or more, that is, Hvc≥250. The center portion 67 is the center portion of the second wall portion 63 that is the wall portion between the first ridge portion 62 and the second ridge portion 64 that is continuous with the flange 65. By making the tensile strength of the steel sheet constituting the fifth half part 60 a tensile strength of 780 MPa, Hvc≥250 can be realized. In other words, by Hvc being 250, it can be presumed that the tensile strength of the steel sheet constituting the fifth half part 60 is 780 MPa. As necessary, a lower limit of Hvc may be set to 270, 290, 310 or 340. Whilst it is not particularly necessary to set an upper limit of Hvc, the upper limit may be set to 500, 450, 410 or 370.

Further, in the center pillar body 17, a ratio Hvr/Hvc between a Vickers hardness Hvr of the first ridge portion 62 of the fifth half part 60 and the Vickers hardness Hvc at the center portion 67 of the second wall portion 63 that is continuous with the first ridge portion 62 is 1.05 or more. By making the ratio Hvr/Hvc 1.05 or more, work hardening can be enhanced, the strength of the material contributing to bending deformation can be ensured, and the crashworthiness is improved. By making the ratio Hvr/Hvc 1.07 or more, 1.09 or more, or 1.10 or more, the crashworthiness can be further improved. Note that, in the center pillar 12, because the center pillar body 17 is a long-span member which has a long support span in the height direction Z, the amount of deflection is large, and consequently the characteristics of the first ridge portion 62, in particular, influence the impact absorption performance. Therefore, the ratio Hvr/Hvc in the center pillar body 17 is more preferably 1.10 or more. The ratio Hvr/Hvc is even more preferably 1.12 or more, 1.14 or more, or 1.15 or more. Note that, the ratio Hvr/Hvc is preferably 1.30 or less. If the ratio Hvr/Hvc is more than 1.3, there will be a marked strength difference between the first ridge portion 61 and the center portion 67, and consequently rupturing will easily occur at the boundary therebetween. Therefore, it is desirable for the ratio Hvr/Hvc to be 1.30 or less. As necessary, the upper limit of this ratio may be set to 1.25 or 1.20.

Note that, the relation of the ratio $\sigma_5/\tau_5$ between the tensile stress and the shear stress in the wall portions of the fifth half part 60 described above may also similarly hold or need not hold with respect to the relation of the ratio $\sigma_5/\tau_5$ between a tensile stress and a shear stress in wall portions of the sixth half part 70, that is, the first wall portion 71, the pair of second wall portions 73, 73, and the pair of flanges 75, 75. Likewise, the ratio Hvr/Hvc between the Vickers hardness of the first ridge portion 62 and the Vickers hardness at the center portion 67 of the second wall portion 63 in the fifth half part 60 may also hold or need not hold with respect to the relation of the ratio Hvr/Hvc between the Vickers hardness of the first ridge portion 72 and the Vickers hardness at a center portion 77 of the second wall portion 73 in the sixth half part 70. This is because, in the center pillar body 17, among the first half part 60 and the second half part 70, since the first half part 60 mainly receives an impact load and undergoes bending deformation, the high impact absorption performance that is required for the first half part 60 is not required to the same extent for the second half part 70. That is, in the present embodiment, it suffices that at least a half part on one side of the center pillar body 17 (specifically, the fifth half part 60 constituting the outer portion of the center pillar body 17 in the width direction Y) satisfies the aforementioned characteristics ((c1) and (c2) and the like described hereunder).

As described above, the fifth half part 60 of the center pillar body 17 satisfies conditions (c1) that the ratio $\sigma_5/\tau_5$ in wall portions (the first wall portion 61, the pair of second wall portions 63, 63, and the pair of flanges 65, 65 or the like) of the fifth half part 60 is made 1.70, and (c2) that the Vickers hardness Hvc at the center portion 67 of the second wall portion 63 is made 250, and as a more preferable configuration, satisfies all of three conditions that include, in addition to (c1) and (c2), a condition (c3) that a ratio Hvr/Hvc between the Vickers hardness Hvr of the first ridge portion 62 and the Vickers hardness Hvc at the center portion 67 of the second wall portion 63 is made 1.05. According to this configuration, when the center pillar body 17 is produced (including a baking treatment) using a cold-rolled steel sheet excellent in bake hardenability that is suitable as a steel sheet for automobiles which has a tensile strength of 780 MPa or more, the aforementioned $\sigma/\tau$ ratio characteristic (ratio $\sigma_5/\tau_5 \leq 1.70$) is satisfied, and the crashworthiness (bending resistance property) of the center pillar body 17 is improved.

The foregoing describes the schematic configuration of the center pillar 12. Next, a method for producing the front side member 1 as an axial collapse component that is a shock absorbing member, and a method for producing the center pillar 12 as a bending component that is a shock absorbing member will be described.

<High-Strength Steel Sheet that is Starting Material of Shock Absorbing Member>

A high-strength steel sheet (steel sheet for cold plastic working) which is the material for shock absorbing members such as the front side member 1 and the center pillar 12 of the present embodiment, and the front side member 1 and the center pillar 12 which are products have a tensile strength of 780 MPa or more, and a ratio Cmax/Cmin between a maximum value Cmax (unit: mass %) and a minimum value Cmin (unit:mass%) of the content of Si in a cross section in the thickness direction of the steel sheet is 1.25 or less.

(Tensile Strength: 780 MPa or More)

According to the high-strength steel sheet of the present embodiment that has the aforementioned composition and structure, a high tensile strength, specifically, a tensile strength of 780 MPa or more can be achieved. Here, the reason the tensile strength is set to 780 MPa or more is to satisfy the demand to reduce the weight of the automobile body. The tensile strength is preferably 1300 MPa or more, more preferably 1470 MPa or more.

(Ratio Cmax/Cmin of Content of Si is 1.25 or Less)

The ratio Cmax/Cmin between a maximum value Cmax and a minimum value Cmin of the content of Si in a cross section in the thickness direction of the high-strength steel sheet is set to 1.25 or less. More preferably, Cmax/Cmin is 1.22 or less, 1.18 or less, or 1.15 or less. In a case where Cmax/Cmin is 1.25 or less, the segregation of Si can be controlled, the structure becomes uniform, and the precipitates such as iron carbides described hereunder can be uniformly precipitated, and thereby the bake hardenability can be enhanced.

The degree of Si segregation which is represented by Cmax/Cmin is measured as follows. The steel sheet is adjusted so that a surface having the rolling direction thereof as a normal direction (that is, a cross section in the thickness direction of the steel sheet) can be observed, the surface is subjected to mirror polishing, and in a range of 100 μm×100 μm at a location at a depth corresponding to ¼ of the thickness of the steel sheet from the surface of the steel sheet in the cross section in the thickness direction of the steel sheet, the content of Si is measured at 200 points at intervals of 0.5 μm from one surface side toward the other surface side along the thickness direction of the steel sheet by an electron probe microanalyzer (EPMA) device. The same measurement is performed on another four lines so as to cover almost the entire region within the same 100 μm×100 μm range, the highest value among the contents of Si at the total of 1000 points measured on all the five lines is adopted as the maximum value Cmax (mass %) of the content of Si, and the lowest value is adopted as the minimum value Cmin (mass %) of the content of Si, and the ratio Cmax/Cmin is calculated. The lower limit of Cmax/Cmin is 1.00.

Note that, since the ratio Cmax/Cmin for the high-strength steel sheet that is the starting material for the shock absorbing members is 1.25 or less, the ratio Cmax/Cmin will also be 1.25 or less for shock absorbing members produced from the starting material.

The aforementioned high-strength steel sheet is a steel sheet that contains martensite. A dual phase steel sheet (composite structure steel sheet, DP steel sheet) is available as one example of such a steel sheet. In DP steel, martensite and ferrite are distributed in a mosaic pattern, and hard portions at which transformation strengthening occurred and soft portions at which transformation strengthening did not occur coexist therein. When DP steel is used as a high-strength steel sheet, deformation due to cold plastic working (press forming working) mainly occurs in ferrite, which is a soft structure. In the present embodiment, the term "DP steel sheet" means a steel sheet having a steel micro-structure containing, in area fraction, martensite of 5% or more and less than 95%, ferrite of 5% or more and less than 95%, with the total of martensite and ferrite being within the range of 85 to 100%, and the other structure being bainite, retained austenite, and pearlite. As necessary, the lower limit of martensite may be set to 10%, 20%, 30%, 35% or 40%, the upper limit of martensite may be set to 90%, 80%, 70%, 65% or 60%, the lower limit of ferrite may be set to 10%, 20%, 30%, 35% or 40%, the upper limit of ferrite may be set to 90%, 80%, 70%, 65% or 60%, the lower limit of the total of martensite and ferrite may be set to 90% or 95%, retained austenite in the other structure may be set to 0%, and pearlite in the other structure may be set to 0%. Note that, it suffices that at least martensite is contained in the high-strength steel sheet, and steel other than DP steel may be used.

Next, a preferable chemical composition of the aforementioned high-strength steel sheet will be described. In the following description, "%" which is the unit of the content of each element contained in the high-strength steel sheet means "mass %" unless otherwise specified.

(C: 0.02% to 0.40%)

C has an action that increases the solute carbon content and enhances bake hardenability. In addition, C has an action that enhances hardenability, and increases strength by being contained in a martensite structure. If the content of C is less than 0.02%, a sufficient solute carbon content cannot be secured when carbides such as iron carbide are precipitated, and a bake hardening value decreases. Hence, the content of C is set to 0.02% or more, and is preferably set to 0.10% or more or 0.20% or more. On the other hand, when the content of C is more than 0.40%, incomplete martensitic transformation occurs during cooling after annealing, and the fraction of residual austenite increases. Further, the strength is too high and formability cannot be ensured. Therefore, it is good to set the content of C to 0.40% or less, and preferably 0.35% or less or 0.30% or less.

(Si: 0.01% to 3.00%)

Si is an element necessary for precipitating a large amount of fine precipitates such as iron carbide for suppressing dislocation cells. When the content of Si is less than 0.50%, even if the segregation has occurred in a uniform structure, a sufficient action and effect cannot be obtained and coarse precipitates are generated, and thus formation of dislocation cells cannot be suppressed. Hence, the content of Si is set to 0.01% or more, and is more preferably set to 0.05% or more, 0.40% or more or 0.80% or more. On the other hand, when the content of Si is more than 3.00%, the effect of precipitating a large amount of fine precipitates is saturated, resulting in an unnecessary increase in cost and deterioration of surface properties. Therefore, the content of Si is set to 3.00% or less, and is preferably set to 2.50% or 2.00% or less.

(Mn: 0.50% to 5.00%)

Mn is an element that improves hardenability, and is an element necessary for forming a martensite structure without limiting a cooling rate. In order to effectively exhibit this action, the content of Mn is set to 0.50% or more, and preferably is set to 1.00% or more or 1.80% or more. However, since excessive inclusion of Mn reduces low-temperature toughness due to the precipitation of MnS, the content of Mn is set to 5.00% or less, and preferably is set to 4.50% or less or 3.50% or less.

(P: 0.100% or Less)

P is not an essential element, but is contained, for example, as an impurity in steel. From the viewpoint of weldability, the lower the content of P, the better. In particular, when the content of P is more than 0.100%, there is a marked reduction in weldability. Therefore, it is good to make the content of P 0.100% or less, and preferably 0.030% or less. Reducing the content of P entails cost, and reducing the content of P to less than 0.0001% involves a significant increase in the cost. Therefore, whilst the lower limit of the content of P is 0%, the content of P may be set to 0.0001% or more. Further, since P contributes to an improvement in strength, the content of P may be set to 0.0001% or more from such a viewpoint.

(S: 0.010% or Less)

S is not an essential element, but is contained, for example, as an impurity in steel. From the viewpoint of weldability, the lower the content of S, the better. As the content of S increases, the amount of MnS precipitated increases, and the low-temperature toughness decreases. In particular, when the content of S is more than 0.010%, a reduction in the weldability and a reduction in the low-temperature toughness are significant. Therefore, it is good to make the content of S to 0.010% or less, and preferably 0.003% or less. Reducing the content of S entails cost, and reducing the content of S to less than 0.0001% involves a significant increase in the cost. Therefore, whilst the lower limit of the content of S is 0%, the content of S may be set to 0.0001% or more.

(Al: 0.001% to 2.000%)

Al has an effect on deoxidation. In order to effectively exhibit the aforementioned action, it is good to set the content of Al to 0.001% or more, and preferably 0.010% or more. On the other hand, when the content of Al is more than 2.000%, the weldability decreases or oxide-based inclusions are increased in amount, resulting in the deterioration of surface properties. Therefore, it is good to set the content of Al to 2.000% or less, and preferably 1.000% or less, 0.100% or less or 0.050% or less.

(N: 0.010% or Less)

N is not an essential element, but is contained, for example, as an impurity in steel. From the viewpoint of weldability, the lower the content of N, the better. In particular, when the content of N is more than 0.010%, there is a marked reduction in weldability. Therefore, it is good to make the content of N to 0.010% or less, and preferably 0.006% or less or 0.005% or less. Reducing the content of N entails cost, and reducing the content of N to less than 0.0001% involves a significant increase in the cost. Therefore, whilst the lower limit of the content of N is 0%, the content of N may be set to 0.0001% or more.

The basic chemical composition of the high-strength steel sheet of the present embodiment is as described above. In addition, the high-strength steel sheet of the present embodiment may contain the following optional elements, as necessary. These elements are optional elements, and the lower limit of all of these elements is 0%.

(Ti: 0 to 0.100%, Nb: 0 to 0.100%, V: 0 to 0.100%, and One Kind or More Selected from Ti, Nb and V: 0 to 0.100% in Total)

Ti, Nb, and V contribute to an improvement in strength. Therefore, Ti, Nb, V, or any combination thereof may be contained. In order to sufficiently obtain this effect, the content of Ti, Nb, or V, or the total content of any combination of two or more kinds of these elements is preferably set to 0.003% or more. On the other hand, when the content of Ti, Nb, or V or the total content of any combination of two or more kinds of these elements is more than 0.100%, it becomes difficult to perform hot rolling and cold rolling. Therefore, it is good to set the content of Ti, the content of Nb, the content of V, or the total content of any combination of two or more kinds of these elements to 0.100% or less, and the upper limit of these contents may be set to 0.060% or 0.040%. That is, it is preferable that the limit range in the case of including each element alone is set to Ti: 0.003% to 0.100%, Nb: 0.003% to 0.100%, and V: 0.003% to 0.100%, and that the total content of these elements in the case of any combination thereof is also set to 0.003% to 0.100%.

(Cu: 0 to 1.00%, Ni: 0 to 1.00%, Mo: 0 to 1.00%, Cr: 0 to 1.00%, and One Kind or More Selected from Cu, Ni, Mo and Cr: 0 to 1.00% in Total)

Cu, Ni, Mo and Cr contribute to an improvement in strength. Therefore, Cu, Ni, Mo, Cr, or any combination thereof may be contained. In particular, Cr and Mo are quenching elements, and have an effect of forming a martensite structure in a case where it is not possible to compensate only with Mn. In order to sufficiently obtain this effect, the content of Cu, Ni, Mo, and Cr is preferably in a range of 0.005% to 1.00% in the case of including each element alone, and the total content of these elements in the case of any combination of two or more kinds of these elements preferably satisfies the range of 0.005% or more and 1.00% or less. On the other hand, when the content of Cu, Ni, Mo, and Cr or the total content in the case of any combination of two or more kinds of these elements is more than 1.00%, the effect produced by the aforementioned action is saturated, resulting in an unnecessary increase in the cost. Therefore, it is good to set the upper limit of the respective contents of Cu, Ni, Mo and Cr or the total content in the case of any combination of two or more kinds of these elements to 1.00%, and the upper limit of these contents may be set to 0.50% or 0.30%. That is, it is preferable that the respective contents are set as follows: Cu: 0.005% to 1.00%, Ni: 0.005% to 1.00%, Mo: 0.005% to 1.00% and Cr: 0.005% to 1.00%, and that the total content in the case of any combination of these elements is 0.005 to 1.00%.

(W: 0 to 0.005%, Ca: 0 to 0.005%, Mg: 0 to 0.005%, REM: 0 to 0.010%, Total Content of W, Ca, Mg: 0 to 0.010% in Total)

W, Ca, Mg, and REM contribute to the fine dispersion of inclusions and enhance toughness. Therefore, W, Ca, Mg, or REM or any combination of these elements may be contained. In order to sufficiently obtain this effect, the content of each of W, Ca, Mg, and REM, or the total content of any combination of two or more kinds of these elements is preferably set to 0.0003% or more. On the other hand, when the total content of W, Ca, Mg, and REM is more than 0.010%, the surface properties deteriorate. Therefore, it is good to set the total content of W, Ca, Mg, and REM to 0.010% or less. That is, it is preferable that W is 0.005% or less, Ca is 0.005% or less, Mg is 0.005% or less, and REM is 0.010% or less, and that the total content of any two or more kinds of these elements is 0.0003% to 0.010%.

REM (rare earth metal) refers to a total of 17 kinds of element including Sc, Y, and lanthanoids, and the term "content of REM" means the total content of these 17 kinds of element. Lanthanoids are added industrially, for example, in the form of mischmetal.

(B: 0 to 0.0300%)

B is an element that improves hardenability and is an element useful for forming a martensite structure. It is good for B to be contained in an amount such that the content of B is 0.0003% (3 ppm) or 0.0010% (10 ppm) or more. However, if the content of B is more than 0.0300% (300 ppm), the aforementioned effect is saturated and it is economically wasteful. Therefore, it is good to set the content of B to 0.0300% or less, and preferably 0.0250% or less or 0.0050% or less.

In the high-strength steel sheet according to the present embodiment, the balance other than the aforementioned elements is Fe and impurities. Here, the term "impurities" refers to components which, during industrial production of the high-strength steel sheet, are mixed in due to various causes during the production processes, including raw material such as ore or scrap, and which are not components that are intentionally added to the high-strength steel sheet according to the present embodiment.

Next, the structure of the high-strength steel sheet that is the starting material for the shock absorbing members according to the present embodiment will be described. Hereinafter, structure requirements will be described, and in the following description the symbol "%" relating to a structure fraction means "area fraction". In the present embodiment, in the steel micro-structure of the high-strength steel sheet, the area fraction of martensite is 5% or more and less than 95%. Note that, with respect to the steel micro-structure other than martensite, preferably, the area fraction of ferrite is 5% or more and less than 95%, and the area fraction of the total area of martensite and ferrite is 85 to 100%, with the other structure being bainite, retained austenite and pearlite. As necessary, the lower limit of martensite may be set to 10%, 20%, 30%, 35% or 40%, the upper limit of martensite may be set to 90%, 80%, 70%, 65% or 60%, the lower limit of ferrite may be set to 10%, 20%, 30%, 35% or 40%, the upper limit of ferrite may be set to 90%, 80%, 70%, 65% or 60%, the lower limit of the total of martensite and ferrite may be set to 90% or 95%, and retained austenite in the other structure may be set to 0%, and pearlite in the other structure may be set to 0%.

(Martensite: 5% or More and Less than 95%)

In the present embodiment, preferably an area fraction of martensite that is secured is 5% or more. By this means, sufficient solute carbon can be secured, and as a result, bake hardenability can be enhanced. In order to further enhance such an effect, it is recommended that the secured area fraction of martensite is 10% or more.

In the present invention, measurement of the area fraction of martensite is performed as follows. First, a sample having a cross section parallel to the rolling direction and the sheet thickness direction of the high-strength steel sheet or the shock absorbing member is taken (however, in the case of a shock absorbing member, the rolling direction is unknown, and it suffices that the sample has a cross section parallel to the sheet thickness direction), and the relevant cross section is subjected to polishing to obtain a mirror-finished surface as an observation surface. Of the entire observation surface, a region of 100 μm×100 μm centered on a position corresponding to ¼ of the thickness of the steel sheet (hereinafter, the "thickness of the steel sheet" is referred to as the "sheet thickness") from the steel sheet surface is adopted as an observation region. The observation region is etched with a nital etchant. The etched observation region is observed at a magnification of 1000- to 5000-fold using a secondary electron image obtained with a field emission-scanning electron microscope (FE-SEM). In this observation region, martensite is identified in the following manner based on the positions of cementite and the arrangement of cementite contained within the structure.

In the present embodiment, as described later, in the high-strength steel sheet, or a shock absorbing member obtained by further subjecting the high-strength steel sheet to cold plastic working, a first heat treatment process, and a second heat treatment process, precipitates precipitate in martensite laths. Therefore, in the high-strength steel sheet, there is almost no "as-quenched martensite" in which precipitates have not precipitated in martensite laths, and in most of the martensite, precipitates are present in martensite laths. In this regard, because there are two or more kinds of crystal orientation relationships between the martensite laths and the precipitates, the formed precipitates have multiple variants. By detecting the characteristics of these precipitates, each microstructure is identified and the area fractions are calculated. Note that, in a case where it is necessary to confirm that the precipitates are cementite, as necessary, several precipitates may be analyzed using SEM-EDS (Scanning Electron Microscope-Energy Dispersive X-ray Spectroscopy) to confirm whether the precipitates are cementite. Furthermore, for analysis of the variants, depending on the size of the precipitates, measurement of the crystal orientation may be performed using a TEM-EBSD (Transmission Electron Microscope-Electron Back Scattered Diffraction Pattern) or a SEM-EBSD (Scanning Electron Microscope-Electron Back Scattered Diffraction Pattern).

When it is desired to strictly measure the area fraction of martensite including "as-quenched martensite" in the high-strength steel sheet, a similar observation surface as the observation surface mentioned above is etched with LePera solution. In etching with LePera solution, as-quenched martensite and retained austenite are not etched. Therefore, the observation region that was subjected to etching with LePera solution is observed using an FE-SEM, and regions which have not been etched are taken to be as-quenched martensite and retained austenite. The total area fraction of the "as-quenched martensite" and retained austenite identified in this way is then calculated.

Next, the area fraction of retained austenite is measured by the X-ray diffraction method. Specifically, a face at a position at a distance corresponding to ¼ of the sheet thickness from the surface of the high-strength steel sheet is exposed. The thus-exposed face is irradiated with Mo Kα rays, and the integrated intensity ratios between the diffraction peaks of the (200) plane and (211) plane of a bcc phase and the (200) plane, (220) plane and (311) plane of an fcc phase are determined. The volume ratio of retained austenite can be calculated based on the integrated intensity ratios between these diffraction peaks. A common five-peak method can be used as the calculation method. The volume ratio of retained austenite obtained in this manner is regarded as the area fraction of retained austenite. The area fraction of "as-quenched martensite" can be calculated by subtracting the area fraction of retained austenite measured in this way from the total area fraction of "as-quenched martensite" and retained austenite. The "as-quenched martensite" calculated in this way may be summed with the area fraction of martensite mentioned above (in which precipitates precipitated in martensite laths), and the resultant value may be adopted as the area fraction of martensite.

However, in the case of the shock absorbing member of the present invention, the high-strength steel sheet is subjected to a first heat treatment process and a second heat treatment process. Therefore, "as-quenched martensite" in which precipitates have not precipitated in martensite laths is not included in the steel micro-structure of the shock absorbing member. Accordingly, when measuring the area fraction of martensite of the shock absorbing member, it is not necessary to perform etching with LePera solution and X-ray diffraction or the like as described above.

In the present embodiment, it suffices that the steel micro-structure includes a martensite microstructure, and any one of, or a plurality of, bainite, ferrite, pearlite and retained austenite may also be included. That is, in the present embodiment, of the fractions of the respective microstructures, it is essential that there is at least a martensite fraction. Note that, the method for measuring the area fraction of retained austenite in the high-strength steel sheet or shock absorbing member is as described above. Further, in the case of measuring the area fractions of bainite, ferrite and pearlite, the area fractions are measured by the following methods.

(Bainite)

When measuring the area fraction of bainite, similarly to the method for measuring the area fraction of martensite (in which precipitates have precipitated in martensite laths) that is described above, a secondary electron image obtained using an FE-SEM of an observation region that was etched with a nital reagent is observed at a magnification of 1000- to 5000-fold, and the bainite is identified and the area fraction is measured in the following manner based on the positions of precipitates and the arrangement of precipitates contained within the microstructure.

Bainite is a microstructure that is an aggregate of lath-shaped crystal grains, and contains no iron-based carbides with a major axis of 20 nm or more or retained austenite therein, or is a microstructure that contains iron-based carbides with a major axis of 20 nm or more or retained austenite therein, and these carbides further belong to a single variant, that is, an iron-based carbide group extending in the same direction. Here, the phrase "iron-based carbide group extending in the same direction" means carbides having a difference of 5° or less in the extending direction of the iron-based carbide group. Bainite that is surrounded by grain boundaries with an orientation difference of 15° or more is counted as one bainite grain. Note that, as necessary, measurement of the crystal orientation of a bcc structure in the bainite and iron carbides may be performed by TEM-EBSD or SEM-EBSD, or elemental analysis of precipitates or the like may be performed by a method such as SEM-EDS to confirm whether precipitates are cementite.

(Ferrite and Pearlite)

In the case of measuring the area fractions of ferrite and pearlite, measurement is performed by the following method. First, similarly to the aforementioned measurement of the area fraction of martensite, a sample having a cross section parallel to the rolling direction and the sheet thickness direction of the high-strength steel sheet or the shock absorbing member is taken, and a mirror-finished surface obtained by subjecting the relevant cross section to polishing is observed. Of the entire observation surface, a region of 100 μm×100 μm centered on a position at a distance corresponding to ¼ of the thickness of the steel sheet from the steel sheet surface is adopted as an observation region. The observation region is observed at a magnification of 1000- to 5000-fold with an FE-SEM, and an electron channeling contrast image is obtained. The electron channeling contrast image is an image in which a crystal orientation difference between grains is displayed as a difference in contrast. A uniform contrast region in the obtained electron channeling contrast image is ferrite, and the area fraction thereof is determined.

Next, the observation surface is etched with a nital etchant. Of the entire etched observation surface, a region of 100 μm×100 μm centered on a position at a distance corresponding to ¼ of the thickness from the steel sheet surface is adopted as an observation region. The observation region is observed at a magnification of 1000- to 5000-fold using a secondary electron image obtained using an FE-SEM, and a region where cementite that is recognized in white contrast in the observation image is arranged in rows or layers is pearlite, and the area fraction thereof is determined.

Note that, with the exception of "as-quenched martensite" which may be present in a very small amount in the high-strength steel sheet changing to the aforementioned martensite (in which precipitates have precipitated in martensite laths), there is no change in the area fractions of the respective steel micro-structures caused by performing the first heat treatment process and the second heat treatment process. Therefore, the area fractions of ferrite, pearlite, bainite and retained austenite in the high-strength steel sheet can be regarded as the same as the area fractions of each of these steel micro-structures in the shock absorbing member. Further, as mentioned above, because the area fraction of "as-quenched martensite" is 0% or is an extremely small amount, the measurement result for the area fraction of martensite in the high-strength steel sheet may be regarded as the area fraction of martensite in the shock absorbing member.

<Method for Producing High-Strength Steel Sheet>

Next, a preferred method for producing a high-strength steel sheet as the starting material for the shock absorbing member of the present embodiment will be described.

The following description is intended to exemplify the characteristic method for producing the high-strength steel sheet of the present embodiment, and is not intended to limit the high-strength steel sheet to a high-strength steel sheet produced by the production method described below.

The preferred method for producing a high-strength steel sheet of the present invention includes:

a process of forming a slab by casting a molten steel having the chemical composition described above;

a rough rolling process of performing rough rolling on the slab in a temperature range of 1050° C. or more and 1250° C. or less, in which the rough rolling includes reverse rolling performed an even number of times, which is two passes or more and 16 passes or less, the reverse rolling having a rolling reduction of 30% or less per pass, the difference in the rolling reduction between two passes during one reciprocation is 20% or less, the rolling reduction of an even-numbered pass during one reciprocation is higher by 5% or more than the rolling reduction of an odd-numbered pass, and holding is performed for five seconds or more after the rough rolling;

a finish rolling process of performing finish rolling on the rough-rolled steel sheet in a temperature range of 850° C. or more and 1050° C. or less, in which the finish rolling is performed by four or more consecutive roll stands, with the rolling reduction of the first stand being 15% or more, and the finish-rolled steel sheet is coiled in a temperature range of 400° C. or less;

a cold rolling process of performing cold rolling on the obtained hot-rolled steel sheet at a rolling reduction of 15% or more and 45% or less; and an annealing process of raising the temperature of the obtained cold-rolled steel sheet at an average heating rate of 10° C./sec or more, holding the heating temperature within a temperature range of more than $Ac_1$ to less than $Ac_3$° C. for 10 to 1000 seconds, and then cooling the obtained steel sheet to 70° C. or less at an average cooling rate of 10° C./sec or more. Hereinafter, each process will be described.

(Process for Forming Slab)

First, a molten steel having the chemical composition of the high-strength steel sheet described above is cast to form a slab to be provided for rough rolling. The casting method may be an ordinary casting method, and a continuous casting process, an ingot-making process or the like can be adopted. From the viewpoint of productivity, the continuous casting method is preferable.

(Rough Rolling Process)

Before the rough rolling, it is preferable to heat the slab to a solutionizing temperature range of 1000° C. or more and 1300° C. or less. Whilst a heating holding time is not particularly defined, it is preferable to hold the slab at the heating temperature for 30 minutes or more to make the central part of the slab a predetermined temperature. The heating holding time is preferably 10 hours or less, more preferably five hours or less, in order to suppress excessive scale loss. If the temperature of the slab after casting is 1050° C. or more and 1250° C. or less, the slab may be subjected to rough rolling as it is without being heated and held in the temperature range, and may be subjected to hot direct rolling or direct rolling.

Next, by performing reverse rolling on the slab as the rough rolling, a Si segregation portion in the slab formed during solidification in the process for forming the slab can be made a uniform structure without being formed into a plate-like segregation portion extending in one direction. The formation of a Si content distribution having such a uniform structure will now be described in more detail. First, in the slab before starting rough rolling, a plurality of portions where the alloying elements such as Si are concentrated are arranged substantially perpendicularly in a comb-like form from both surfaces toward the inside of the slab.

On the other hand, in the rough rolling, in each rolling pass, the surface of the slab is extended in a direction in which rolling proceeds. Note that, the phrase "direction in which rolling proceeds" refers to the direction in which the slab travels with respect to rolling rolls. By the surface of the slab being extended in the direction in which rolling proceeds in this way, the Si segregation portion growing toward the inside from the surface of the slab is placed in a state in which the Si segregation portion is inclined in the direction in which the slab travels in each rolling pass.

Here, in the case of so-called unidirectional rolling in which the direction in which the slab travels in each pass of the rough rolling is always the same direction, the inclination of the Si segregation portion gradually increases in the same direction during each pass while the Si segregation portion maintains a substantially straight state. Then, at the end of the rough rolling, the Si segregation portion is in a posture substantially parallel to the surface of the slab while maintaining a substantially straight state, and flat microsegregation is formed.

On the other hand, in the case of reverse rolling in which the directions in which the slab travels in the respective passes of the rough rolling alternately become opposite to each other, the Si segregation portion inclined in the immediately preceding pass is inclined in the reverse direction in the subsequent pass, and as a result, the Si segregation portion has a bent shape. Therefore, in the reverse rolling, passes alternately performed in opposite directions to each other are repeatedly performed, and thus the Si segregation portion has a zigzag shape which has been bent alternately in opposite directions.

When a plurality of zigzag shapes that are each bent alternately in opposite directions in this manner are arranged side-by-side, plate-like microsegregation disappears, and a Si content distribution that is uniformly intricate is formed. By adopting such a structure, Si is further likely to diffuse due to a heat treatment in a subsequent process, and a hot-rolled steel sheet having a more uniform content of Si can be obtained. Note that, since a uniformly intricate Si content distribution is formed over the entire steel sheet by the aforementioned reverse rolling, such a uniform structure is similarly formed in a sheet thickness cross section which has the rolling direction as the normal line, and not just in a sheet thickness cross section that is parallel to the rolling direction.

If the rough rolling temperature range is less than 1050° C., it will be difficult to complete the finish rolling at 850° C. or more in the final pass of the rough rolling, resulting in defective shape, and therefore the rough rolling temperature range is preferably 1050° C. or more. The rough rolling temperature range is more preferably 1100° C. or more. If the rough rolling temperature range is more than 1250° C., scale loss increases and there is concern that slab cracking may occur. Therefore, the rough rolling temperature range is preferably 1250° C. or less.

If the rolling reduction per pass in the rough rolling is more than 30%, the shear stress during the rolling increases, and the Si segregation portion becomes non-uniform, and thus a uniform structure cannot be obtained. Therefore, the rolling reduction per pass in the rough rolling is set to 30% or less. The smaller the rolling reduction, the smaller the shear strain during rolling, and the uniform structure can be obtained. Therefore, whilst a lower limit of the rolling reduction is not particularly specified, from the viewpoint of productivity the lower limit is preferably 10% or more.

In order to make the Si content distribution a uniform structure, reverse rolling is preferably performed in two passes or more, and more preferably four passes or more. However, if reverse rolling is performed in more than 16 passes, it will be difficult to secure a sufficient rolling finishing temperature, and hence the number of passes of the reverse rolling is set to 16 passes or less. Further, it is desirable that passes in which the travelling directions are opposite to each other are performed the same number of times, that is, it is desirable that the total number of passes is an even number. However, in a general rough rolling line, the entrance side and the delivery side of the rough rolling are located on opposite sides with rolls therebetween. Consequently, the number of passes (rolling) in the direction from the entrance side to the delivery side of the rough rolling is larger by one. In this case, in the last pass (rolling), the Si segregation portion becomes a flat shape and it is difficult for a uniform structure to be formed. In the case of performing rough rolling on such kind of hot rolling line, it is preferable to omit rolling in the last pass by opening the rolls.

In the reverse rolling, if there is a difference in the rolling reduction between two passes included in rolling of one reciprocation, a defective shape is liable to occur, or the Si segregation portion will become non-uniform, so that a uniform structure cannot be obtained. Therefore, during the rough rolling, the difference in the rolling reduction between two passes included in one reciprocation of the reverse rolling is set within the range of 9 to 20% or less. The difference is preferably 10% or more.

As will be described later, although tandem multi-stage rolling in the finish rolling is effective for refining a recrystallization structure, tandem rolling facilitates the formation of flat microsegregation. In order to utilize tandem multi-stage rolling, it is necessary that the rolling reduction in even-numbered passes in the reverse rolling is larger than the rolling reduction in odd-numbered passes to control microsegregation formed in the subsequent tandem rolling. The effect thereof is significant when the rolling reduction in the even-numbered pass (return path) is higher than the rolling reduction in the odd-numbered pass (forward path) by 5% or more in one reciprocation of the reverse rolling. Therefore, in one reciprocation of the reverse rolling, preferably the rolling reduction of the even-numbered pass is set to be higher than the rolling reduction of the odd-numbered pass by 5% or more.

In order to make the intricate structure of Si generated by the reverse rolling in the rough rolling uniform by austenite grain boundary migration, it is preferable that holding is performed for five seconds or longer between the rough rolling and the finish rolling.

(Finish Rolling Process)

After the reverse rolling in the rough rolling, in order to narrow the spacing of Si segregation zones caused by secondary dendrite arms by increasing the rolling reduction of the tandem rolling in the finish rolling, the finish rolling is preferably performed using four or more consecutive roll stands. If the rolling finishing temperature is less than 850° C., recrystallization will not sufficiently occur, a structure elongated in the rolling direction will form, and in a subsequent process, a plate-like structure attributable to the elongated structure will be formed. Therefore, the rolling finishing temperature is preferably 850° C. or more. More preferably, the rolling finishing temperature is 900° C. or more. On the other hand, if the rolling finishing temperature is more than 1050° C., it will be difficult to generate fine recrystallized grains of austenite, Si segregation at grain boundaries will become difficult, and the Si segregation zones are likely to be flat. Therefore, the rolling finishing temperature is preferably 1050° C. or less. Note that, as long as the temperature is an appropriate temperature, as necessary, the steel sheet that was subjected to the rough rolling may be heated after the rough rolling process and before the finish rolling process. In addition, if the rolling reduction of the first stand of the finish rolling is set to 15% or more, a large amount of recrystallized grains will form, and Si is likely to be uniformly dispersed by the subsequent grain boundary migration. Thus, by limiting not only the rough rolling process but also the finish rolling process, the flat Si microsegregation can be suppressed.

If a coiling temperature is more than 400° C., the surface properties will deteriorate due to internal oxidation. Therefore, the coiling temperature is preferably 400° C. or less. When the steel sheet structure is to be made a homogeneous structure of martensite or bainite, the coiling temperature is more preferably 300° C. or less since a homogeneous structure will be easily formed by annealing.

(Cold Rolling Process)

The hot-rolled steel sheet obtained in the finish rolling process is subjected to pickling, and thereafter cold-rolled to obtain a cold-rolled steel sheet. In order to maintain laths of martensite, the rolling reduction is preferably 15% or more and 45% or less. Note that, the pickling may be ordinary pickling.

(Annealing Process)

The steel sheet obtained through the cold rolling process is subjected to an annealing treatment. For heating at an annealing temperature, the temperature is raised at an average heating rate of 10° C./sec or more, and the steel sheet is held in a temperature range of more than $Ac_1$ to less than $Ac_3$° C. for 10 to 1000 seconds. This temperature range and annealing time are set in order to obtain a desired austenitic fraction in the steel sheet. If the holding temperature is $Ac_3$° C. or more or the annealing time is more than 1000 seconds, the austenite grain size becomes coarse and martensite with a large lath width is formed, resulting in a decrease in toughness. Therefore, the annealing temperature is set to more than $Ac_1$ and less than $Ac_3$, and the annealing time is set to 10 to 1000 seconds.

Note that, the $Ac_1$ point and the $Ac_3$ point are calculated by the following formulas. The percent by mass of the corresponding element is substituted for each symbol of an element in the following formulas. Further, 0 mass % is substituted for elements that are not contained.

$$Ac_1 = 751 - 16 \times C + 35 \times Si - 28 \times Mn - 16 \times Ni + 13 \times Cr - 6 \times Cu + 3 \times Mo$$

$$Ac_3 = 881 - 335 \times C + 22 \times Si - 24 \times Mn - 17 \times Ni - 1 \times Cr - 27 \times Cu + 41 \times Mo$$

After holding at the annealing temperature, cooling is performed at an average cooling rate of 5° C./sec or more. In order to freeze the structure and cause the martensitic transformation to efficiently occur, it is better for the cooling rate to be fast. However, at a cooling rate of less than 5° C./sec, martensite is not sufficiently generated, and the structure cannot be controlled into a desired structure. Hence, the cooling rate is set to 5° C./sec or more. A plating process may be added during the cooling after holding at the annealing temperature as long as the aforementioned cooling rate can be maintained.

The cooling stopping temperature is set within a range of 250 to 600° C., preferably 400 to 600°, and more preferably 430 to 470° C. This is to cause martensite in an area fraction of 5% or more and less than 95% to be formed by the cooling. When the cooling stopping temperature is set within a range of 400 to 600° C., the martensite fraction can be made 90% or less. On the other hand, if cooling is stopped at a temperature higher than 600° C., it will not be possible to secure martensite in an area fraction of 5% or more. Further, if the cooling stopping temperature is set to a temperature that is lower than 250° C., the martensite fraction will be 95% or more, which will be outside the applicable range of the present application. Therefore, in order to enable the martensite fraction to be made 5% or more and less than 95% which is the range of the present application, the cooling stopping temperature is set within the range of 250 to 600° C., preferably 400 to 600° C., and more preferably 430 to 470° C. By setting such a cooling stopping temperature, martensitic transformation takes place after ferrite transformation starts. After the cooling to 250 to 600° C. at an average cooling rate of 5° C./sec or more, the steel sheet is cooled to room temperature by normal air cooling (for example, at a cooling rate of 1° C./sec or less). However, in the case of performing a first heat treatment at a factory that produces the high-strength steel sheet as described later, after cooling to 250 to 600° C. at an average cooling rate of 5° C./sec or more, the steel sheet is held for 10 seconds or more and 1000 seconds or less, and thereafter the first heat treatment that is described later is performed.

Note that, the cooling stopping temperature adopted for the steel sheet disclosed in WO 2020/022481 cited herein as Patent Document 6 and the cooling stopping temperature adopted for the steel sheet of the present application are different from each other. In comparison to the cooling stopping temperature (100° C. or less) adopted for the steel sheet disclosed in the aforementioned Patent Document 6, the cooling stopping temperature (250 to 600° C.) adopted for the steel sheet of the present application is higher. According to Patent Document 6 it is necessary to set the cooling stopping temperature to 100° C. or less in order to make the area fraction of martensite 95% or more, while in the present application it is necessary to set the cooling stopping temperature to a high temperature that is from 250 to 600° C. in order to make the area fraction of martensite less than 95%.

The high-strength steel sheet according to the embodiment of the present invention can be produced in the manner described above. The high-strength steel sheet according to the embodiment of the present invention has been described on the basis that the high-strength steel sheet is a steel sheet for cold plastic working. As long as the production conditions described above are satisfied, the steel sheet for cold plastic working may be subjected to hot dipping (including galvannealing). However, a steel sheet subjected to hot dipping after cold rolling, that is, a hot-dipped steel sheet or a galvannealed steel sheet may be excluded, and the high-strength steel sheet may be applied only as a steel sheet for cold plastic working.

<Method for Producing Shock Absorbing Member from High-Strength Steel Sheet>

Next, one example of a method for producing shock absorbing members (the front side member 1 and the center pillar 12) from a high-strength steel sheet that was completed through the aforementioned annealing process (final annealing) will be described. Note that, hereinafter, the term "shock absorbing members 1 and 12" is also used when referring to the front side member 1 and the center pillar 12 collectively as shock absorbing members.

In the present embodiment, a preferred method for producing the shock absorbing members 1 and 12 from a high-strength steel sheet is a method that produces the shock absorbing members 1 and 12 by performing cold plastic working on the high-strength steel sheet after final annealing.

This method is a method for producing a shock absorbing member, that includes:

a first heat treatment process of subjecting a steel sheet to a heat treatment in which the steel sheet is held at a temperature T1 satisfying Formula (1) below for 60 to 900 seconds;

a cold plastic working process of performing cold plastic working on the steel sheet after the heat treatment to form a steel member; and a second heat treatment process of subjecting the steel member to a heat treatment in which the steel member is held at a temperature T2 that is within a range of 80 to 200° C. for 300 to 1800 seconds;

wherein:

in the steel sheet, an area fraction of martensite is 5% or more and less than 95%, a tensile strength is 780 MPa or more, and a ratio Cmax/Cmin between a maximum value Cmax (unit:mass %) and a minimum value Cmin (unit:mass %) of a content of Si in a cross section in a thickness direction of the sheet is 1.25 or less:

$$80 \times Si + 100 \ \tau_1 \leq 125 \times Si + 250 \quad (1)$$

where, Si in the above Formula (1) means a content (mass %) of Si in the steel sheet. In the present embodiment, the steel sheet in the first heat treatment may be a dual phase steel sheet.

Hereunder, each process will be described in parallel with the flow of producing the shock absorbing members 1 and 12 from a high-strength steel sheet 110 produced by the production method described above.

FIG. 4 to FIG. 6 are each a schematic diagram illustrating processes for producing the shock absorbing members 1 and 12 from the high-strength steel sheet 110. FIG. 4 illustrates a case where the first heat treatment process is performed at a steel mill 101 that produces the high-strength steel sheet 110. FIG. 5 illustrates a case where the first heat treatment process is performed at a coil center 102. FIG. 6 illustrates a case where the first heat treatment process is performed at a components factory 103 (forming factory) for forming the shock absorbing members 1 and 12.

<Case where First Heat Treatment Process is Performed at Mill that Produces the High-Strength Steel Sheet>

Referring to FIG. 4, the steel mill 101 which produces the high-strength steel sheet 110 is, for example, a steel mill that produces the high-strength steel sheet 110 from molten steel produced using a blast furnace or an electric furnace. Before the high-strength steel sheet 110 that underwent final annealing is coiled to form a coil 111, a first heat treatment process is performed in a heating furnace 112 installed in the steel mill 101. The first heat treatment process is, for example, a tempering process.

The temperature T1 of the high-strength steel sheet 110 in the heating furnace 112 is set within the range of the aforementioned Formula (1). By the temperature T1 in the first heat treatment process being not less than the aforementioned lower limit, an effect that the major axis of precipitates is 0.05 μm or more is obtained. Further, by the temperature T1 being not more than the aforementioned upper lower limit, an effect that the number density of precipitates is high and the major axis of precipitates is 0.60 μm or less is obtained.

In the first heat treatment process, the high-strength steel sheet 110 is held for 60 to 900 seconds at a constant temperature T1 within the range of the aforementioned Formula (1). By the holding time at the temperature T1 in the first heat treatment process being not less than the aforementioned lower limit, an effect that iron carbides are stably precipitated is obtained. Further, by the holding time at the temperature T1 being not more than the aforementioned upper limit, an effect that the number density of precipitates is high and the major axis of precipitates is 0.60 μm or less is obtained. Next, the properties of the high-strength steel sheet 110 manifested after the first heat treatment will be described.

(Number Density of Precipitates Having Major Axis of 0.05 to 0.60 μm and Aspect Ratio of 1:3 or More is 30/μm² or More)

In the present embodiment, by means of the first heat treatment, it is possible to obtain the high-strength steel sheet 110 in which the number density of precipitates having a major axis of 0.05 μm or more and 0.60 μm or less and an aspect ratio of 1:3 or more is 30/μm² or more. In the present embodiment, the term "aspect ratio" refers to the ratio between the longest diameter (major axis) of a precipitate to the longest diameter (minor axis) among the diameters of the precipitate that are orthogonal to the major axis. Note that, the precipitate is not particularly limited as long as the precipitate satisfies the requirements for the major axis and the aspect ratio described above, and examples thereof include carbides. In particular, in the present embodiment, there are cases where the precipitate contains iron carbide or consists of iron carbide. According to the present embodiment, by including a relatively large amount of such precipitates in the structure, for example, the formation of dislocation cells caused by the entanglement of dislocations can be suppressed, the amount of locked dislocations caused by carbon or the like that diffuses during bake hardening can be increased, and as a result, it becomes possible to significantly increase the bake hardening value. The knowledge obtained by this finding had not been known hitherto, and is very surprising and also remarkable. Note that, the size of the dislocation cells formed in martensite is approximately several tens of nm or more and several hundreds of nm or less. Therefore, in order to suppress the formation of dislocation cells, precipitate having approximately the same size as the dislocation cells is required. If the major axis is less than 0.05 μm, the formation of dislocation cells cannot be suppressed. Therefore, it is good to set the major axis of the precipitate to 0.05 μm or more. The major axis is more preferably 0.10 μm or more. Further, if the major axis is greater than 0.60 μm, the precipitates coarsen and the amount of solute carbon content is greatly reduced, and the bake hardening value is reduced. Therefore, the major axis of the precipitate is set to 0.60 µm or less. The major axis of the precipitate is more preferably 0.50 µm or less.

It is better for the shape of the precipitate to be a needle shape rather than a spherical shape, and the aspect ratio is preferably 1:3 or more. If the aspect ratio is less than 1:3, the shape of the precipitate is regarded as being spherical and the formation of dislocation cells cannot be suppressed. Therefore, the aspect ratio is set to 1:3 or more. The aspect ratio is more preferably 1:5 or more.

The place of precipitation of the precipitates is preferably within laths. This is because the place where dislocation cells are most easily formed is within laths, and dislocation cells are almost never seen between laths. Here, the term "lath" refers to a structure formed in the prior austenite grain boundary by martensitic transformation. To facilitate understanding, FIG. 3 shows an image diagram illustrating the precipitation state of precipitates in the high-strength steel sheet as the starting material of the shock absorbing members according to the present embodiment. Referring to FIG. 3, it can be seen that in a lath structure 83 formed in a prior austenite grain boundary 82 during microsegregation of Si having a uniform structure 81, needle-like precipitates 85 are uniformly precipitated over the entire surface within laths 84, and not between the laths 84.

The number density of the precipitates 85 is preferably 30/µm² or more. If the number density of the precipitates 85 is less than 30/µm², when dislocations are introduced and moved by prestrain, the dislocations interact with other dislocations before encountering the precipitates, and dislocation cells are formed. Therefore, the number density of the precipitates 85 is set to 30/µm² or more. The number density is more preferably 40/µm² or more.

In the present embodiment, the morphology and number density of the precipitates 85 are determined by observation with an electron microscope, and are measured by, for example, transmission electron microscope (TEM) observation. Specifically, a thin film sample is cut out from a region from a ⅜ position to a ¼ position of the thickness of the steel sheet from the surface of the steel sheet, and is observed in a bright field. By using an appropriate magnification of 10,000-fold to 100,000-fold, an area of 1 µm² is selected, and the precipitates 85 having a major axis of 0.05 µm or more and 0.60 µm or less and an aspect ratio of 1:3 or more are counted and determined. At such time, the number per unit area which is converted taking the thickness of the thin film sample as 30 nm is counted. This operation is performed in five or more consecutive visual fields, and the average is taken as the number density.

Note that, the high-strength steel sheet 110 of the present embodiment satisfies the requirement that the number density of precipitates having a major axis of 0.05 or more and 0.60 µm or less and an aspect ratio of 1:3 or more is 30/µm² or more, and the precipitates of the shock absorbing members produced using the high-strength steel sheet 110 also satisfy this requirement.

Hereunder, the continuation of the flow for producing the shock absorbing members 1 and 12 from the high-strength steel sheet 110 is described.

The high-strength steel sheet 110 that was subjected to the first heat treatment process is coiled to form the coil 111 at the steel mill 101. The coil 111 is shipped from the steel mill 101 to the coil center 102. At the coil center 102, the coil 111 is stored, and when an order is received, the coil 111 is shipped from the coil center 102 to the components factory 103.

The components factory 103 is a factory when the shock absorbing members 1 and 12 are formed from the coil 111. The respective processes performed at the components factory 103 may be performed using a single factory as the components factory 103, or by using different factories for each process or a plurality of processes and adopting the plurality of different factories as the components factory 103.

At the components factory 103, first, the received coil 111 is uncoiled, and subjected to bending-straightening and returned to a flat high-strength steel sheet 110. Next, the high-strength steel sheet 110 is subjected to a blanking process. A blank 115 for the shock absorbing members 1 and 12 is formed by the blanking process. For example, the blank 115 is formed by a press machine for blanking 114. Note that, in practice, blanks corresponding to the respective shapes of the first half part 20 and the second half part 30 of the front side member 1, the third half part 40 and the fourth half part 50 of the center pillar base 16, and the fifth half part 60 and the sixth half part 70 of the center pillar body 17 are formed. In the present embodiment, blanks corresponding to the respective half parts 20, 30, 40, 50, 60 and 70 are collectively referred to as "the blank 115".

Next, the blank 115 is subjected to cold plastic working to thereby form the relevant half part 20, 30, 40, 50, 60 or 70 in a state before bake finishing. Specifically, by subjecting the blank 115 to draw forming or form-forming as cold plastic working, a steel member 117 is formed as the relevant half part 20, 30, 40, 50, 60 or 70 in a state before bake finishing. The steel member 117 is formed by draw forming using, for example, a draw forming machine 116.

The draw forming machine 116 has a punch 116a, a die 116b, and a blank holder 116c which holds down end portions of the blank 115 in cooperation with the die 116b. In the draw forming, the blank 115 is formed in a state in which end portions of the blank 115 are restrained by the die 116b and the blank holder 116c, and therefore, in the steel member 117 obtained after forming the blank 115, prestrain is applied to both a bent portion 117a and a wall portion 117b.

A form-forming machine 118 has a punch 118a, a die 118b, and a pad 118c that cooperates with the punch 118a to sandwich an intermediate portion of the blank 115. In form-forming, end portions of the blank 115 are not restrained by the die 118b, and therefore, in the steel member 117 obtained after forming the blank 115, prestrain is applied to the bent portion 117a in the vicinity of the place which was sandwiched by the punch 118a and the die 118b, while on the other hand, prestrain is not substantially applied to a place other than the bent portion 117a.

In the present embodiment, in the front side member 1 as an axial collapse component, both of the first half part 20 before bake finishing and the second half part 30 before bake finishing are formed by forming the blank 115 into the steel member 117 by draw forming. Further, with regard to the center pillar 12 as a bending component, in the center pillar base 16 as a short-span member, among the third half part 40 and the fourth half part 50 before bake finishing, at least the third half part 40 (outer side member in the width direction Y) is formed by forming the blank 115 into the steel member 117 by draw forming.

On the other hand, with regard to the center pillar 12, in the center pillar body 17 as a long-span member, among the fifth half part 60 and the sixth half part 70 before bake finishing, at least the fifth half part 60 (outer side member in the width direction Y) is formed by forming the blank 115 into the steel member 117 by form-forming.

Referring to FIG. 2(A), in the first half part 20, the second half part 30, and the third half part 40 that were subjected to draw forming (more precisely, a plurality of formed products 117 constituting the corresponding first half part 20, second half part 30, and third half part 40), prestrain is applied to each of the first ridge portions 22, 32, and 42, the center portions 27, 37, and 47 of the wall portions 21, 31, and 43, and the second ridge portions 24, 34, and 44 as the places that are marked with a circle or a triangle in the drawing. The prestrain is at least 2%. By controlling the forming conditions such as the operating amount of the punch 116a in the draw forming to apply a prestrain of 2% or more, the bake hardening value can be sufficiently increased. Bake hardening is a phenomenon that occurs when interstitial elements (mainly carbon) move and adhere to dislocations (line defects that serve as an elementary process of plastic deformation) which enter a steel sheet due to cold plastic working (prestrain), and thereby inhibit movement of the dislocations so that the strength increases, and is also referred to as "strain aging".

In FIG. 2, places at which prestrain is applied in the ridge portions are indicated with a ○ mark, and places at which prestrain is applied in the wall portions are indicated with a Δ mark. However, because the second ridge portion 44 of the third half part 40 is not a place that has a significant influence on impact absorption energy at the time of a side crash, prestrain need not be applied to the second ridge portion 44.

On the other hand, in the fifth half part 60 obtained by form-forming, prestrain is applied to the first ridge portions 62 as the places marked with a circle. In the case of form-forming also, similarly to draw forming, prestrain is applied by controlling the forming conditions such as the operating amount of the punch 118a. On the other hand, prestrain is not substantially applied to the respective center portions 67 and second ridge portions 64 of the second wall portions 63.

Note that, the fourth half part 50 and the sixth half part 70 (half parts on the inner side in the width direction Y in the center pillar 12) may be formed by draw forming or may be formed by form-forming.

Referring again to FIG. 4, after cold plastic working (press forming working), work to assemble the vehicle body 100 including the shock absorbing members 1 and 12 is performed using the steel members 117. Specifically, a unit of the steel members 117 for the front side member 1 is formed by subjecting the steel member 117 serving as the first half part 20 and the steel member 117 serving as the second half part 30 to flange joining to each other. That is, an intermediate body to serve as the front side member 1 is formed by performing painting and a bake hardening treatment. Further, a unit of the steel members 117 for the center pillar 12 is formed by joining the steel members 117 serving as the third to sixth half parts 30, 40, 50, 60, and 70 to each other. That is, an intermediate body to serve as the center pillar 12 is formed by performing painting and a bake hardening treatment. The vehicle body 100 is then assembled by combining the units of the steel members 117 for the shock absorbing members 1 and 12 with other vehicle body members.

Next, painting of the assembled vehicle body 100 is performed. This painting includes, for example, three kinds of painting: electrodeposition painting, painting with an intermediate paint, and painting with a finishing paint (base and clear painting). Water-based paintings or solvent paintings are used for the painting. In the electrodeposition painting process, an electrodeposition painting is applied to the entire surface of the vehicle body 100 in a state in which the vehicle body 100 has been submerged in an electrodeposition tank that stores the painting. Further, in the process for painting with an intermediate paint, painting with an intermediate paint is performed with respect to the entire surface of the vehicle body 100 by spraying the paint from a spray nozzle onto the vehicle body 100 by manual operation performed using a painting robot or by a worker. Further, in the process for painting with a finishing paint, painting with a finishing paint is performed with respect to the entire surface of the vehicle body 100 by spraying the paint from a spray nozzle onto the vehicle body 100 using a painting robot or by manual operation performed by a worker. By this means, the surface of the vehicle body 100 is composed of a painting film having a thickness of about 100 μm.

A second heat treatment process is included in the aforementioned painting processes. The second heat treatment is a bake-drying treatment for baking the painting film onto the base material (steel sheet) of the vehicle body 100, and a treatment that subjects the steel sheet to bake hardening. Among the painting processes, the second heat treatment process may be performed at a stage that is after the electrodeposition painting and before painting with an intermediate paint, may be performed between one round of painting with an intermediate paint and another round of painting with an intermediate paint in a case where painting with an intermediate paint is performed multiple times, may be performed at a stage that is after the painting with an intermediate paint and before the painting with a finishing paint, may be performed between one round of painting with a finishing paint and another round of painting with a finishing paint in a case where painting with a finishing paint is performed multiple times, or may be performed after the painting with a finishing paint.

In the second heat treatment process, the vehicle body 100 is carried into the drying furnace 119. The temperature T2 of the vehicle body 100 inside the drying furnace 119 is set within a range of 80° C. to 200° C. as described above. By the temperature T2 in the second heat treatment process being the aforementioned lower limit or more, the painting can be reliably baked onto the steel sheet of the vehicle body 100, and a hardening treatment can be performed more reliably on the steel sheet constituting the vehicle body 100. Further, if the temperature T2 is more than the aforementioned upper limit, the cost of the production process for producing the automobile will increase. Therefore, the upper limit of the holding temperature is set to 200° C. or less.

The holding time of the vehicle body 100 inside the drying furnace 119 is set within a range of 300 to 1800 seconds as described above. By the holding time in the second heat treatment process being the aforementioned lower limit or more, the painting can be reliably baked onto the steel sheet of the vehicle body 100, and a hardening treatment can be performed more reliably on the steel sheet constituting the vehicle body 100. Further, if the holding time is more than 1800 seconds, the cost of the production process for producing the automobile will increase. Therefore, the holding time is set to 1800 seconds or less.

In the second heat treatment process, the steel sheet of the vehicle body 100 is continuously held for 300 to 1800 seconds at the constant temperature T2 within the aforementioned temperature range. By the holding time at the temperature T2 in the second heat treatment process being the aforementioned lower limit or more, an effect that the painting is baked is obtained. Further, if the holding time at the temperature T2 is more than the aforementioned upper limit, the cost of producing the automobile will increase. Therefore, the holding time at $\tau_2$ is set to 1800 seconds or less.

By undergoing the above painting processes including the second heat treatment process, the vehicle body 100 that includes the shock absorbing members 1 and 12 is completed.

<Case where First Heat Treatment Process is Performed at Coil Center>

Referring to FIG. 5, the high-strength steel sheet 110 that was subjected to final annealing at the steel mill 101 is coiled to form the coil 111. The coil 111 is shipped to the coil center 102 from the steel mill 101. At the coil center 102, the coil 111 is uncoiled. Then, a first heat treatment is performed by heating the uncoiled high-strength steel sheet 110 in the heating furnace 112 installed in the coil center 102. The contents of the first heat treatment process performed at this time are the same as the contents described above referring to FIG. 4 (the first heat treatment at the steel mill 101). Note that, in a case where the first heat treatment process is performed at the coil center 102, the first heat treatment process may be performed on the high-strength steel sheet 110 which, after being uncoiled from the coil 111, was further subjected to bending-straightening to be made flat. The high-strength steel sheet 110 on which the first heat treatment was performed is recoiled to form the coil 111, and the coil 111 is shipped to the components factory 103.

The contents of the processes at the components factory 103 where the vehicle body 100 is produced using the high-strength steel sheet 110 received from the coil center 102 are the same as the contents described above referring to FIG. 4, and therefore a detailed description is omitted here. At the components factory 103, the vehicle body 100 is completed by undergoing the painting processes including the second heat treatment process described above.

<Case where First Heat Treatment Process is Performed at Components Factory>

Referring to FIG. 6, the high-strength steel sheet 110 that was completed at the steel mill 101 is coiled at the steel mill 101 to form the coil 111. The coil 111 is shipped to the coil center 102 from the steel mill 101, and thereafter is shipped to the components factory 103.

At the components factory 103, the coil 111 is uncoiled, and the uncoiled coil 111 is made flat by performing bending-straightening to thereby return the coil 111 to the high-strength steel sheet 110 having the shape of a flat sheet. Next, the sheet-like high-strength steel sheet 110 is subjected to a blanking process to thereby form the blank 115 for each of the shock absorbing members 1 and 12.

Next, the blank 115 is subjected to a first heat treatment. In this case, the first heat treatment is performed on the blank 115 in the heating furnace 112 installed in the components factory 103. The contents of the first heat treatment process performed at this time are the same as the contents described above referring to FIG. 4. Note that, in the case of performing the first heat treatment process in the components factory 103, the first heat treatment may be performed on the sheet-like high-strength steel sheet 110 before being formed into the blank 115. The treatment processes after the blanking process and first heat treatment (processes after the cold plastic working process) are the same as described above referring to FIG. 4, and hence a description is omitted here.

By undergoing the aforementioned painting processes including the second heat treatment process, the vehicle body 100 is completed.

As described above, according to the present embodiment, after final annealing, by performing a first heat treatment (tempering), and thereafter performing a second heat treatment (bake hardening treatment), the bake hardening value of the steel sheet (steel member 117) during the second heat treatment can be made larger. As a result, the steel sheet is relatively soft and easy to form during forming working (cold plastic working and the like), and after the forming working, the bake hardening value during paint-baking is large, the impact absorption energy can be increased in the state after bake hardening, and the shock absorbing members 1 and 12 that enable thinning of the steel sheet that is the starting material can be produced.

Further, according to the present embodiment, the fifth half part 60 of the center pillar body 17 as the long-span member in the center pillar 12 is formed by subjecting the steel member 117 to form-forming. With this configuration, among the portions of the center pillar body 17, prestrain can be applied to the first ridge portion 62 of the fifth half part 60 which generates impact absorption energy by undergoing bending deformation at the time of a side crash of the automobile. By this means, the bake hardening value of the first ridge portion 62 can be sufficiently increased by the bake hardening treatment (the second heat treatment) of the first ridge portion 62. As a result, the impact absorption energy can be further increased at the first ridge portion 62 which substantially plastically deforms when the center pillar body 17 undergoes bending deformation due to a side crash of the automobile. In addition, in the case of form-forming, the blank 115 is formed into the steel member 117 without restraining the outer circumferential edge portion of the relevant blank 115. Therefore, it is not necessary to apply an extra load at a place other than the place (the first ridge portion 62) at which it is desired to apply prestrain.

Further, according to the present embodiment, the third half part 40 of the center pillar base 16 as the short-span member in the center pillar 12 is formed by subjecting the steel member 117 to draw forming. With this configuration, among the portions of the center pillar base 16, prestrain can be applied to ridge portions and wall portions, in particular, to both the first ridge portion 42 and the second wall portion 43, in the third half part 40 which, at the time of a side crash of the automobile, generates impact absorption energy by undergoing a deformation such that a closed cross section in a cross section orthogonal to the height direction Z collapses. By this means, the bake hardening value of the first ridge portion 42 and the second wall portion 43 can be sufficiently increased by the bake hardening treatment (the second heat treatment) of the first ridge portion 42 and the second wall portion 43 in question. As a result, the impact absorption energy can be further increased at the first ridge portion 42 and the second wall portion 43 which substantially plastically deform when the center pillar base 16 undergoes crushing deformation due to a side crash of the automobile.

Furthermore, according to the present embodiment, the first half part 20 and the second half part 30 of the front side member 1 as an axial collapse component are formed by subjecting the steel member 117 to draw forming. With this configuration, in each of the first half part 20 and the second half part 30 that, at the time of a frontal crash of the automobile, generate impact absorption energy by collapsing in the longitudinal direction X, prestrain can be applied to ridge portions and wall portions, in particular, to all of the first ridge portions 22 and 32, the second wall portions 23 and 33, and the second ridge portions 24 and 34. By this means, the bake hardening value of the first ridge portions 22 and 32, the second wall portions 23 and 33, and the second ridge portions 24 and 34 can be sufficiently increased by the bake hardening treatment (the second heat treatment) of the first ridge portions 22 and 32, the second wall portions 23 and 33, and the second ridge portions 24 and 34 in question. As a result, the impact absorption energy can be further increased when the front side member 1 undergoes collapsing deformation due to a side crash of the automobile.

Further, according to the present embodiment, in some cases the first heat treatment (tempering) is performed on the high-strength steel sheet 110 at the steel mill 101 after final annealing and before being coiled into the coil 111. In this case, the first heat treatment can also be performed together with the production processes at the steel mill 101 when producing the high-strength steel sheet 110.

Further, according to the present embodiment, in some cases the first heat treatment (tempering) is performed on the high-strength steel sheet 110 at the coil center 102 after being uncoiled from the coil 111. In this case, the first heat treatment can be performed at the coil center 102 during the distribution process between the steel mill 101 and the components factory 103.

Furthermore, according to the present embodiment, in some cases the first heat treatment (tempering) is performed on the blank 115 (steel sheet) at the components factory 103 after the high-strength steel sheet 110 has been subjected to blanking. In this case, the first heat treatment can also be performed together with the other processes at the components factory 103 when processing the high-strength steel sheet 110 that has a sheet shape.

Further, according to the present embodiment, the first heat treatment is performed on the high-strength steel sheet 110 that is a dual phase steel sheet. In this case, the first heat treatment as a preliminary heat treatment is performed on the segregation-reduced steel sheet of 780 MPa or more. As a result, the formability and crashworthiness of the shock absorbing members 1 and 2 formed by using the high-strength steel sheet 110 can be further improved.

Further, by performing the first heat treatment as a preliminary heat treatment on the high-strength steel sheet 110 constituting the center pillar 12 (bending component), and producing the center pillar 12 by selectively using draw forming and form-forming, crashworthiness is enhanced. It is considered that this mechanism results from two overlapping effects of the following (d1) and (d2).

(d1) The fact that bake hardenability is increased by the first heat treatment (preliminary heat treatment).

The bake hardenability of a high tensile steel containing martensite increases depending on the tempering temperature that is determined by the content of Si. When the bake hardenability increases, for convenience when testing, in a tensile test, immediately after the stress reaches the maximum, the stress is decreased to lead to rupture. On the other hand, in a shear test, measurement can be conducted without immediate rupture occurring. Therefore, to improve the crashworthiness, with respect to each of the center pillar base 16 and the center pillar body 17 of the center pillar 12, it is necessary that the ratio $\sigma_5/\tau_5$ between the tensile stress $\sigma_5$ when the elongation in a tensile test is 5% and the shear stress $\tau_5$ when the shear strain in a shear test is $5\sqrt{3}\%$ is 1.70 or less.

(d2) The fact that a forming method that is most effective for crashworthiness due to bending is adopted for the center pillar 12 so that the strength differs between the first ridge portions 42 and 62 and the center portions 47 and 67 of the corresponding wall portions 42 and 62.

In each of the center pillar base 16 and the center pillar body 17, strain is imparted to the first ridge portions 42 and 62 by draw forming or form-forming, and the strength after bake hardening is thereby increased, and thus the strength and work hardenability are caused to differ between the first ridge portions 42 and 62 and the center portions 47 and 67 of the wall portions 42 and 62. To achieve this, it is necessary that the respective ratios Hvr/Hvc of Vickers hardness between the first ridge portions 42 and 62 and the center portions 47 and 67 of the second wall portions 43 and 63 are each 1.05 or more. The crashworthiness due to bending of the center pillar 12 is enhanced by the overlapping effects of the above (d1) and (d2).

Further, by performing the first heat treatment as a preliminary heat treatment on the high-strength steel sheet 110 constituting the front side member 1 (axial collapse component), and producing the front side member 1 by draw forming, crashworthiness is enhanced. It is considered that this mechanism results from two overlapping effects of the following (e1) and (e2).

(e1) The fact that bake hardenability is increased by the first heat treatment (preliminary heat treatment).

The bake hardenability of a high tensile steel containing martensite increases depending on the tempering temperature that is determined by the content of Si. When the bake hardenability increases, for convenience when testing, in a tensile test, immediately after the stress reaches the maximum, the stress is decreased to lead to rupture. On the other hand, in a shear test, measurement can be conducted without immediate rupture occurring. In addition, when the bake hardenability increases, since the stress of high strain is increased, crashworthiness due to axial collapse can be increased. In order to increase crashworthiness in this way, it is necessary that the ratio $\tau_{10}/\tau_{10}$ between the tensile stress am when the elongation in a tensile test is 10% and the shear stress $\tau_{10}$ when the shear strain in a shear test is $10\sqrt{3}\%$ is 1.70 or less.

(e2) The fact that a forming method that is most effective for crashworthiness due to axial collapse is adopted so that the same strength is obtained at the first ridge portion 22 and at the center portion 27 of the first wall portion 21. Strain of the same level is imparted by draw forming to the first ridge portion 22 and the second wall portion 23, to thereby increase the strength after bake hardening and thus enhance the crashworthiness. To achieve this, it is necessary that the ratio Hvr/Hvc between the Vickers hardness of the first ridge portion 22 and the Vickers hardness of the center portion 27 of the first wall portion 21 is less than 1.10. The crashworthiness due to axial collapse of the front side member 1 is enhanced by the overlapping effects of the above (e1) and (e2).

EXAMPLES

Next, Examples of the present invention will be described. The conditions adopted in the Examples are merely one example of conditions adopted to confirm the operability and advantageous effects of the present invention, and the present invention is not limited to this one example of the conditions. The present invention can adopt various conditions as long as the objective of the present invention is achieved without departing from the gist of the present invention.

<Preparation of High-Strength Steel Sheet>

Slabs having the chemical compositions shown in Table 1-1 were produced, and after the slabs were heated at 1300° C. for one hour, rough rolling and finish rolling were performed according to the conditions shown in Table 1-2 and hot-rolled steel sheets were obtained. Thereafter, pickling of the hot-rolled steel sheets was performed, and cold rolling with the rolling reductions shown in Table 1-2 was performed to thereby obtain cold-rolled steel sheets. Next, annealing was performed under the conditions shown in Table 1-2. Note that, each temperature shown in Table 1-2 is the surface temperature of the steel sheet.

Note that, in the respective tables, places indicated by bold type and underlining indicate values that deviate from the preferable range.

TABLE 1-1

| Steel Type | Chemical Composition (mass %) | | | | | | | | | | | | | | | | | | |
|---|---|---|---|---|---|---|---|---|---|---|---|---|---|---|---|---|---|---|---|
| | C | Si | Mn | P | S | Al | N | Ti | Nb | V | Cu | Ni | Mo | Cr | W | Ca | Mg | REM | B |
| A | 0.10 | 1.00 | 2.20 | 0.010 | 0.004 | 0.020 | 0.003 | | | | | | | | | | | | |
| B | 0.13 | 1.00 | 2.20 | 0.011 | 0.004 | 0.020 | 0.003 | 0.030 | | | | | | | | | | | |
| C | 0.15 | 0.90 | 2.90 | 0.012 | 0.004 | 0.020 | 0.003 | | | | | 0.01 | | | | | | | |
| D | 0.11 | 0.80 | 3.00 | 0.011 | 0.004 | 0.020 | 0.003 | | | | | | 0.005 | | | | | | |
| E | 0.20 | 1.20 | 2.10 | 0.010 | 0.004 | 0.020 | 0.003 | | | | 0.01 | | | | | | | | |
| F | 0.20 | 1.20 | 2.00 | 0.010 | 0.004 | 0.020 | 0.003 | | | 0.004 | | | | | | | | | |
| G | 0.14 | 0.50 | 2.40 | 0.013 | 0.003 | 0.020 | 0.003 | 0.005 | 0.005 | | | | | | | | | | |
| H | 0.18 | 2.00 | 2.60 | 0.010 | 0.004 | 0.020 | 0.003 | | | | | | | | | 0.003 | | | |
| I | 0.14 | 0.90 | 2.20 | 0.013 | 0.003 | 0.020 | 0.003 | | | | | | | | 0.007 | | | | |
| J | 0.13 | 1.10 | 2.20 | 0.012 | 0.004 | 0.020 | 0.003 | | | | | | | | | 0.005 | | | |
| K | 0.31 | 1.00 | 2.40 | 0.009 | 0.004 | 0.020 | 0.003 | | | | | | | | | | | | |
| L | 0.09 | 1.00 | 2.20 | 0.012 | 0.004 | 0.020 | 0.003 | | | | | | | | | | 0.004 | 0.009 | |
| M | 0.13 | 1.00 | 2.30 | 0.011 | 0.004 | 0.020 | 0.003 | | | | | | | | | | | | 0.0019 |

TABLE 1-2

| | | Hot Rough Rolling | | | | | | Time From | Finish Rolling | | | | | Cold Rolling | | | Annealing | | | | |
|---|---|---|---|---|---|---|---|---|---|---|---|---|---|---|---|---|---|---|---|---|---|---|
| | | Rough Rolling | | | Rolling Ratio Difference Between Odd-numbered And Even-numbered | | Rough Rolling | | | | Finish Rolling | | | | | | | | | | | |
| No. | Steel Type | Number of Rough Rolling Recipro-cations | Maximum Rolling Reduc-tion (%) | Rough Rolling Starting Temper-ature (° C.) | Rolling Reduction Difference Between Two Passes (%) | Pass In One Recipro-cation (%) | Rough Rolling Comple-tion Temper-ature (° C.) | Rough Rolling Until Finish Rolling (s) | Number Of Roll Stands (Stands) | Finish Rolling Starting Temper-ature (° C.) | Reduc-tion Of First Stand (%) | Finish Rolling Ending Temper-ature (° C.) | Coiling Temper-ature (° C.) | Cold Rolling Reduc-tion (%) | $Ac_1$ (° C.) | $Ac_3$ (° C.) | Anneal-ing Temper-ature (° C.) | Anneal-ing Time (s) | Average Cooling Rate (° C./s) | Cooling Stopping Temper-ature (° C.) |
| 1 | A | 4 | 25 | 1200 | 10 | 5 | 1050 | 7 | 7 | 1000 | 20 | 900 | 300 | 30 | 723 | 817 | 780 | 300 | 50 | 460 |
| 2 | B | 4 | 30 | 1200 | 10 | 5 | 1000 | 7 | 7 | 1000 | 20 | 900 | 300 | 45 | 722 | 807 | 780 | 200 | 5 | 450 |
| 3 | B | 4 | 30 | 1200 | 10 | 5 | 1000 | 7 | 7 | 1000 | 20 | 900 | 300 | 45 | 722 | 807 | 780 | 200 | 5 | 450 |
| 4 | D | 4 | 30 | 1200 | 10 | 5 | 1000 | 7 | 7 | 1050 | 20 | 900 | 300 | 45 | 693 | 790 | 750 | 200 | 10 | 450 |
| 5 | E | 4 | 25 | 1200 | 10 | 5 | 1000 | 7 | 7 | 1000 | 20 | 850 | 300 | 35 | 731 | 790 | 770 | 200 | 10 | 480 |
| 6 | F | 4 | 30 | 1200 | 10 | 5 | 1000 | 7 | 7 | 1000 | 20 | 900 | 300 | 45 | 734 | 792 | 780 | 200 | 50 | 450 |
| 7 | G | 4 | 30 | 1200 | 10 | 5 | 1000 | 7 | 7 | 1000 | 20 | 900 | 300 | 45 | 699 | 786 | 770 | 200 | 10 | 450 |
| 8 | H | 7 | 30 | 1200 | 10 | 5 | 1000 | 7 | 7 | 1050 | 20 | 900 | 300 | 45 | 745 | 802 | 780 | 200 | 15 | 450 |
| 9 | I | 4 | 30 | 1200 | 10 | 5 | 1000 | 7 | 7 | 1000 | 20 | 900 | 300 | 35 | 719 | 801 | 790 | 250 | 50 | 450 |
| 10 | J | 4 | 30 | 1200 | 10 | 5 | 1000 | 7 | 7 | 1000 | 20 | 850 | 300 | 35 | 726 | 809 | 800 | 200 | 50 | 450 |
| 11 | K | 4 | 30 | 1200 | 10 | 5 | 1000 | 7 | 7 | 1050 | 20 | 900 | 300 | 45 | 715 | 742 | 740 | 200 | 50 | 460 |
| 12 | L | 4 | 30 | 1200 | 10 | 5 | 1000 | 7 | 7 | 1000 | 20 | 850 | 300 | 35 | 723 | 820 | 780 | 200 | 50 | 450 |
| 13 | M | 4 | 30 | 1200 | 10 | 5 | 1000 | 7 | 7 | 1000 | 20 | 900 | 300 | 45 | 720 | 804 | 800 | 200 | 50 | 550 |
| 14 | A | 4 | 30 | 1200 | 10 | 5 | 1000 | 7 | 7 | 1000 | 20 | 900 | 300 | 35 | 723 | 817 | 810 | 200 | 20 | 460 |
| 15 | A | 4 | 30 | 1200 | 10 | 5 | 1000 | 2 | 7 | 1000 | 20 | 850 | 300 | 35 | 723 | 817 | 800 | 200 | 100 | 450 |
| 16 | A | 4 | 25 | 1200 | 10 | 5 | 1000 | 7 | 7 | 1000 | 20 | 900 | 300 | 40 | 723 | 817 | 810 | 200 | 100 | 450 |
| 17 | C | 4 | 30 | 1200 | 10 | 5 | 1050 | 7 | 7 | 1000 | 20 | 750 | 300 | 35 | 699 | 781 | 790 | 200 | 50 | 460 |
| 18 | E | 4 | 25 | 1200 | 10 | 5 | 1000 | 7 | 7 | 1000 | 20 | 900 | 300 | 45 | 731 | 790 | 770 | 200 | 5 | 450 |
| 19 | E | 4 | 30 | 1200 | 10 | 5 | 1050 | 7 | 7 | 1000 | 20 | 900 | 300 | 40 | 731 | 790 | 650 / 780 | 200 | 50 | 470 |
| 20 | F | 4 | 30 | 1200 | 10 | 5 | 1050 | 7 | 7 | 1050 | 20 | 850 | 300 | 35 | 734 | 792 | 770 | 200 | 50 | 460 |
| 21 | F | 4 | 30 | 1200 | 10 | 0 / 5 | 1050 | 7 | 7 | 1000 | 20 | 900 | 300 | 40 | 734 | 792 | 770 | 200 | 10 | 470 |
| 22 | G | 4 | 30 | 1200 | 35 / 10 | 5 | 1000 | 7 | 7 | 1000 | 20 | 850 | 300 | 35 | 699 | 788 | 780 | 200 | 10 | 450 |
| 23 | I | 4 | 45 / 50 | 1200 | 10 | 5 | 1000 | 7 | 7 | 1000 | 20 | 900 | 300 | 45 | 719 | 801 | 800 | 250 | 0.5 / 50 | 460 |
| 24 | M | 4 | 30 | 1200 | 10 | 5 | 1000 | 7 | 7 | 1000 | 20 | 900 | 300 | 35 | 720 | 804 | 790 | 200 | 2 | 450 |
| 25 | M | 4 | 30 | 1200 | 10 | 5 | 1000 | 7 | 7 | 1000 | 20 | 900 | 300 | 45 | 720 | 804 | 800 | 200 | 10 | 450 |

Bold type with underlining indicates value or the like is outside range recommended in the present description.

TABLE 1-3

| | | Microstructure | | | Mechanical Properties Values | |
|---|---|---|---|---|---|---|
| | | Martensite Area | | | | |
| No. | Steel Type | Fraction (%) | Other Structure | Cmax/Cmin | TS (MPa) | EL (%) |
| 1 | A | 71 | F + B | 1.21 | 1154 | 13 |
| 2 | B | 55 | F + B | 1.10 | 989 | 20 |
| 3 | B | 34 | F + B | 1.19 | 793 | 27 |
| 4 | D | 75 | F + B | 1.21 | 1157 | 11 |
| 5 | E | 56 | F + B | 1.17 | 980 | 19 |
| 6 | F | 65 | F + B | 1.11 | 1038 | 19 |
| 7 | G | 61 | F + B | 1.09 | 1013 | 25 |
| 8 | H | 39 | F + B | 1.24 | 811 | 21 |
| 9 | I | 55 | F + B | 1.22 | 925 | 18 |
| 10 | J | 45 | F + B | 1.21 | 859 | 19 |
| 11 | K | 85 | F + B | 1.19 | 1489 | 10 |
| 12 | L | 58 | F + B | 1.16 | 989 | 15 |
| 13 | M | 60 | F + B | 1.25 | 1061 | 15 |
| 14 | A | 58 | F + B | 1.13 | 1032 | 15 |
| 15 | A | 55 | F + B | 1.24 | 991 | 19 |
| 16 | A | 52 | F + B | 1.56 | 982 | 20 |
| 17 | A | 54 | F + B | 1.41 | 980 | 19 |
| 18 | C | 38 | F + B | 1.22 | 792 | 27 |
| 19 | E | 0 | F | 1.19 | 469 | 32 |
| 20 | E | 54 | F + B | 1.14 | 979 | 19 |
| 21 | F | 20 | F + B | 1.15 | 689 | 28 |
| 22 | F | 42 | F + B | 1.19 | 848 | 22 |
| 23 | G | 57 | F + B | 1.55 | 1019 | 25 |
| 24 | I | 55 | F + B | 1.60 | 911 | 18 |
| 25 | M | 60 | F + B | 1.21 | 1055 | 16 |
| 26 | M | 59 | F + B | 1.13 | 1045 | 16 |

Bold type with underlining indicates value or the like is outside range recommended in the present description The values for $Ac_1$ and $Ac_3$ in Table 1-2 were calculated by the formulas shown below. The percent by mass of the corresponding element was substituted for each symbol of an element in the following formulas. Further, 0 mass % was substituted for elements that were not contained.

$$Ac_1 = 751 - 16 \times C + 35 \times Si - 28 \times Mn - 16 \times Ni + 13 \times Cr - 6 \times Cu + 3 \times Mo$$

$$Ac_3 = 881 - 335 \times C + 22 \times Si - 24 \times Mn - 17 \times Ni - 1 \times Cr - 27 \times Cu + 41 \times Mo$$

The microstructure and the mechanical properties values of the respective high-strength steel sheets after the aforementioned annealing (final annealing) are shown in Table 1-3. With respect to the microstructure, the martensite area fraction, the other structure, and Cmax/Cmin are shown.

Measurement of the area fraction of martensite was performed as follows. First, a sample having a cross section parallel to the rolling direction and the sheet thickness direction of the high-strength steel sheet was taken. The area fraction of martensite was measured by measuring this sample by the method described above.

With respect to the other structure, ferrite is indicated by "F", and bainite is indicated by "B". With regard to the method adopted to measure ferrite and bainite, measurement was performed by the method described above using the aforementioned sample for measuring the area fraction of martensite in the high-strength steel sheet. Note that, in the present application, the area fraction of martensite is important for bake hardenability, and it cannot necessarily be said that the area fraction of ferrite and the area fraction of bainite significantly influence bake hardenability. Hence, measurement of the area fraction of ferrite and measurement of the area fraction of bainite were omitted.

The degree of Si segregation which is represented by Cmax/Cmin was measured as follows. The high-strength steel sheet was adjusted so that a surface having the rolling direction thereof as a normal direction (that is, a cross section in the thickness direction of the steel sheet) could be observed, and thereafter the surface was subjected to mirror polishing, and in a range of 100 μm×100 μm at a center portion of the high-strength steel sheet in a cross section in the thickness direction of the steel sheet, the content of Si was measured at 200 points at intervals of 0.5 μm from one surface side toward the other surface side along the thickness direction of the steel sheet by an EPMA device. The same measurement was performed on another four lines so as to cover almost the entire region within the same 100 μm×100 μm range, the highest value among the contents of Si at the total of 1000 points measured on all the five lines was adopted as the maximum value Cmax (mass %) of the content of Si, and the lowest value was adopted as the minimum value Cmin (mass %) of the content of Si, and the ratio Cmax/Cmin was calculated.

As mechanical properties values, tensile strength TS and total elongation EL were measured. This measurement was carried out by collecting a JIS No. 5 tensile test piece in which the direction perpendicular to the rolling direction was the longitudinal direction, and performing measurement in accordance with JIS (Japanese Industrial Standards) Z2241:2011 "Method of Tensile Test for Metallic Materials".

Note that, the aforementioned microstructure (martensite area fraction, other structure, and Cmax/Cmin) of the high-strength steel sheet was maintained substantially without change in the components after a first heat treatment, cold plastic working, and second heat treatment to be described later were performed on the high-strength steel sheet. Hence, it can be said that the details described in Table 1-3 also apply to a bending component and an axial collapse component to be described later.

<Manufacture of Bending Component Using High-Strength Steel Sheet>

A first heat treatment (tempering) was performed on each high-strength steel sheet (cold-rolled steel sheet) shown in Table 1-3. The temperature of the high-strength steel sheet as well as the holding time at that temperature in the first heat treatment are shown in Table 2-1. The high-strength steel sheet on which the first heat treatment had been performed was then subjected to cold plastic working to form the cold-rolled steel sheet into the shape of a bending component. The cold plastic working method used at that time is shown in Table 2-1. Next, the component formed in the shape of a bending component was subjected to a second heat treatment (bake hardening), to thereby manufacture a bending component. The temperature of the component as well as the holding time at that temperature in the second heat treatment are shown in Table 2-1.

TABLE 2-1

| | Bending Component | | | | | |
|---|---|---|---|---|---|---|
| | First Heat Treatment (Tempering) | | Cold Plastic | Second Heat Treatment (Bake Hardening) | | |
| No. | Temperature (° C.) | Time (s) | Working Method (Forming Method) | Temperature (° C.) | Time (s) | Remarks |
| 1 | 250 | 600 | FORM-FORMING | 150 | 1200 | Example |
| 2 | 250 | 600 | DRAW FORMING | 170 | 1200 | Example |
| 3 | 250 | 600 | FORM-FORMING | 200 | 900 | Example |
| 4 | 250 | 600 | FORM-FORMING | 170 | 1200 | Example |
| 5 | 300 | 600 | DRAW FORMING | 170 | 600 | Example |
| 6 | 300 | 600 | FORM-FORMING | 170 | 600 | Example |
| 7 | 250 | 600 | FORM-FORMING | 170 | 1200 | Example |
| 8 | 300 | 600 | DRAW FORMING | 160 | 1200 | Example |
| 9 | 250 | 600 | DRAW FORMING | 170 | 1200 | Example |
| 10 | 250 | 600 | FORM-FORMING | 170 | 900 | Example |
| 11 | 300 | 600 | FORM-FORMING | 190 | 1100 | Example |
| 12 | 300 | 600 | FORM-FORMING | 170 | 1500 | Example |
| 13 | 250 | 600 | DRAW FORMING | 160 | 1200 | Example |
| 14 | 350 | 600 | DRAW FORMING | 160 | 60 | Comparative Example |
| 15 | None | | DRAW FORMING | 180 | 1200 | Comparative Example |
| 16 | 300 | 600 | DRAW FORMING | 190 | 1500 | Comparative Example |
| 17 | 300 | 600 | DRAW FORMING | 150 | 1500 | Comparative Example |
| 18 | 100 | 600 | FORM-FORMING | 200 | 900 | Comparative Example |
| 19 | 350 | 600 | DRAW FORMING | 170 | 600 | Comparative Example |
| 20 | 250 | 600 | DRAW FORMING | 50 | 600 | Comparative Example |
| 21 | 250 | 600 | FORM-FORMING | 170 | 900 | Comparative Example |
| 22 | 500 | 600 | FORM-FORMING | 120 | 1200 | Comparative Example |
| 23 | 300 | 600 | FORM-FORMING | 180 | 1000 | Comparative Example |
| 24 | 300 | 600 | DRAW FORMING | 150 | 1200 | Comparative Example |
| 25 | 250 | 5 | DRAW FORMING | 120 | 900 | Comparative Example |
| 26 | 250 | 600 | DRAW FORMING | None | | Comparative Example |

Bold type with underlining indicates value or the like is outside range recommended in the present description.

TABLE 2-2

| | Bending Component | | | | | | | | |
|---|---|---|---|---|---|---|---|---|---|
| No. | $\sigma_5/\tau_5$ | Vickers Hardness Hvc Of Center Portion of Wall Portion (Hv) | Ratio Hvr/Hvc Between Vickers Hardnesses of Ridge Portion And Center Portion of Wall Portion | Number Density of Precipitates (per μm2) | Maximum Load (kN) | 0.011 × TS (kN) | Impact Absorption Energy (kJ) | 0.00055 × TS + 0.27 (kJ) | Remarks |
| 1 | 1.55 | 385 | 1.16 | 45 | 13.9 | 12.8 | 0.96 | 0.91 | Example |
| 2 | 1.45 | 324 | 1.09 | 45 | 11.9 | 10.9 | 0.85 | 0.81 | Example |
| 3 | 1.48 | 355 | 1.15 | 30 | 8.9 | 8.7 | 0.72 | 0.71 | Example |
| 4 | 1.34 | 380 | 1.13 | 35 | 13.8 | 12.7 | 0.95 | 0.91 | Example |
| 5 | 1.55 | 326 | 1.05 | 32 | 11.7 | 10.8 | 0.83 | 0.81 | Example |
| 6 | 1.53 | 349 | 1.12 | 39 | 12.0 | 11.4 | 0.85 | 0.84 | Example |
| 7 | 1.44 | 340 | 1.12 | 38 | 11.8 | 11.1 | 0.84 | 0.83 | Example |
| 8 | 1.39 | 271 | 1.05 | 39 | 9.0 | 8.9 | 0.76 | 0.72 | Example |
| 9 | 1.56 | 308 | 1.05 | 35 | 11 | 10.2 | 0.79 | 0.78 | Example |
| 10 | 1.55 | 289 | 1.15 | 35 | 9.5 | 9.4 | 0.75 | 0.74 | Example |
| 11 | 1.51 | 488 | 1.14 | 54 | 17.3 | 16.4 | 1.11 | 1.09 | Example |
| 12 | 1.45 | 327 | 1.13 | 45 | 12.0 | 10.9 | 0.85 | 0.81 | Example |
| 13 | 1.31 | 349 | 1.06 | 39 | 11.9 | 11.7 | 0.86 | 0.85 | Example |
| 14 | 1.73 | 344 | 1.08 | 32 | 11.6 | 11.4 | 0.81 | 0.84 | Comparative Example |
| 15 | 1.73 | 329 | 1.09 | 10 | 11.4 | 10.9 | 0.79 | 0.82 | Comparative Example |
| 16 | 1.71 | 327 | 1.07 | 45 | 11.0 | 10.8 | 0.79 | 0.81 | Comparative Example |
| 17 | 1.71 | 321 | 1.1 | 42 | 10.9 | 10.8 | 0.77 | 0.81 | Comparative Example |
| 18 | 1.73 | 262 | 1.15 | 20 | 5.2 | 8.7 | 0.70 | 0.71 | Comparative Example |
| 19 | 1.75 | 152 | 1.05 | 3 | 5.6 | 5.2 | 0.51 | 0.53 | Comparative Example |
| 20 | 1.72 | 333 | 1.06 | 45 | 11.0 | 10.8 | 0.79 | 0.81 | Comparative Example |
| 21 | 1.73 | 225 | 1.12 | 2 | 7.6 | 7.6 | 0.54 | 0.65 | Comparative Example |
| 22 | 1.73 | 284 | 1.11 | 10 | 8.8 | 9.3 | 0.71 | 0.74 | Comparative Example |
| 23 | 1.71 | 401 | 1.15 | 35 | 11.2 | 11.2 | 0.80 | 0.83 | Comparative Example |
| 24 | 1.71 | 305 | 1.07 | 32 | 10.1 | 10.0 | 0.72 | 0.77 | Comparative Example |

TABLE 2-2-continued

Bending Component

| No. | $\sigma_5/\tau_5$ | Vickers Hardness Hvc Of Center Portion of Wall Portion (Hv) | Ratio Hvr/Hvc Between Vickers Hardnesses of Ridge Portion And Center Portion of Wall Portion | Number Density of Precipitates (per μm2) | Maximum Load (kN) | 0.011 × TS (kN) | Impact Absorption Energy (kJ) | 0.00055 × TS + 0.27 (kJ) | Remarks |
|---|---|---|---|---|---|---|---|---|---|
| 25 | 1.73 | 356 | 1.07 | 20 | 11.6 | 11.6 | 0.81 | 0.85 | Comparative Example |
| 26 | 1.75 | 353 | 1.09 | 32 | 11.6 | 11.6 | 0.81 | 0.84 | Comparative Example |

Bold type with underlining indicates value or the like is outside range recommended in the present description.

In FIG. 7(A) and FIG. 7(B), a bending component 121 that graphically represents the aforementioned bending component is shown. FIG. 7(A) is a side view of the bending component 121 as viewed from a direction orthogonal to the longitudinal direction, and FIG. 7(B) is a view of the bending component 121 as viewed from the longitudinal direction.

Referring to FIG. 7(A) and FIG. 7(B), the bending component 121 is a hollow shaft-shaped member, and has an overall length of 800 mm, and sheet thickness t1=1.2 mm. The bending component 121 has a first half part 130 having a hat-shaped cross section, and a flat-plate-shaped second half part 140. The first half part 130 has a first wall portion 131, a pair of first ridge portions 132 and 132, a pair of second wall portions 133 and 133, a pair of second ridge portions 134 and 134, and a pair of flanges 135 and 135.

In the first half part 130, the width on the first wall portion 131 side is 80 mm, and the height of the hat portion is 60 mm. The radius of curvature R of the first ridge portion 132 of the first half part 30 is 5 mm. The inclination angle of the second wall portion 133 with respect to the direction perpendicular to the second half part 140 is 5°. The width of the second half part 140 is 130 mm. The pair of flanges 135 and 135 are joined by spot welding to the second half part 140. The nugget diameter of the spot welding is 5√sheet thickness t1. Further, the interval at which the joining points are arranged in the longitudinal direction of the bending component 121 is 40 mm.

<Evaluation of Bending Component>

As shown in Table 2-2, the following values were measured with respect to the bending component 121: a ratio $\sigma_5/\tau_5$ (5% ratio) between a tensile stress $\sigma_5$ when the elongation in a tensile test was 5% and a shear stress $\tau_5$ when the shear strain in a shear test was 5√3% at a wall portion; a Vickers hardness Hvc of a center portion 137 of the wall portion; a ratio Hvr/Hvc between a Vickers hardness Hvr of the first ridge portion 132 and the Vickers hardness Hvc of the center portion 137 of the wall portion; a number density of precipitates; a maximum load occurring at the bending component; and an impact absorption energy of the bending component.

In order to calculate the 5% ratio, a tensile test and a shear test were performed on a flat portion 136 (wall portion) in the vicinity of the first ridge portion 132 of the bending component 121. The tensile test at this time was performed by cutting out the flat portion 136 in the vicinity of the first ridge portion 132 from the bending component 121, and attaching the flat portion 136 to a tensile tester (not shown). It sufficed that the test specimen for the tensile test at this time had a size of about 10×100 mm. Note that, the tensile test was performed in accordance with JIS (Japanese Industrial Standards) Z2241:2011 "Method of Tensile Test for Metallic Materials". Further, the shear test was performed by cutting out the flat portion 136 in the vicinity of the first ridge portion 132 from the bending component 121 to prepare a rectangular test specimen 201, and placing the rectangular test specimen 201 in a shear test machine 200 shown in FIG. 8(A). It sufficed that the test specimen for the shear test at this time had a size of about 30 mm×30 mm. A schematic diagram illustrating the shear test 200 is shown in FIG. 8(A). FIG. 8(B) is an explanatory diagram relating to the shear test. Referring to FIG. 8(A) and FIG. 8(B), the shear test was performed by applying chucks to a pair of long side portions of the rectangular test specimen 201, imparting a simple shearing deformation by moving one of the long side portions in the vertical direction (shear direction) with respect to the other long side portion, and measuring the load produced by this shearing deformation. The length of the rectangular test specimen 201 in the shear direction x the sheet thickness was adopted as the cross-sectional area for calculating the shear stress. The shear strain was determined as required from the inclination of a straight line 202 drawn at the center portion of the test specimen 201 along the direction orthogonal to the shear direction. The tensile stress $\sigma_5$ when the elongation in the tensile test was 5%, and the shear stress $\tau_5$ when the shear strain in the shear test was 5√3% were then measured, respectively, and the ratio $\sigma_5/\tau_5$ (5% ratio) was calculated. The results are shown in Table 2-2.

Further, the first ridge portion 132 and the center portion 137 of the second wall portion 133 of the bending component 121 were each cut out, and Vickers hardnesses Hvr and Hvc at places corresponding to ¼ of the sheet thickness were measured. The Vickers hardness measurement test was performed in accordance with the "Vickers hardness test-test method" described in JIS Z 2244 (2009). The Vickers hardness was HV 0.5, measurement was conducted at five points, and the average was taken as the test result. The ratio Hvr/Hvc between the Vickers hardness Hvr of the first ridge portion 132 and the Vickers hardness Hvc of the center portion 137 of the second wall portion 133 was then calculated. The results are shown in Table 2-2.

The term "number density of precipitates" refers to the density of precipitates having a major axis of 0.05 μm or more and 0.60 μm or less and an aspect ratio of 1:3 or more obtained by the first heat treatment. The morphology and number density of the precipitates are determined by observation using an electron microscope, and in the present Examples, measurement was conducted by TEM (Transmission Electron Microscope) observation. Specifically, taking the surface of the steel sheet constituting the bending component 121 as a reference, a thin film sample was cut out from a region from a ⅜ position to a ¼ position of the thickness of the steel sheet constituting the first half part 130 of the bending component 121. The thin film sample was then observed in a bright field, and by using an appropriate magnification of 10,000-fold to 100,000-fold, an area of 1 µm² was selected, and precipitates having a major axis of 0.05 µm or more and 0.60 µm or less and an aspect ratio of 1:3 or more were counted and determined. At this time, the number per unit area which was converted taking the thickness of the thin film sample as 30 nm was counted. This operation was performed in five or more consecutive visual fields, and the average was taken as the number density. The results are shown in Table 2-2.

Further, a three-point bending deformation test was performed to measure the maximum load and impact absorption energy of the bending component 121. Specifically, referring to FIG. 7(A) and FIG. 7(B), a pair of hemispherical first indenters 123 were arranged symmetrically in the longitudinal direction of the bending component 121 at an interval of 700 mm. The radius of curvature of each of the first indenters 123 was 30 mm. Further, a second indenter 124 was arranged at the center of the bending component 121 in the longitudinal direction. The radius of curvature of the second indenter 124 was 50 mm. The apex of each of the first indenters 123 faced the second half part 140. The apex of the second indenter 124 faced the first half part 130. The first indenters 123 and 123 and the bending component 121 were then moved toward the second indenter 124 at a speed of 7.2 km/h (2 m/s), and the first half part 140 was caused to collide with the second indenter 124. The maximum load produced at this time and the impact absorption energy were measured. The results are shown in Table 2-2.

Next, a more specific evaluation relating to the bending component 121 will be described.

Evaluation of the bending component 121 was carried out by taking cases where the maximum load and the impact absorption energy satisfied both of the following Formulas (2) and (3) as Examples, and taking cases where at least one of Formulas (2) and (3) was not satisfied as Comparative Examples.

$$\text{Maximum load} > 0.11 \times TS \quad (2)$$

$$\text{Impact absorption energy} > 0.00055 \times TS + 0.27 \quad (3)$$

Note that, TS in the above formulas represents the tensile strength shown in Table 1-3.

FIG. 9(A) is a graph illustrating the relation between the tensile strength TS and the maximum bending load. FIG. 9(B) is a graph illustrating the relation between the tensile strength TS and impact absorption energy at a time of bending deformation. In FIG. 9(A), a straight line represented by "bending load=0.11×TS" described in Formula (2) is shown as the critical line. Further, in FIG. 9(B), "impact absorption energy=0.00055×TS+0.27" described in Formula (3) is shown as the critical line. In addition, in FIG. 9(A) and FIG. 9(B), trend lines of Examples and Comparative Examples are shown. The trend line of the Examples in FIG. 9(A) is 0.0123×TS−0.6182. The trend line of the Comparative Examples in FIG. 9(A) is 0.0115×TS−0.3599. The trend line of the Examples in FIG. 9(B) is 0.0005×TS+0.3025. The trend line of the Comparative Examples in FIG. 9(B) is 0.0005×TS+0.2631.

Referring to Table 2-2, FIG. 9(A) and FIG. 9(B), it is found that all of the Examples exhibited a bending load and an impact absorption energy which are above the critical line, and satisfied both of Formulas (2) and (3). On the other hand, the Comparative Examples show a tendency to fall below the critical line, especially with respect to the impact absorption energy. The calculated values for each of 0.11× TS represented by Formula (2), and 0.00055×TS+0.27 represented by Formula (3) are shown in Table 2-2. In each of the Examples, the bake hardenability was good and hence the 5% ratio ($\sigma/\tau_1$) was 1.70 or less. On the other hand, in each of the Comparative Examples, the bake hardenability was poor and hence the 5% ratio ($\sigma/\tau_1$) was more than 1.70.

When one example of the bending load and the impact absorption energy is graphed and shown, an effect as illustrated in FIG. 10(A) and FIG. 10(B) is obtained. FIG. 10(A) is a graph illustrating one example of a relation between the amount of deformation (stroke) of a bending member in a direction perpendicular to the length (direction perpendicular to the longitudinal direction) of the bending member and a load arising at the bending member. FIG. 10(B) is a graph illustrating one example of a relation between the amount of deformation (stroke) of a bending member in a direction perpendicular to the length of the bending member and the absorption energy of the bending member.

In FIG. 10(A), the properties of each of No. 2 which is an Example and No. 14 and No. 15 which are Comparative Examples are shown. The abscissa of the graph shown in FIG. 10(A) represents the stroke amount of the bending member, and the ordinate represents the load acting on the bending member. As is apparent from FIG. 10(A), a peak value P1 of the load in No. 2 which is an Example is clearly higher than a peak value P2 of the load in No. 15 which is a Comparative Example. Further, with respect to a peak value P3 of the load in No. 14 which is a Comparative Example, the peak value P3 is approximately the same as the peak value P2 of the load in No. 15 which is a Comparative Example.

In FIG. 10(B), the properties of each of No. 2, No. 14 and No. 15 are shown. The abscissa of the graph shown in FIG. 10(B) represents the stroke amount of the bending member, and the ordinate represents the absorption energy acting on the bending member. As is apparent from FIG. 10(B), a peak value PE1 of the absorption energy in No. 2 which is an Example is clearly higher than the absorption energy in No. 14 and No. 15 which are Comparative Examples.

Based on the above, it became apparent that, in comparison to the bending components of the Comparative Examples, in the Examples of the bending components, there is a tendency for the maximum load to increase and for it to become difficult for cracking to occur, and consequently the impact absorption energy increases. In particular, it was found that when the tensile strengths were the same, the impact absorption energy increased in the Examples in comparison to the Comparative Examples.

Note that, with regard to the method for manufacturing the bending component 121, as shown in Table 1-3 and Table 2-1, in each of No. 1 to No. 13 that are Examples, the manufacturing method was within the range of the present invention. On the other hand, in each of No. 14 to No. 26 that are Comparative Examples, the manufacturing method included an item that was outside the range of the present invention. More specifically, in No. 14, as shown in Table 2-1, the time of the second heat treatment process was outside the range of the present invention. In No. 15, as shown in Table 2-1, since the first heat treatment process was not performed, the manufacturing method was outside the range of the present invention. In No. 16 and No. 17, as shown in Table 1-3, Cmax/Cmin fell outside the range of the present invention. In No. 18, as shown in Table 2-1, the temperature in the first heat treatment process was outside the range of the present invention. In No. 19, as shown in Table 1-3, the martensite area fraction was zero, and martensite was not contained. Further, the tensile strength did not reach 780 MPa, and was outside the range of the present invention. In No. 20, as shown in Table 2-1, the temperature in the second heat treatment process was outside the range of the present invention. In No. 21, the tensile strength did not reach 780 MPa, and therefore was outside the range of the present invention. In No. 22, as shown in Table 2-1, the temperature in the first heat treatment process was outside the range of the present invention. In No. 23 and No. 24, as shown in Table 1-3, Cmax/Cmin fell outside the range of the present invention. In No. 25, as shown in Table 2-1, the time in the first heat treatment process was outside the range of the present invention. In No. 26, as shown in Table 2-1, since a second heat treatment process was not performed, the manufacturing method was outside the range of the present invention.

Further, with regard to the properties of the bending component 121 itself, as is clearly shown in Table 2-2, in each of No. 1 to No. 13 which are Examples, the properties of the bending component 121 fell within the range recommended in the present description. On the other hand, in each of No. 14 to No. 26 which are Comparative Examples, the 5% ratio fell outside the range recommended in the present description. In particular, in No. 15, No. 18, No. 19, No. 21, No. 22, and No. 25, the number density of precipitates was less than the range recommended in the present description.

<Manufacture of Axial Collapse Component Using High-Strength Steel Sheet>

A first heat treatment (tempering) was performed on each high-strength steel sheet (cold-rolled steel sheet) shown in Table 1-3. The temperature of the high-strength steel sheet as well as the holding time at that temperature in the first heat treatment are shown in Table 3-1. The high-strength steel sheet on which the first heat treatment had been performed was then subjected to cold plastic working to form the cold-rolled steel sheet into the shape of an axial collapse component. The cold plastic working method used at that time is shown in Table 3-1. Next, the component formed in the shape of an axial collapse component was subjected to a second heat treatment (bake hardening), to thereby manufacture an axial collapse component. The temperature of the component as well as the holding time at that temperature in the second heat treatment are shown in Table 3-1.

TABLE 3-1

| | Axial Collapse Component | | | | | |
|---|---|---|---|---|---|---|
| | First Heat Treatment (Tempering) | | Cold Plastic | Second Heat Treatment (Bake Hardening) | | |
| No. | Temperature (° C.) | Time (s) | Working Method (Forming Method) | Temperature (° C.) | Time (s) | Remarks |
| 1 | 250 | 600 | DRAW FORMING | 150 | 1200 | Example |
| 2 | 250 | 600 | DRAW FORMING | 170 | 1200 | Example |
| 3 | 250 | 600 | DRAW FORMING | 200 | 900 | Example |
| 4 | 250 | 600 | DRAW FORMING | 170 | 1200 | Example |
| 5 | 300 | 600 | DRAW FORMING | 170 | 600 | Example |
| 6 | 300 | 600 | DRAW FORMING | 170 | 600 | Example |
| 7 | 250 | 600 | DRAW FORMING | 170 | 1200 | Example |
| 8 | 300 | 600 | DRAW FORMING | 160 | 1200 | Example |
| 9 | 250 | 600 | DRAW FORMING | 170 | 1200 | Example |
| 10 | 250 | 600 | DRAW FORMING | 170 | 900 | Example |
| 11 | 300 | 600 | DRAW FORMING | 190 | 1100 | Example |
| 12 | 300 | 600 | DRAW FORMING | 170 | 1500 | Example |
| 13 | 250 | 600 | DRAW FORMING | 160 | 1200 | Example |
| 14 | 350 | 600 | DRAW FORMING | 160 | 60 | Comparative Example |
| 15 | None | | DRAW FORMING | 180 | 1200 | Comparative Example |
| 16 | 300 | 600 | DRAW FORMING | 190 | 1500 | Comparative Example |
| 17 | 300 | 600 | DRAW FORMING | 150 | 1500 | Comparative Example |
| 18 | 100 | 600 | DRAW FORMING | 200 | 900 | Comparative Example |
| 19 | 350 | 600 | DRAW FORMING | 170 | 600 | Comparative Example |
| 20 | 250 | 600 | DRAW FORMING | 50 | 600 | Comparative Example |
| 21 | 250 | 600 | DRAW FORMING | 170 | 900 | Comparative Example |
| 22 | 500 | 600 | DRAW FORMING | 120 | 1200 | Comparative Example |
| 23 | 300 | 600 | DRAW FORMING | 180 | 1000 | Comparative Example |
| 24 | 300 | 600 | DRAW FORMING | 150 | 1200 | Comparative Example |
| 25 | 250 | 5 | DRAW FORMING | 120 | 900 | Comparative Example |
| 26 | 250 | 600 | DRAW FORMING | None | | Comparative Example |

Bold type with underlining indicates value or the like is outside range recommended in the present description.

TABLE 3-2

Axial Collapse Component

| No. | $\sigma_{10}/\tau_{10}$ | Vickers Hardness Hvc Of Center Portion of Wall Portion (Hv) | Ratio Hvr/Hvc Between Vickers Hardness of Ridge Portion And Center Portion of Wall Portion | Number Density of Precipitates (per μm2) | Impact Absorption Energy (kJ) | 0.00185 × TS + 2.35 (kJ) | Remarks |
|---|---|---|---|---|---|---|---|
| 1 | 1.54 | 385 | 1.07 | 43 | 4.65 | 4.50 | Example |
| 2 | 1.44 | 323 | 1.09 | 46 | 4.23 | 4.18 | Example |
| 3 | 1.46 | 354 | 1.06 | 31 | 3.63 | 3.82 | Example |
| 4 | 1.33 | 381 | 1.07 | 34 | 4.62 | 4.49 | Example |
| 5 | 1.54 | 327 | 1.05 | 33 | 4.23 | 4.16 | Example |
| 6 | 1.52 | 348 | 1.07 | 37 | 4.36 | 4.27 | Example |
| 7 | 1.43 | 341 | 1.08 | 36 | 4.37 | 4.22 | Example |
| 8 | 1.36 | 273 | 1.06 | 36 | 3.87 | 3.85 | Example |
| 9 | 1.54 | 308 | 1.06 | 37 | 4.11 | 4.06 | Example |
| 10 | 1.53 | 288 | 1.06 | 36 | 3.95 | 3.94 | Example |
| 11 | 1.5 | 486 | 1.06 | 51 | 5.32 | 5.10 | Example |
| 12 | 1.43 | 328 | 1.05 | 42 | 4.22 | 4.18 | Example |
| 13 | 1.3 | 347 | 1.06 | 39 | 4.38 | 4.31 | Example |
| 14 | <u>1.72</u> | 344 | 1.08 | <u>25</u> | 4.1 | 4.26 | Comparative Example |
| 15 | <u>1.72</u> | 330 | 1.09 | <u>11</u> | 4.11 | 4.18 | Comparative Example |
| 16 | <u>1.71</u> | 325 | 1.06 | <u>44</u> | 4.06 | 4.17 | Comparative Example |
| 17 | <u>1.71</u> | 323 | 1.09 | 43 | 4.12 | 4.16 | Comparative Example |
| 18 | <u>1.72</u> | 262 | 1.06 | <u>19</u> | 3.75 | 3.82 | Comparative Example |
| 19 | <u>1.73</u> | <u>153</u> | 1.05 | <u>3</u> | 3.20 | 3.22 | Comparative Example |
| 20 | <u>1.71</u> | <u>332</u> | 1.06 | <u>43</u> | 4.11 | 4.16 | Comparative Example |
| 21 | <u>1.72</u> | <u>225</u> | 1.06 | <u>2</u> | 3.55 | 3.62 | Comparative Example |
| 22 | <u>1.72</u> | <u>283</u> | 1.06 | <u>11</u> | 3.83 | 3.92 | Comparative Example |
| 23 | <u>1.71</u> | 399 | 1.05 | <u>33</u> | 4.01 | 4.24 | Comparative Example |
| 24 | <u>1.71</u> | 304 | 1.07 | 30 | 3.98 | 4.04 | Comparative Example |
| 25 | <u>1.72</u> | 357 | 1.07 | 31 | 4.05 | 4.30 | Comparative Example |
| 26 | <u>1.74</u> | 354 | 1.09 | 31 | 4.06 | 4.28 | Comparative Example |

Bold type with underlining indicates value or the like is outside range recommended in the present description.

In FIG. 11(A) and FIG. 11(B), an axial collapse component 122 that graphically represents the aforementioned axial collapse component is shown. FIG. 11(A) is a side view of the axial collapse component 122, and FIG. 11(B) is a cross-sectional view along a line XIB-XIB in FIG. 11(A).

Referring to FIG. 11(A) and FIG. 11(B), the axial collapse component 122 is a hollow square cylindrical member, and has an overall length of 300 mm, and sheet thickness t2=1.2 mm. The axial collapse component 122 has four ridge portions 142, and four wall portions 143, and is formed in a substantially square shape as a whole as viewed in the longitudinal direction of the axial collapse component 122. The length of one side of the axial collapse component 122 is 50 mm. A radius of curvature R of each of the ridge portions 142 is 5 mm. In addition, a rectangular steel sheet 150 is joined by arc welding to the two end portions of the axial collapse component 122. The length of a side of the rectangular steel sheet is 200 mm, and the sheet thickness thereof is 9 mm.

<Evaluation of Axial Collapse Component>

As shown in Table 3-2, the following values were measured with respect to the axial collapse component 122: a ratio $\sigma_{10}/\tau_{10}$ (10% ratio) between a tensile stress am when the elongation in a tensile test was 10% and a shear stress $\tau_{10}$ when the shear strain in a shear test was 10√3% at a flat portion 146 (wall portion) in the vicinity of the ridge portion 142; a Vickers hardness Hvc of a center portion 147 of the wall portion; a ratio Hvr/Hvc between a Vickers hardness Hvc of the ridge portion 142 and the Vickers hardness Hvr of the center portion 147 of the wall portion; a number density of precipitates; and an impact absorption energy.

In order to calculate the 10% ratio, the flat portion 146 of the axial collapse component 122 that is a portion in the vicinity of the ridge portion 142 and to which strain is transmitted from the ridge portion 142 was subjected to a tensile test and a shear test. The tensile test at this time was performed by cutting out the flat portion 146 in the vicinity of the first ridge portion 142 from the axial collapse component 122, and attaching the flat portion 146 to a tensile tester (not shown). It sufficed that the test specimen for the tensile test at this time had a size of about 10×100 mm square. Note that, the tensile test was performed in accordance with JIS (Japanese Industrial Standards) Z2241:2011 "Method of Tensile Test for Metallic Materials". Further, the shear test was performed by cutting out the flat portion 146 in the vicinity of the ridge portion 142 from the axial collapse component 122 to prepare a rectangular test specimen 201, and placing the rectangular test specimen 201 in the shear test machine 200 shown in FIG. 8(A) and FIG. 8(B). It sufficed that the test specimen for the shear test at this time had a size of about 30 mm×30 mm. The details of the test in the shear test machine 200 are the same as in the case of the test for the rectangular test specimen 201 that was prepared by being cut off from the bending component 121. The tensile stress am when the elongation in the tensile test was 10%, and the shear stress $\tau_{10}$ when the shear strain in the shear test was 10√3% were then measured, respectively, and the ratio $\sigma_{10}/\tau_{10}$ between the tensile stress $\sigma_{10}$ and the shear stress $\tau_{10}$ was calculated. The results are shown in Table 3-2.

Further, the ridge portion 142 and the center portion 147 of the wall portion 143 of the axial collapse component 122 were each cut out, and the Vickers hardness at a place corresponding to ¼ of the sheet thickness of each was measured. The Vickers hardness measurement test was performed in accordance with the "Vickers hardness test-test method" described in JIS Z 2244 (2009). The Vickers hardness was HV 0.5, measurement was conducted at five points, and the average was taken as the test result. The ratio Hvr/Hvc between the Vickers hardness Hvr of the ridge portion 142 and the Vickers hardness Hvc of the center portion 147 of the wall portion 143 was then calculated. The results are shown in Table 3-2.

The term "number density of precipitates" refers to the density of precipitates having a major axis of 0.05 μm or more and 0.60 μm or less and an aspect ratio of 1:3 or more obtained by the first heat treatment. The morphology and number density of the precipitates are determined by observation using an electron microscope, and in the present Examples, measurement was conducted by TEM observation, similarly to measurement of the number density of precipitates in the bending component 121. Specifically, taking the surface of the steel sheet constituting the axial collapse component 122 as a reference, a thin film sample was cut out from a region from a ⅜ position to a ¼ position of the thickness of the steel sheet constituting the axial collapse component 122. The thin film sample was then observed in a bright field, and by using an appropriate magnification of 10,000-fold to 100,000-fold, an area of 1 μm² was selected, and precipitates having a major axis of 0.05 μm or more and 0.60 μm or less and an aspect ratio of 1:3 or more were counted and determined. At this time, the number per unit area which was converted taking the thickness of the thin film sample as 30 nm was counted. This operation was performed in five or more consecutive visual fields, and the average was taken as the number density. The results are shown in Table 3-2.

Further, an axial collapse test was performed to measure the impact absorption energy of the axial collapse component 122. Specifically, the axial collapse component 122 was placed in a vertically oriented state, a weight 151 having a mass of 890 kg was caused to collide with the upper end of the axial collapse component 122 at a speed of 22.5 km/h. The impact absorption energy produced at that time was measured. The results are shown in Table 3-2.

Next, a more specific evaluation relating to the axial collapse component 122 will be described.

Evaluation of the axial collapse component 122 was carried out by taking cases where the impact absorption energy satisfied the following Formula (4) as Examples, and taking cases where the impact absorption energy did not satisfy Formula (4) as Comparative Examples.

$$\text{Impact absorption energy} > 0.00185 \times TS + 2.35 \quad (4)$$

Note that, TS in the above formula represents the tensile strength shown in Table 1-3.

FIG. 12 is a graph illustrating the relation between the tensile strength TS and impact absorption energy at a time of axial collapse deformation. In FIG. 12, impact absorption energy=0.00185×TS+2.35 described in Formula (4) is shown as the critical line. In addition, in FIG. 12, the respective trend lines of the Examples and the Comparative Examples are shown. The trend line of the Examples in FIG. 12 is 0.0022×TS+2.1044. The trend line of the Comparative Examples in FIG. 12 is 0.0017×TS+2.3666.

Referring to Table 3-2 and FIG. 12, it is found that all of the Examples exhibited an impact absorption energy which is above the critical line, and satisfied Formula (4). On the other hand, all of the Comparative Examples merely exhibited an impact absorption energy that was below the critical line. The calculated values for 0.00185×TS+2.35 represented by Formula (4) are shown in Table 3-2. In each of the Examples, the bake hardenability was good and hence the 10% ratio ($\sigma_{10}/\tau_{10}$) was less than 1.70. On the other hand, in each of the Comparative Examples, the bake hardenability was poor and hence the 10% ratio ($\sigma_{10}/\tau_{10}$) was more than 1.70.

Based on the above, it became apparent that, in comparison to the axial collapse components of the Comparative Examples, in the Examples of the axial collapse components, there is a tendency for the impact absorption energy to clearly increase. In particular, it was found that when the tensile strengths were the same, the impact absorption energy increased in the Examples in comparison to the Comparative Examples.

Note that, with regard to the method for manufacturing the axial collapse component 122, as shown in Table 1-3 and Table 3-1, in each of No. 1 to No. 13 that are Examples, the manufacturing method was within the range of the present invention. On the other hand, in each of No. 14 to No. 27 that are Comparative Examples, the manufacturing method included an item that was outside the range of the present invention. More specifically, in No. 14, as shown in Table 3-1, the time of the second heat treatment process was outside the range of the present invention. In No. 15, as shown in Table 3-1, since the first heat treatment process was not performed, the manufacturing method was outside the range of the present invention. In No. 16 and No. 17, as shown in Table 1-3, Cmax/Cmin fell outside the range of the present invention. In No. 18, as shown in Table 3-1, the temperature in the first heat treatment process was outside the range of the present invention. In No. 19, as shown in Table 1-3, the martensite area fraction was zero, and martensite was not contained. Further, the tensile strength did not reach 780 MPa, and was outside the range of the present invention. In No. 20, as shown in Table 3-1, the temperature in the second heat treatment process was outside the range of the present invention. In No. 21, as shown in Table 1-3, the tensile strength did not reach 780 MPa, and therefore was outside the range of the present invention. In No. 22, as shown in Table 3-1, the temperature in the first heat treatment process was outside the range of the present invention. In No. 23 and No. 24, as shown in Table 1-3, Cmax/Cmin fell outside the range of the present invention. In No. 25, as shown in Table 3-1, the time in the first heat treatment process was outside the range of the present invention. In No. 26, as shown in Table 3-1, since a second heat treatment process was not performed, the manufacturing method was outside the range of the present invention.

Further, with regard to the properties of the axial collapse component 122 itself, as is clearly shown in Table 3-2, in each of No. 1 to No. 13 which are Examples, the properties of the axial collapse component 122 fell within the range recommended in the present description. On the other hand, in each of No. 14 to No. 27 which are Comparative Examples, the 10% ratio fell outside the range recommended in the present description. In particular, in No. 14, No. 15, No. 18, No. 19, No. 21, and No. 22, the number density of precipitates was less than the range recommended in the present description.

Note that, in the Examples, a cold-rolled steel sheet has been described. However, even in the case of a plated steel sheet, a similar tendency as in the case of a cold-rolled steel sheet can be detected, and even in the case of a plated steel sheet, similar results as the results of the cold-rolled steel sheet mentioned above can be obtained.

INDUSTRIAL APPLICABILITY

The present invention can be widely applied as a method for producing a shock absorbing member.

REFERENCE SIGNS LIST

1 front side member (shock absorbing member)
2 crash box (shock absorbing member)
3 rear side member (shock absorbing member)
4 floor cross member (shock absorbing member)
5 sub-frame (shock absorbing member)
11 A pillar (shock absorbing member)
12 center pillar (shock absorbing member)
13 C pillar (shock absorbing member)
14 side sill (shock absorbing member)
15 roof side rail (shock absorbing member)
22, 32, 42, 62, 132, 142 ridge portion
21, 23, 25, 31, 33, 35, 41, 43, 45, 61, 63, 65, 131, 133, 135, 143 wall portion
136, 146 flat portion (wall portion)
27, 47, 67, 137, 147 center portion of wall portion
110 high-strength steel sheet (steel sheet)
111 coil
X longitudinal direction X (longitudinal direction)
Y longitudinal direction (longitudinal direction)

The invention claimed is:

1. A shock absorbing member that comprises a ridge portion formed in a curved shape as viewed from a longitudinal direction, and a wall portion extending from the ridge portion, wherein:

in the wall portion, a ratio $\sigma_5/\tau_5$ between a tensile stress $\sigma_5$ when an elongation in a tensile test is 5% and a shear stress $\tau_5$ when a shear strain in a shear test is $5\sqrt{3}\%$ is 1.70 or less, or a ratio $\sigma_{10}/\tau_{10}$ between a tensile stress $\tau_{10}$ when an elongation in a tensile test is 10% and a shear stress $\tau_{10}$ when a shear strain in a shear test is $10\sqrt{3}\%$ is 1.70 or less; and a Vickers hardness Hvc at a center portion of the wall portion as viewed from the longitudinal direction is 250 or more.

2. The shock absorbing member according to claim 1, wherein a ratio Hvr/Hvc between a Vickers hardness Hvr of the ridge portion and the Vickers hardness Hvc at the center portion of the wall portion is 1.05 or more.

3. The shock absorbing member according to claim 2, wherein the ratio Hvr/Hvc between the Vickers hardnesses is 1.10 or more.

4. The shock absorbing member according to claim 1, wherein the shock absorbing member is a pillar, a side sill, or a roof side rail.

5. The shock absorbing member according to claim 1, wherein the shock absorbing member is a member having a closed cross section; and a ratio Hvr/Hvc between a Vickers hardness Hvr of the ridge portion and the Vickers hardness Hvc at the center portion of the wall portion is less than 1.10.

6. The shock absorbing member according to claim 1, wherein the shock absorbing member is a front side member, a crash box, a rear side member, a sub-frame or a floor cross member.

7. The shock absorbing member according to claim 1, wherein a tensile strength of the shock absorbing member is 780 MPa or more.

* * * * *

UNITED STATES PATENT AND TRADEMARK OFFICE
CERTIFICATE OF CORRECTION

PATENT NO. : 12,065,193 B2
APPLICATION NO. : 17/623111
DATED : August 20, 2024
INVENTOR(S) : Mai Nagano et al.

It is certified that error appears in the above-identified patent and that said Letters Patent is hereby corrected as shown below:

In the Specification

Column 1, Line 62:
Change: "σs when an elongation in a tensile test is 5% and a shear"
To: --$\sigma_5$ when an elongation in a tensile test is 5% and a shear--

Column 1, Line 65:
Change: "am when an elongation in a tensile test is 10% and a"
To: --$\sigma_{10}$ when an elongation in a tensile test is 10% and a--

Column 38, Line 27:
Change: "am when the elongation in a tensile test is 10% and the shear"
To: --$\sigma_{10}$ when the elongation in a tensile test is 10% and the shear--

Column 50, Line 8:
Change: "the 5% ratio ($\sigma/\tau_1$) was 1.70 or less. On the other hand, in"
To: --the 5% ratio ($\sigma/\tau$) was 1.70 or less. On the other hand, in--

Column 50, Line 10:
Change: "was poor and hence the 5% ratio ($\sigma/\tau_1$) was more than 1.70."
To: --was poor and hence the 5% ratio ($\sigma/\tau$) was more than 1.70.--

Column 53, Line 59:
Change: "ratio $\sigma_{10}/\tau_{10}$ (10% ratio) between a tensile stress am when"
To: --ratio $\sigma_{10}/\tau_{10}$ (10% ratio) between a tensile stress $\sigma_{10}$ when--

Column 54, Line 60:
Change: "The tensile stress am when the elongation in the tensile test"
To: --The tensile stress $\sigma_{10}$ when the elongation in the tensile test--

Signed and Sealed this
Twenty-fourth Day of December, 2024

Derrick Brent
*Acting Director of the United States Patent and Trademark Office*

CERTIFICATE OF CORRECTION (continued)
U.S. Pat. No. 12,065,193 B2

In the Claims

<u>Claim 1, Line 9 (Column 58, Line 5)</u>:
Change: "$\tau_{10}$ when an elongation in a tensile test is 10% and a"
To: --$\sigma_{10}$ when an elongation in a tensile test is 10% and a--